Nov. 13, 1956  L. P. GARVEY ET AL  2,770,489
VEHICLE FOLDING TOP STRUCTURE AND POWER
ACTUATING MEANS THEREFOR
Filed Sept. 1, 1951  19 Sheets-Sheet 8

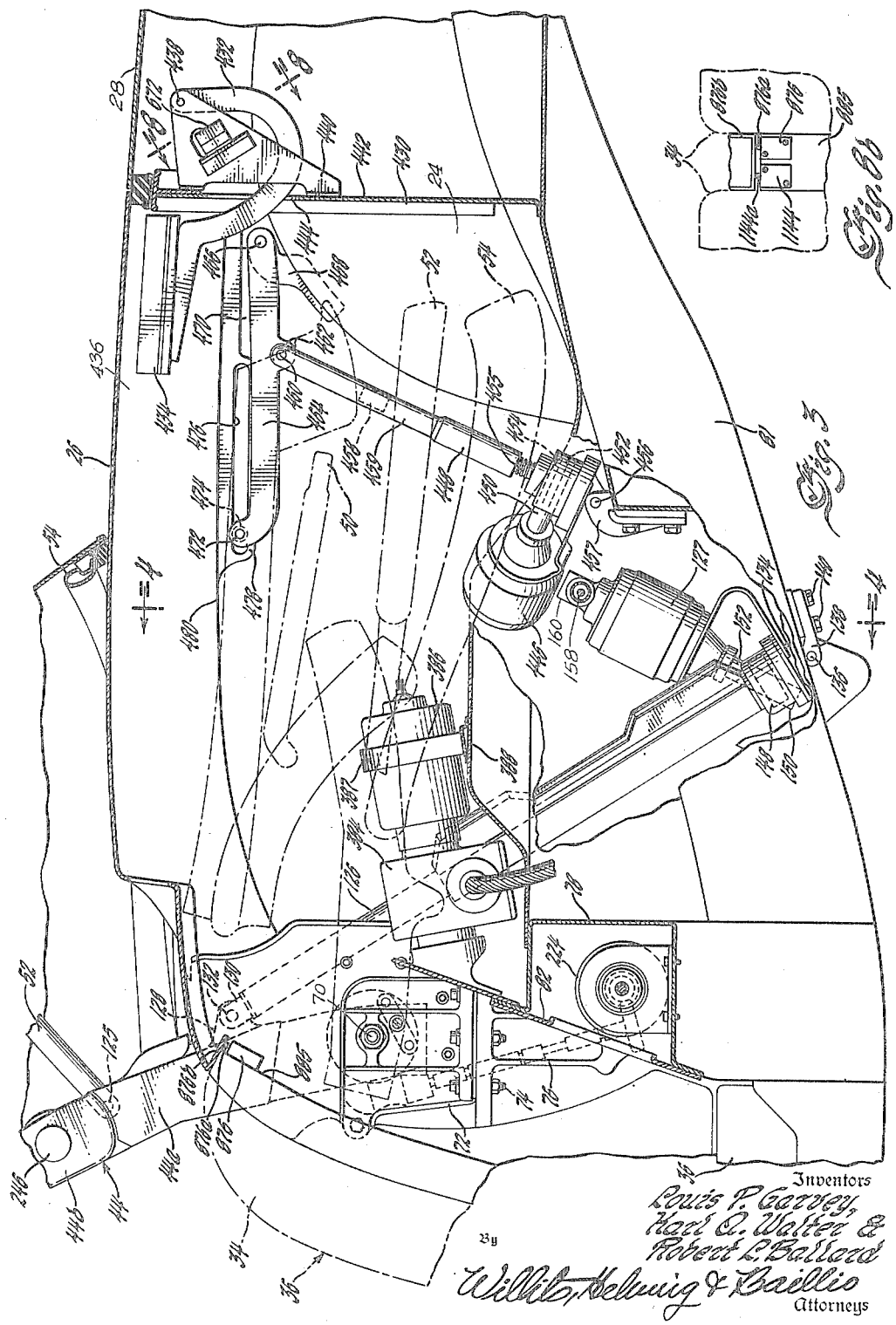

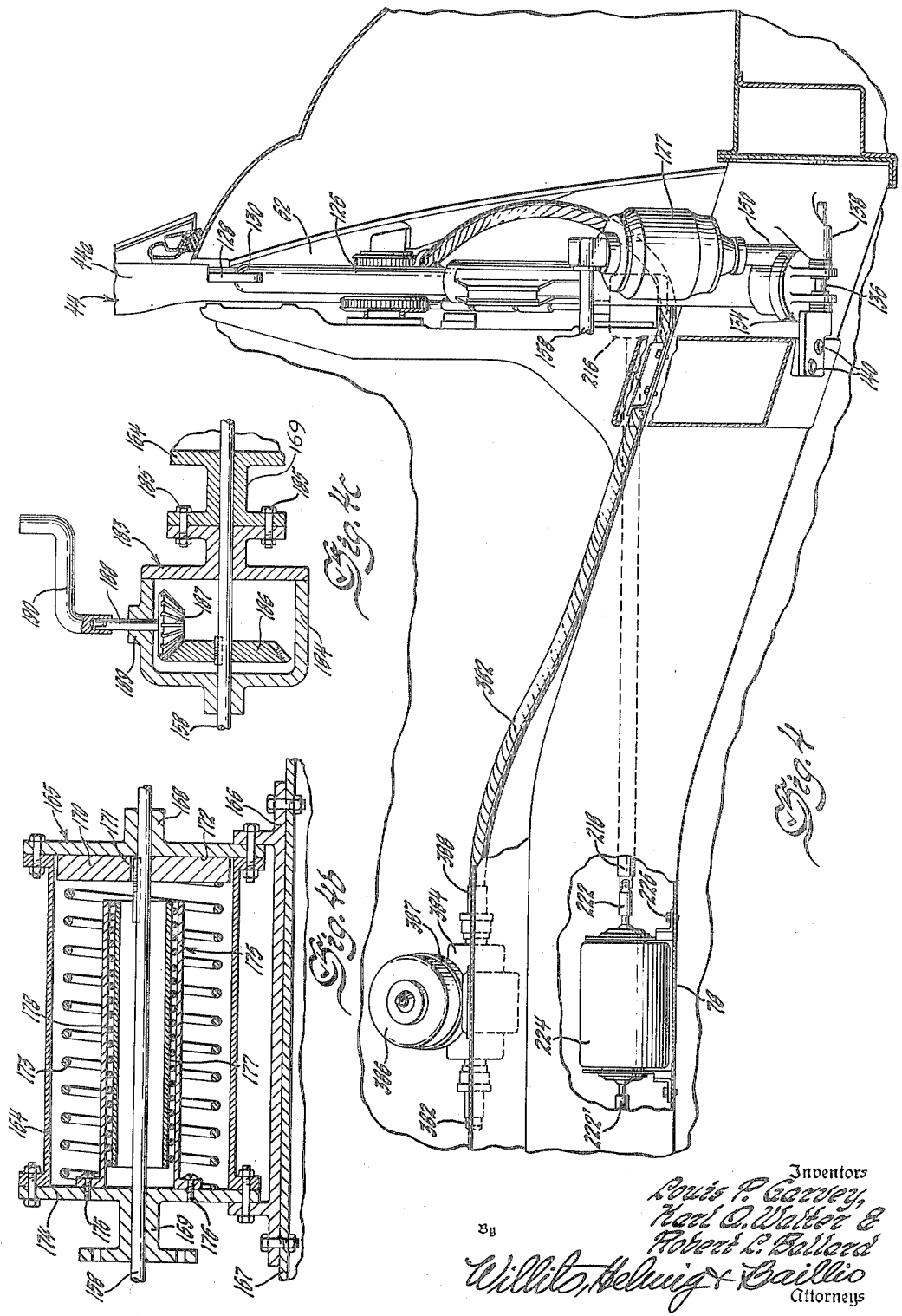

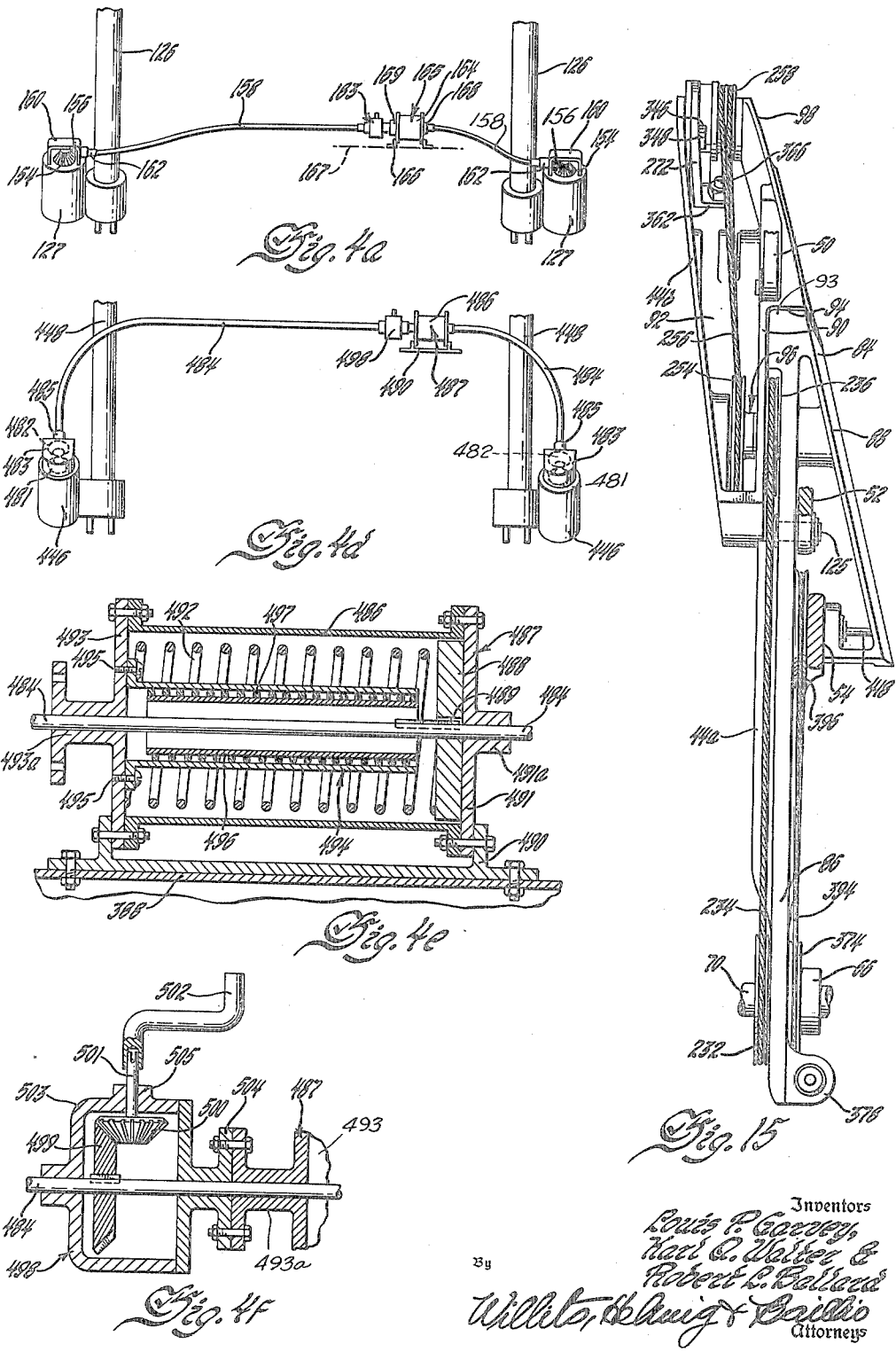

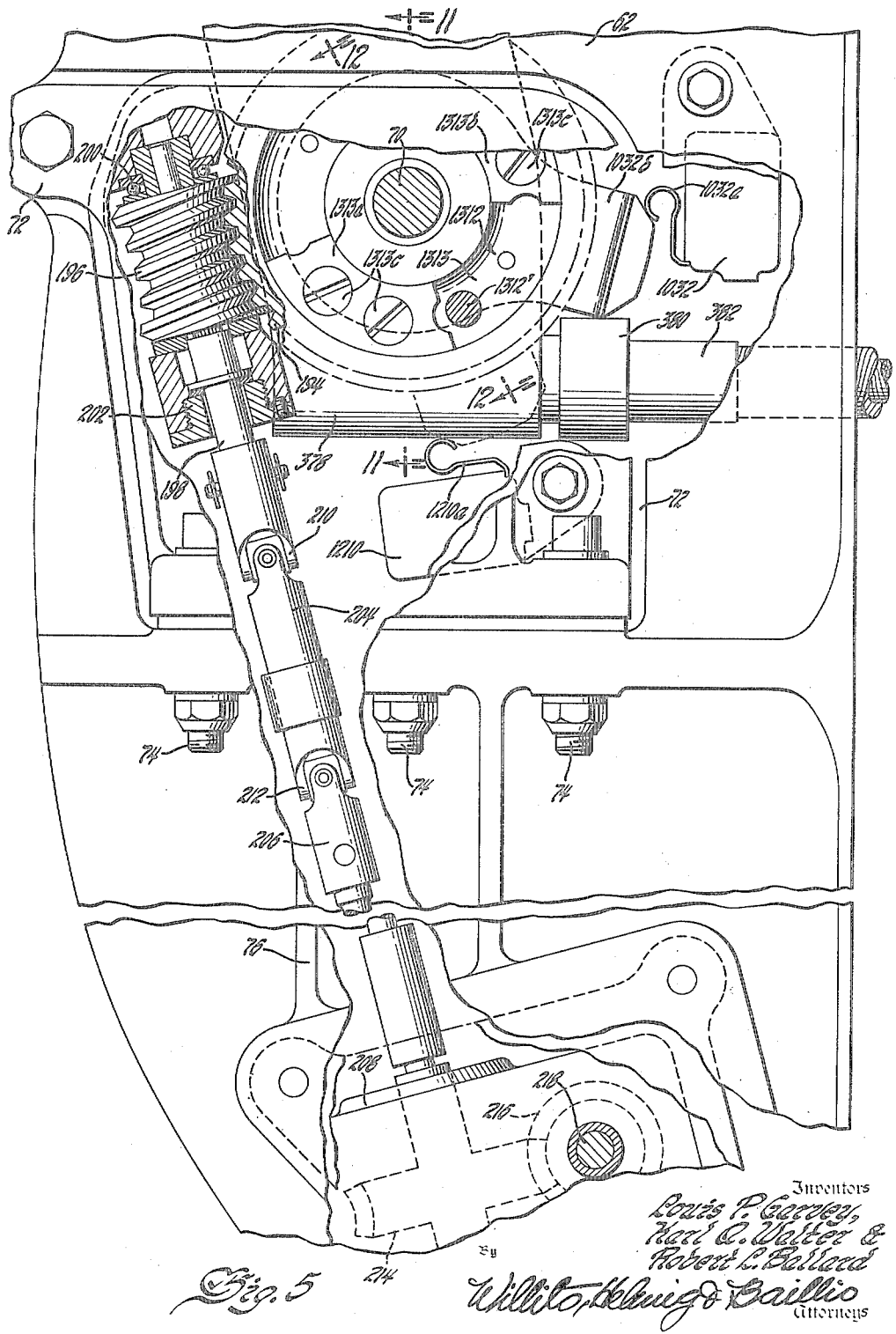

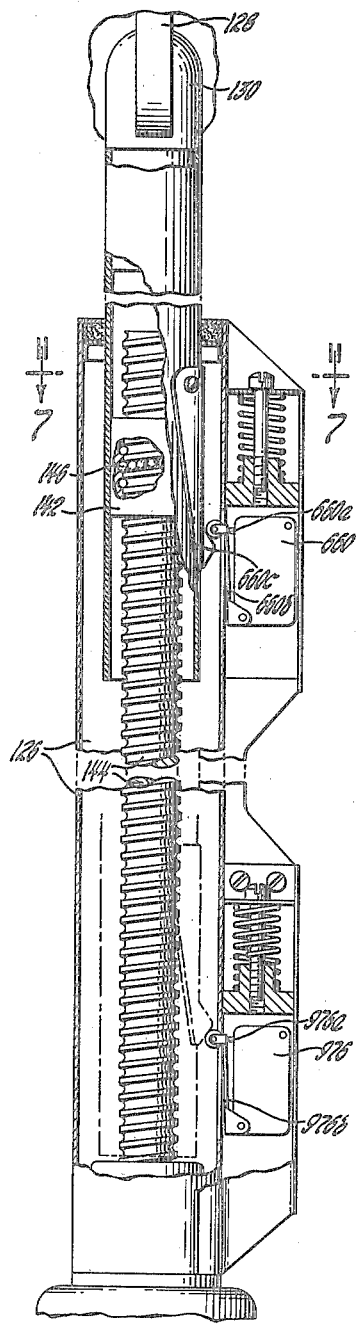

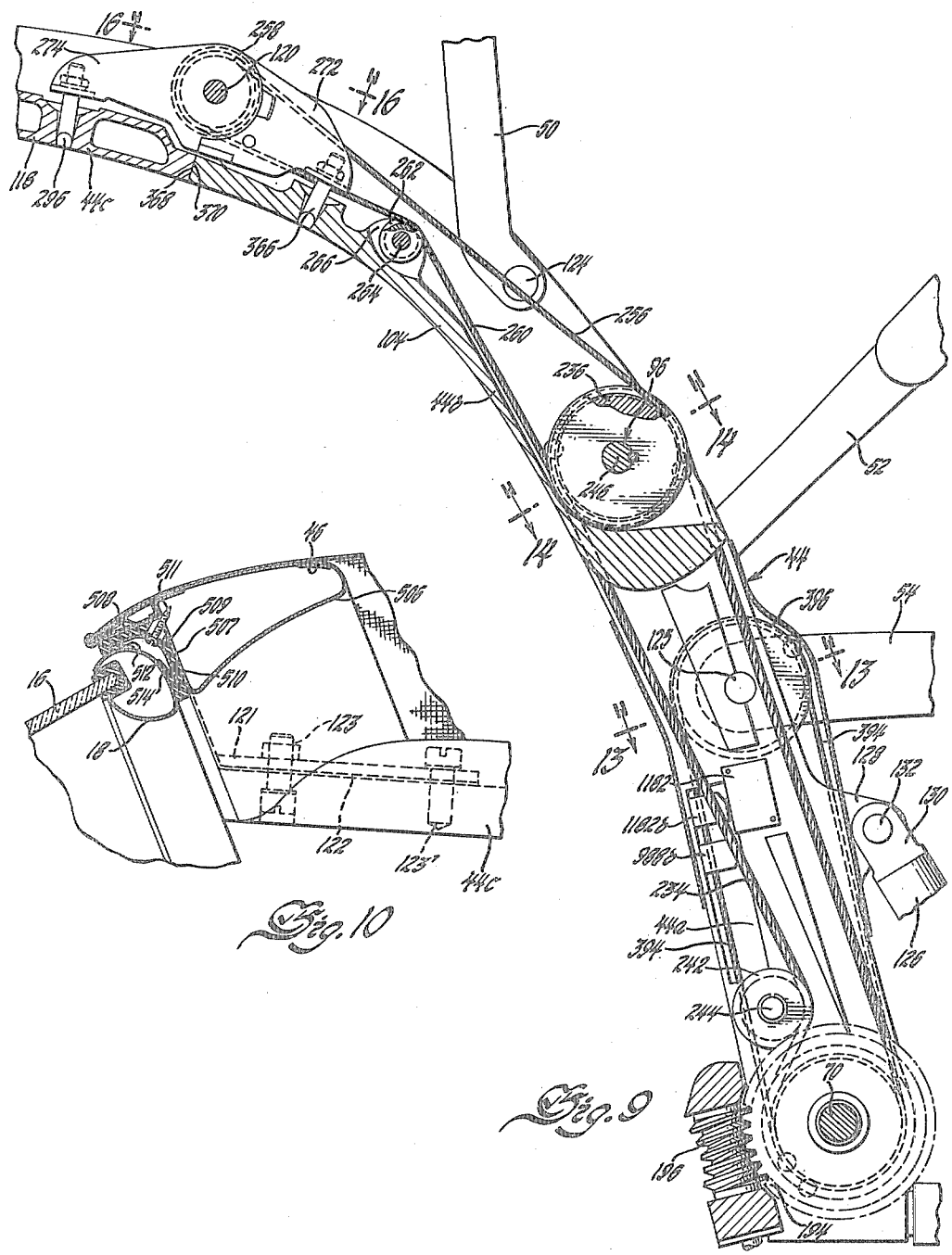

Inventors
Louis P. Garvey,
Karl A. Walter &
Robert L. Ballard
By
Willits, Helwig & Baillio
Attorneys Nov. 13, 1956     L. P. GARVEY ET AL     2,770,489
VEHICLE FOLDING TOP STRUCTURE AND POWER
ACTUATING MEANS THEREFOR Filed Sept. 1, 1951     19 Sheets—Sheet 9

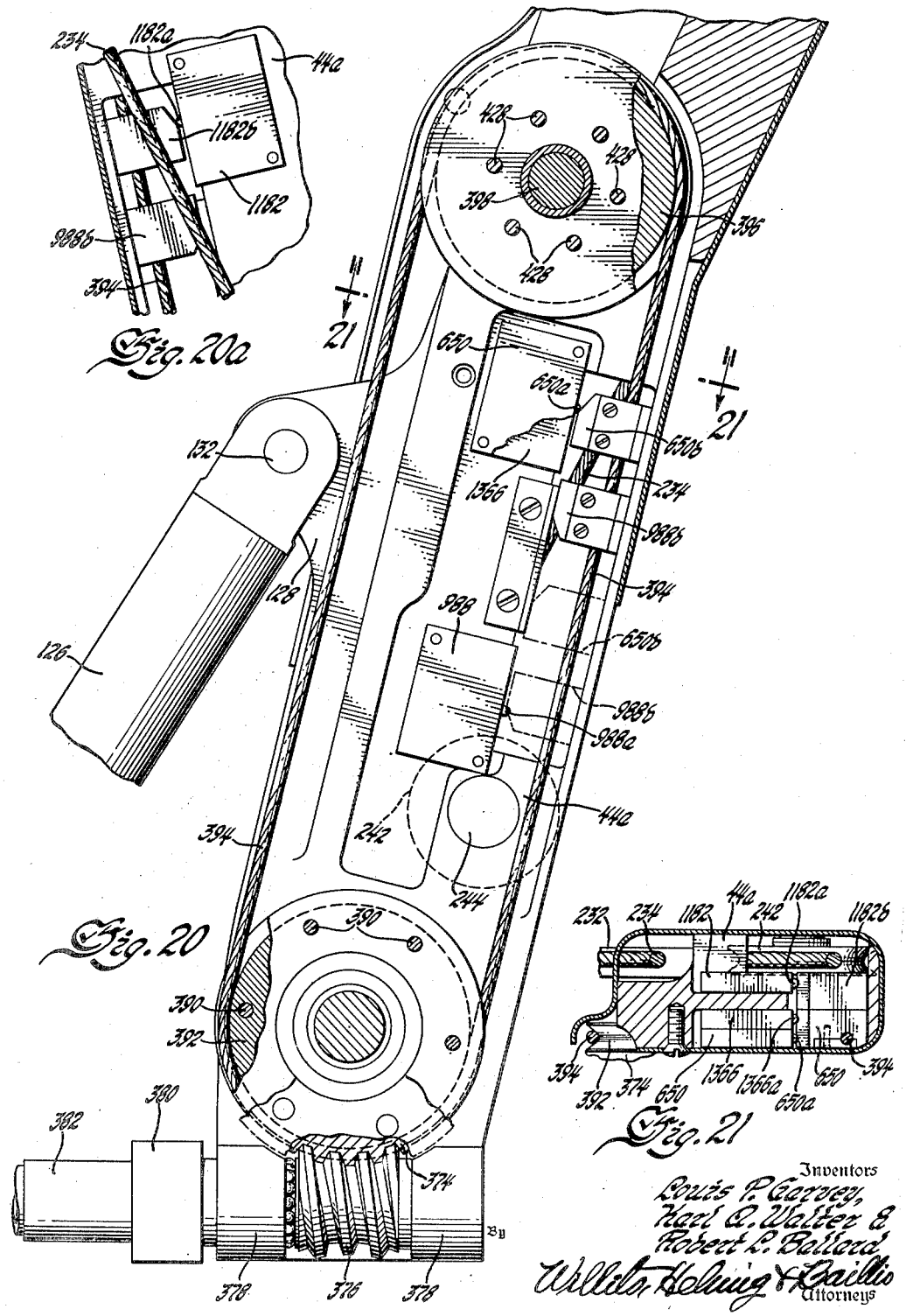

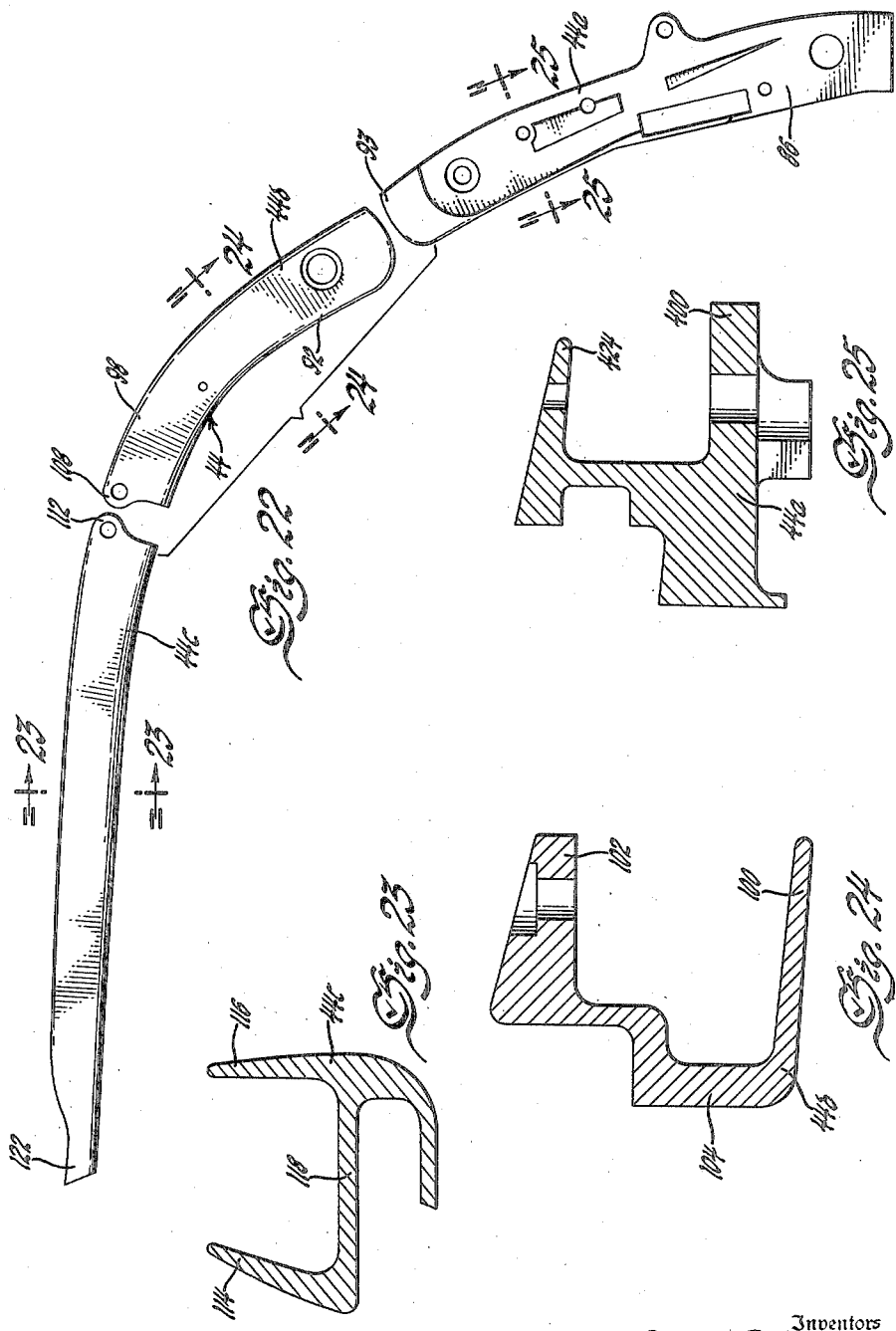

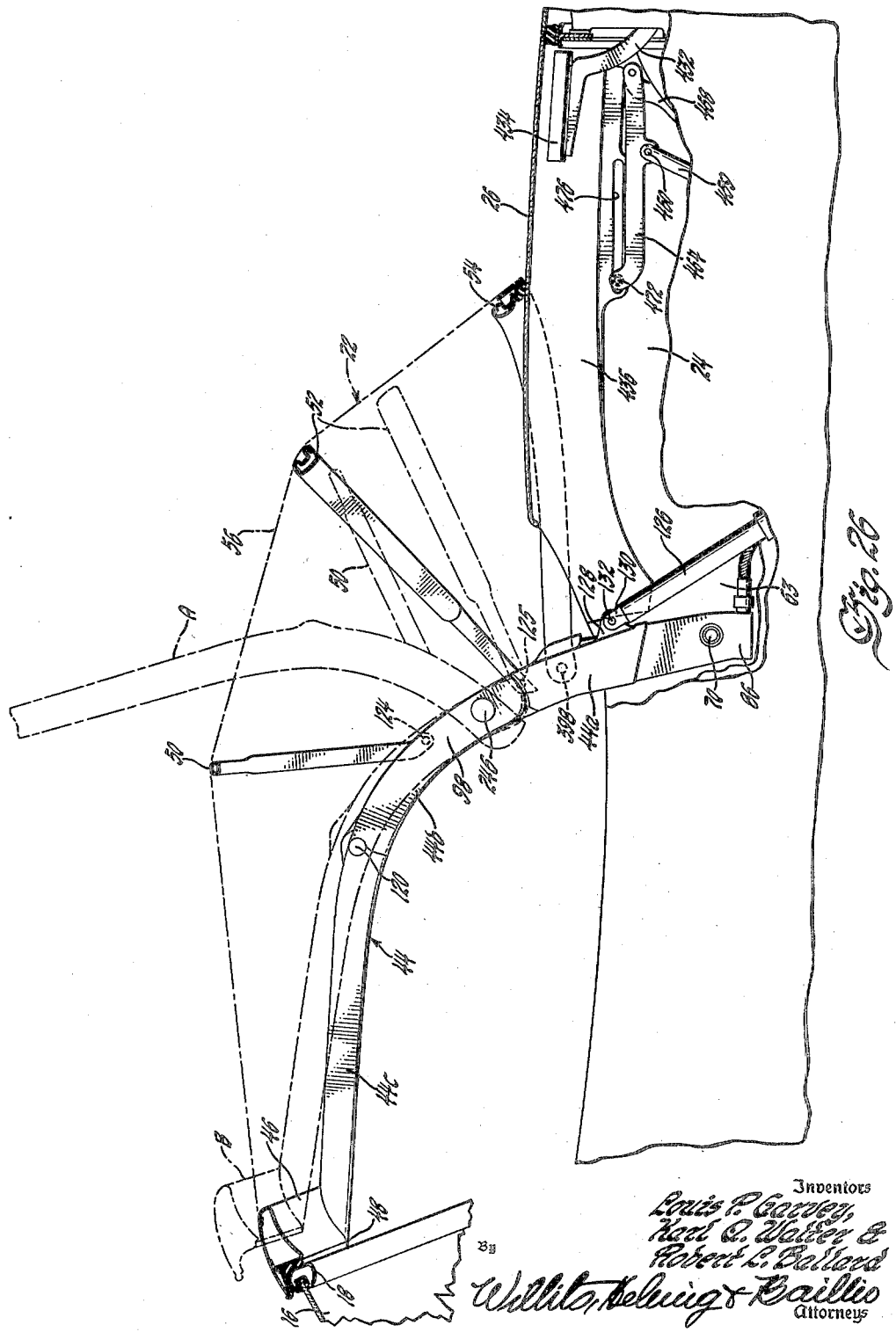

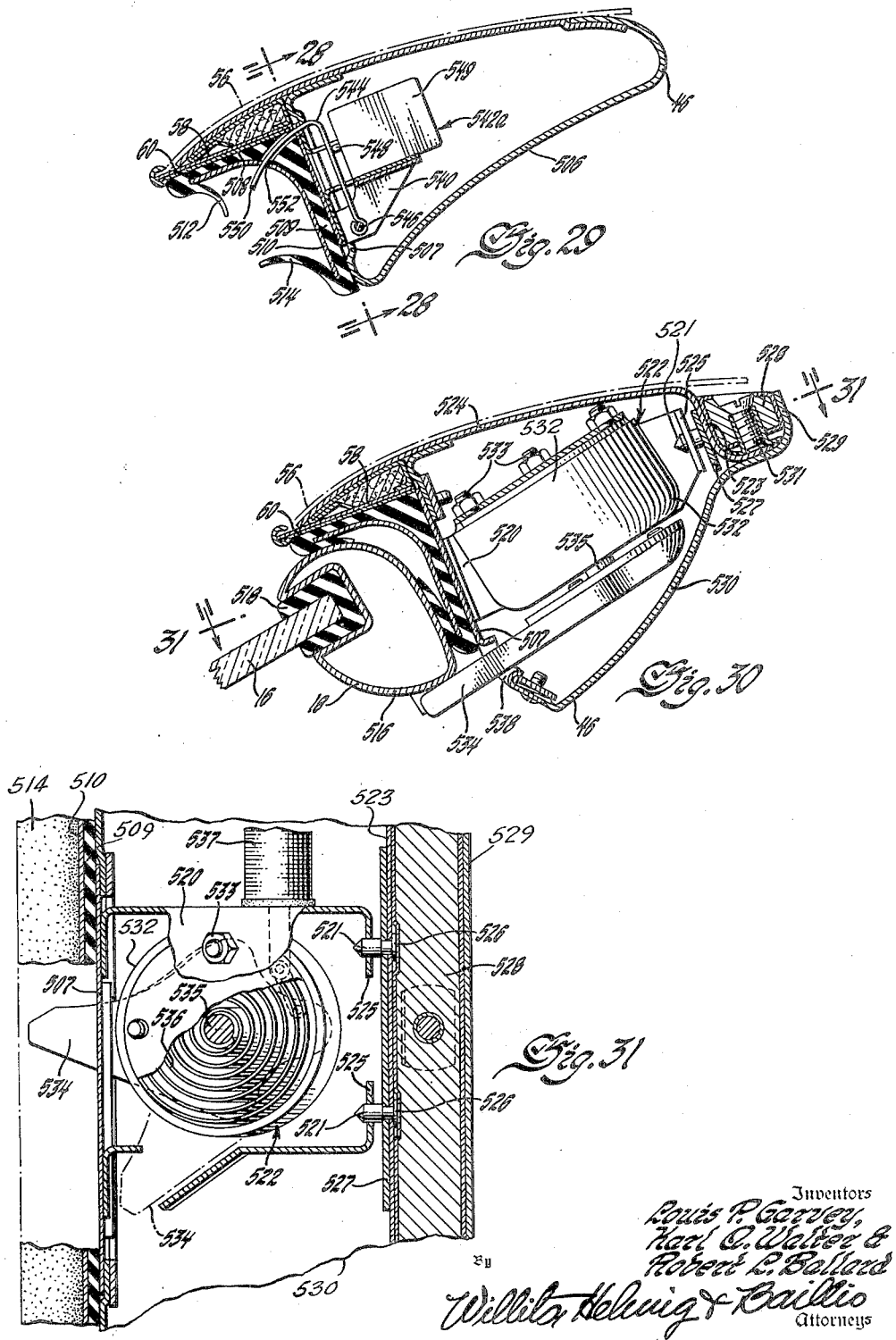

Nov. 13, 1956 L. P. GARVEY ET AL 2,770,489
VEHICLE FOLDING TOP STRUCTURE AND POWER
ACTUATING MEANS THEREFOR
Filed Sept. 1, 1951 19 Sheets-Sheet 15

Inventors
Louis P. Garvey,
Karl O. Walter &
Robert L. Ballard
By Willits, Helwig & Baillio
Attorneys

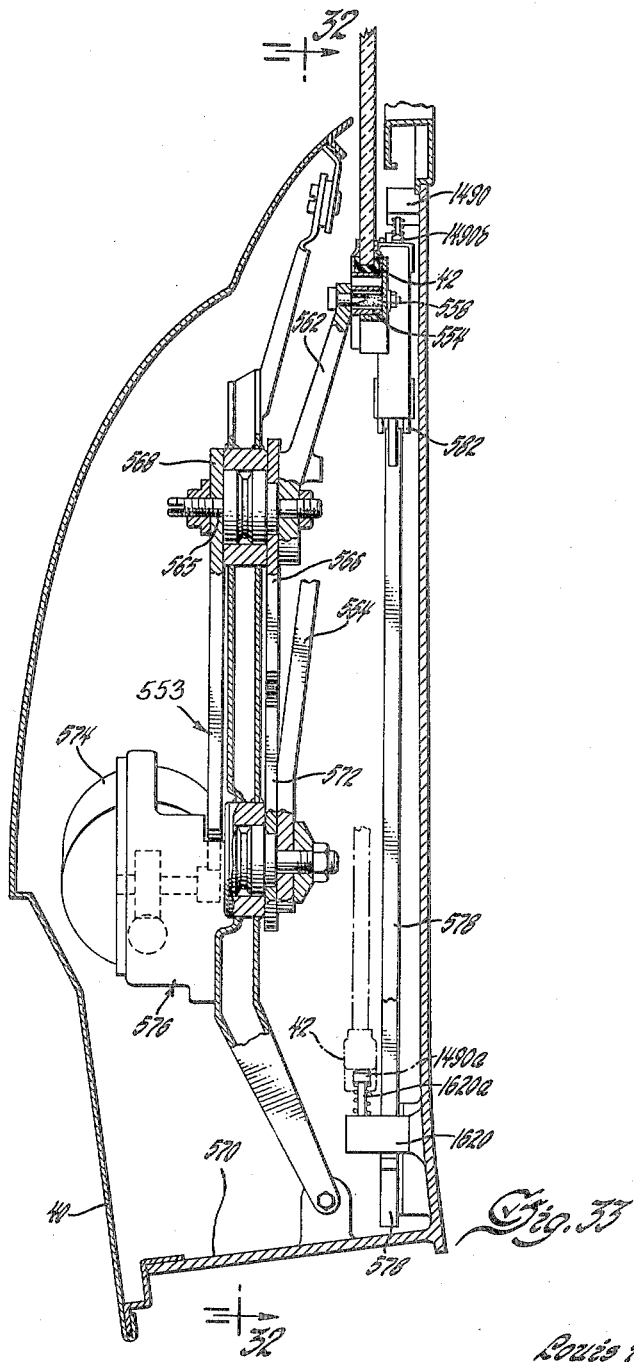

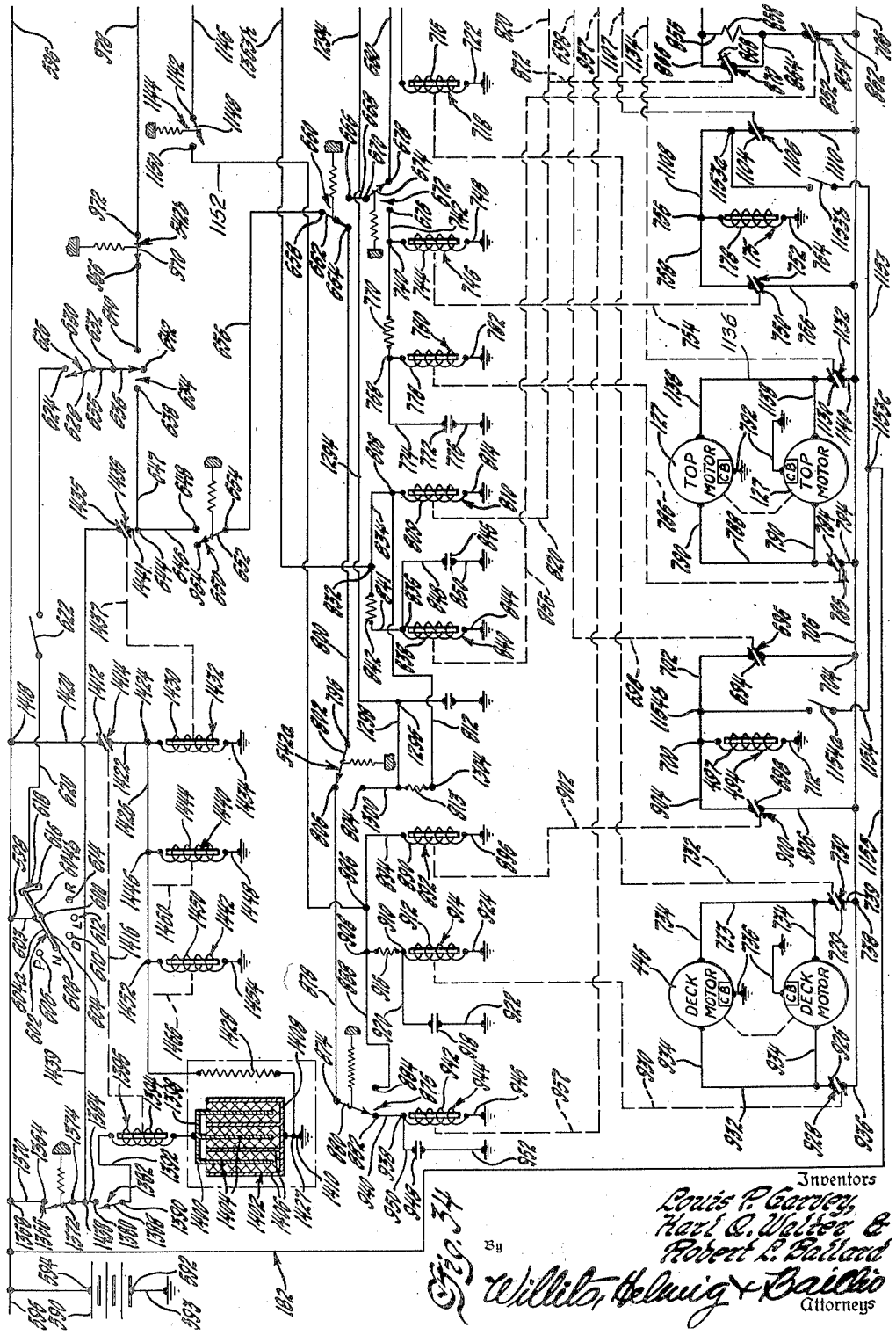

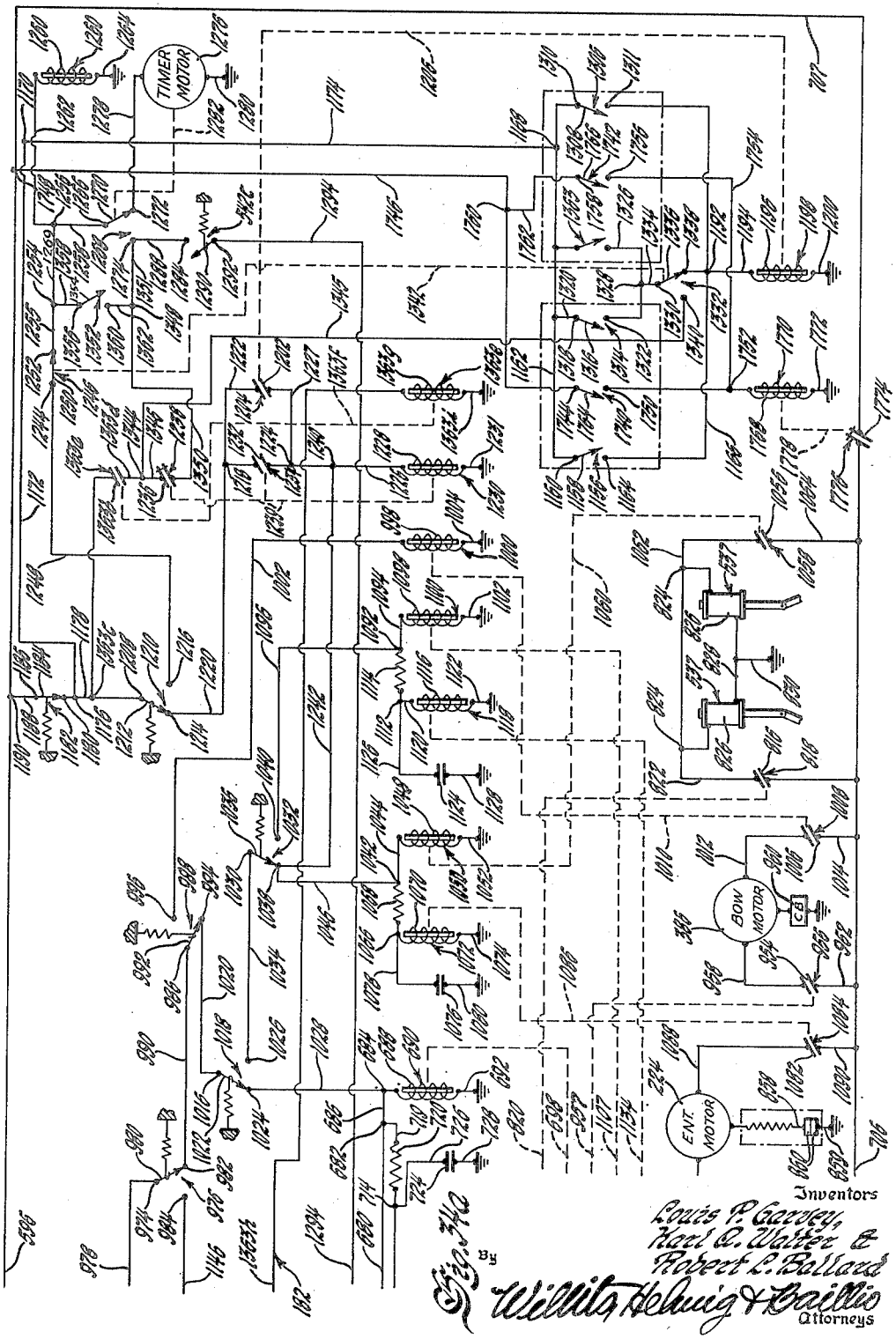

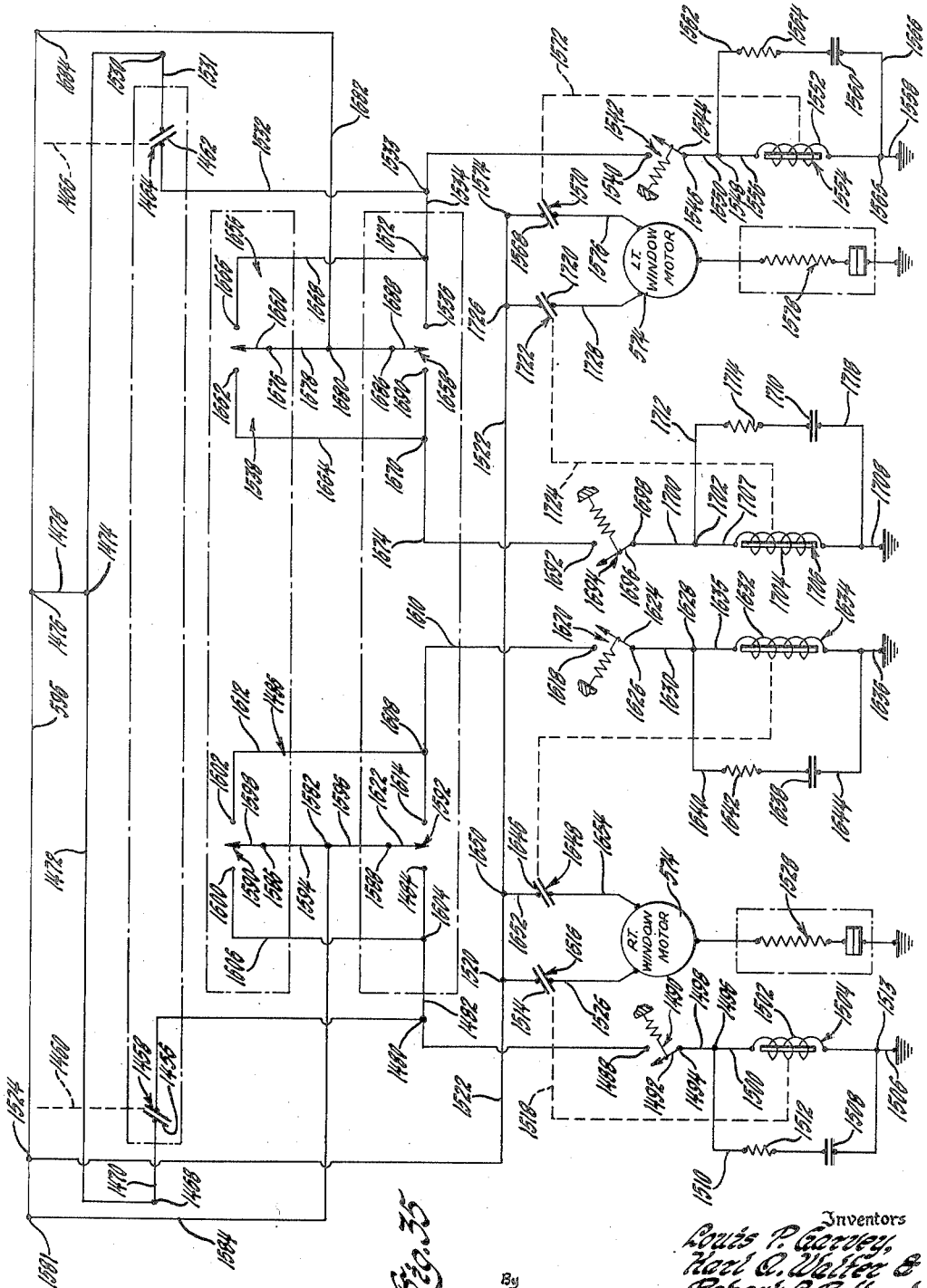

United States Patent Office 2,770,489
Patented Nov. 13, 1956

2,770,489

VEHICLE FOLDING TOP STRUCTURE AND POWER ACTUATING MEANS THEREFOR

Louis P. Garvey, Karl A. Walter, and Robert L. Ballard, Detroit, Mich., assignors to General Motors Corporation, Detroit, Mich., a corporation of Delaware Application September 1, 1951, Serial No. 244,784

52 Claims. (Cl. 296—117)

This invention relates to folding top structures for automotive vehicles and more particularly to the operating mechanisms for actuating such structures to different positions of adjustment and to the control means therefor.

In automotive vehicles of the so-called convertible type, the top structures thereof are usually raised and lowered by power means, the operator of the vehicle simply closing an electric switch or valve to control such operations. In prior structures of this type the top may be completely raised or lowered but no other or special operations thereof may be effected. For example, in the prior constructions no provision is made for automatically raising the top structure in the event of rain and, accordingly, no protection for the interior of the vehicle is afforded under such conditions when the operator is not present. Another feature which is not provided for in the prior constructions is a means for partially moving the top structure to an out-of-the-way position to facilitate entrance to the exit from the vehicle. In most prior constructions, also, the top structure, when in lowered position, is exposed to sight or covered by a fabric cover which obviously detracts from the otherwise streamline appearance of the vehicle.

One object of the present invention is to provide a novel and improved convertible top structure for automotive vehicles which not only eliminates certain objectionable features of prior constructions but which includes additional highly desirable features, thereby greatly enhancing the utility thereof.

Another object is to provide a convertible top structure for automotive vehicles which is completely concealed from view when in lowered position.

A further object is to provide in a convertible top structure a moisture controlled switch mechanism which, in the event of rain, closes the circuit to the power top operating means, thereby causing automatic operation of the said top structure to raised position.

A further object is to provide novel means for swinging the top structure upwardly from its normal raised position to enable expeditious entrance to and exit from the vehicle, said means having time control means associated therewith which operates to cause movement of said top structure to normal raised position after the lapse of a predetermined period of time.

A still further object is to provide an electric control system which, when initially energized by the closing of certain switch means therein operates to cause movement of the top structure from a lowered position in a top storage compartment to fully raised position, and upon closing of certain other switch means to cause movement of the top structure from said normal raised position to a lowered position within said storage compartment.

A still further object is to provide certain novel locking means for effectively holding the top structure in raised position and also for preventing accidental buckling of the sectional top structure side rails.

Other and further objects reside in certain details of construction and arrangement of parts which will become apparent as the description of the invention progresses.

Of the drawings:

Fig. 1 which is a fragmentary view of the upper portion of a motor vehicle showing the folding top structure thereof in its fully raised position.

Fig. 3 is a sectional elevational view taken through the storage compartment for the folding top structure, certain of the parts being broken away to illustrate more clearly the construction of certain of the elements thereof.

Fig. 4 is an end elevational view partly in section, of substantially one-half the vehicle taken substantially along line 4—4 of Fig. 3 and showing certain operating mechanisms associated with the top structure associated with said vehicle.

Fig. 4a is an end elevational view, partly in section, of the operating mechanism for fully raising and fully lowering the top structure.

Fig. 4b is a longitudinal sectional view of the brake mechanism shown in Fig. 4a.

Fig. 4c is a plan view partly in section showing the manual operating mechanism for raising and lowering the top structure.

Fig. 4d is an end elevational view, partly in section, showing the operating mechanism for the deck lid of the vehicle.

Fig. 4e is a longitudinal sectional view of the brake mechanism shown in Fig. 4d.

Fig. 4f is a plan view, partly in section, of the manual operating mechanism for raising and lowering the deck lid.

Fig. 5 is an enlarged view, partly in section, of a portion of the operating mechanism for the top structure and the deck bow means associated therewith.

Fig. 6 is an elevational view, partly in section, of one of the lifting jacks associated with the top operating structure.

Fig. 7 is a sectional view taken substantially along the line 7—7 of Fig. 6.

Fig. 8 is a view, partly in section, of one of the limit switches associated with the deck lid and mounted adjacent one of the hinges thereof, said view being taken substantially along line 8—8 of Fig. 3.

Fig. 8a is a similar view showing a second limit switch mounted adjacent the other of the hinges of the deck lid.

Fig. 8b is a fragmentary elevational view showing an additional pair of limit switches associated with the deck lid.

Fig. 9 is a side elevational view, partly in section, showing the operating connections mounted in the side rails of the top structure for effecting certain operations thereof.

Fig. 10 is a sectional view taken through a portion of the windshield and the header end of the top structure, showing the arrangement of certain parts thereof when the folding top structure is in raised position.

Fig. 15 is an end elevational view of the lower rail section and the intermediate rail section of the top structure and certain of the operating connections associated therewith, certain of the parts being removed therefrom to more clearly illustrate the structure thereof.

Fig. 16 is a fragmentary plan view of a portion of the intermediate and front rail sections showing certain elements of the latch mechanism associated therewith, said view being taken substantially along line 16—16 of Fig. 9.

Fig. 17 is a sectional view taken substantially along line 17—17 of Fig. 16.

Fig. 18 is a sectional view taken substantially along line 18—18 of Fig. 17.

Fig. 19 is a sectional view taken substantially along line 19—19 of Fig. 17.

Fig. 20 is a side elevational view of a portion of one of the lower rail sections showing certain operating mechanisms associated therewith, certain of the parts thereof being shown in section and certain parts being broken away to more clearly illustrate the structure thereof.

Fig. 20a is a fragmentary elevational view, partly in section, of the bow limit switch and the operating means therefor.

Fig. 21 is a sectional view taken substantially along the line 21—21 of Fig. 20.

Fig. 22 is a side elevational view of the three sections of one of the side rails of the top structure, the ends of said section being spaced apart to more clearly show the structure thereof.

Fig. 23 is a sectional view taken substantially along line 23—23 of Fig. 22.

Fig. 24 is a sectional view taken substantially along line 24—24 of Fig. 22.

Fig. 25 is a sectional view taken substantially along line 25—25 of Fig. 22.

Fig. 26 is a side elevational view of a portion of the vehicle showing the top structure thereof in fully raised position, certain parts being shown in section and other parts being broken away to more clearly illustrate certain features of construction thereof.

Fig. 29 is a sectional view taken substantially along line 29—29 of Fig. 28, showing one of the limit switches and the operating mechanism associated therewith.

Fig. 30 is a sectional view taken substantially along line 30—30 of Fig. 28, showing the structure of one of the latch mechanisms for the top structure.

Fig. 31 is a sectional view taken substantially along line 31—31 of Fig. 30 with certain parts broken away to more clearly illustrate the structure thereof.

Fig. 33 is an end view partly in section of the operating mechanism shown in Fig. 32.

Fig. 34 is a portion of the wiring diagram of the electrical control circuit for the various actuating elements and control switches for the top structure.

Fig. 34a is a second portion of the wiring diagram shown in Fig. 34, and

Fig. 35 is a wiring diagram of the electrical control circuit for the window operating mechanisms of the vehicle.

General

Figure 1:
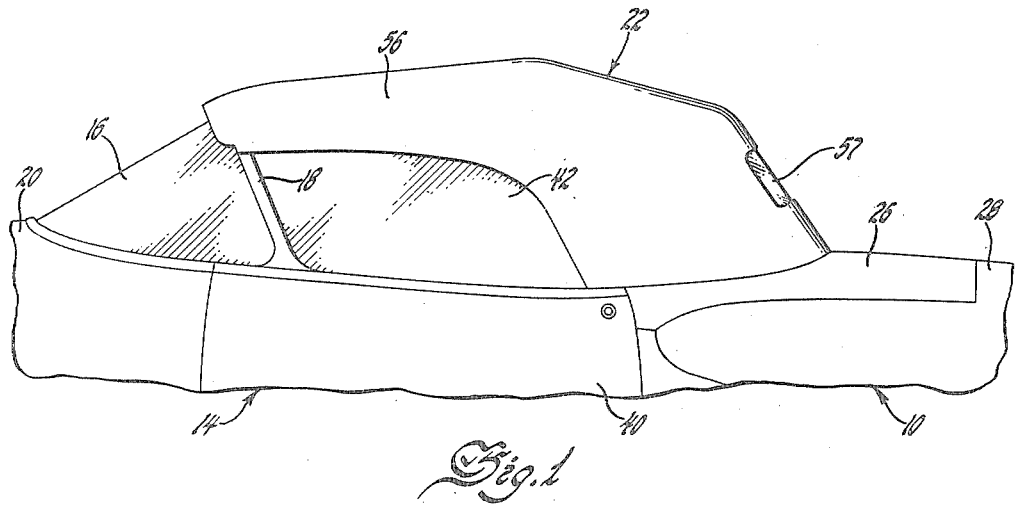
Figure 2:
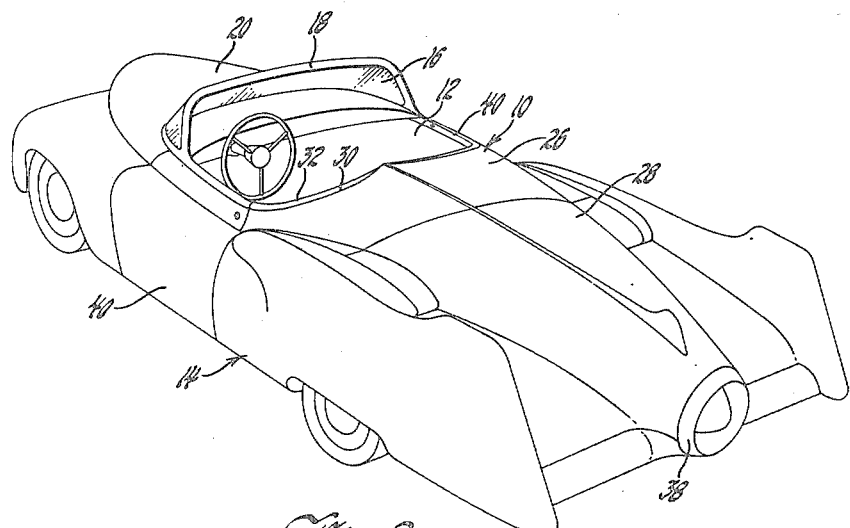
Fig. 2 is a perspective view of the motor vehicle illustrated in Fig. 1, showing the arrangement of elements thereof when the top structure is in its fully lowered position.

Referring to the drawings, the numeral 10 designates generally an automotive vehicle of the so-called convertible type having the usual control and driving mechanisms as well as the accommodations provided in road vehicles including a passenger compartment 12 disposed in the body 14 thereof. A transparent windshield 16 mounted in a metallic frame 18 is supported in the usual manner on the cowl 20 in front of the passenger compartment 12. Vehicle 10 is provided with a top structure 22 which is adapted for adjustment from fully raised position as shown in Fig. 1 to fully lowered position within a storage compartment 24 disposed behind the passenger compartment 12, as shown by broken lines in Fig. 3. A deck lid 26 flush with rear deck 28 of the body 14 conceals the top structure when the latter has been actuated to its lowered position. As shown in Fig. 2, the front end 30 of deck lid 26 is curved so as to conform with the curvature of the moulding 32 disposed directly behind the back cushion 34 of the seat 36 provided in passenger compartment 12. The rear deck 28 and deck lid 26, thus, present a smooth substantially continuous surface from the rear of seat 36 to the rearmost end 38 of the vehicle. Body 14 is provided with a swinging door 40 at either side of compartment 12, each door having a slidably mounted window 42 provided therein. Thus, when the top structure 22 is in raised position and the sliding windows 42 are closed, the passenger compartment 12 of the vehicle is completely enclosed.

Vehicle top structure

The top structure 22 comprises a pair of sectional side rails 44, a transverse header 46 connected to and extending between the front ends 48 of said side rails, a pair of floating bow members 50 and 52, a deck bow 54 and a fabric top 56 having a rear window 57 provided therein. Fabric top 56 is secured to the flat upper frame member 58 of header 46 by clinching the forward edge of a companion frame member 60 over the fabric and into gripping engagement with the said frame member 58, as shown in Figs. 29 and 30. The fabric top 56 is stretched over bow members 50 and 52 and secured thereto in any suitable manner. The rearmost end of the fabric top is also secured in any suitable manner to deck bow 54. The side edges of the fabric top 56 are attached by any suitable means to the side rails 44.

The lower ends of rails 44 extend into wells 63 provided adjacent the outer sides of the back cushion 34 of seat 36 and are pivotally supported at their lower ends on certain supporting structure, as will fully appear later herein. Each of the side rails 44 consists of three sections, a lower, or rear section 44a, an intermediate section 44b and a front or upper section 44c. Inasmuch as each side rail 44 is of substantially identical construction, a detailed description of only one will be given herein. As shown more particularly in Fig. 11, rear rail section 44a is provided with a hub or boss portion 66 near the lower end thereof in which is journalled a shaft 70 by means of a roller bearing 68 and a sleeve 69. As shown more particularly in Figures 3 and 11, shaft 70 is mounted at one end in a supporting bracket 72 secured by bolts 74 or any other suitable means to a second bracket 76 which in turn is secured to a cross-frame member 78. The other end of shaft 70 is mounted in an adjustable support 79 provided on the outer wall 80 of well 63. Frame member 78 may be secured to the longitudinally extending side rails 81 of the frame or chassis of vehicle 10. A transverse, division wall 82 disposed immediately behind the back cushion 34 of seat 36 is also secured to frame member 78 as shown in Fig. 3.

Section 44a as shown more clearly in Fig. 15, comprises a substantially triangular upper portion 84 and a reduced lower portion 86, the latter portion having the hub or boss portion 66 formed thereon, as previously described. The inclined side face 88 of upper portion 84, in assembly, lies in substantially juxtaposed relation with an inclined face 90 provided on the downwardly tapering reduced lower portion 92 of intermediate rail section 44b. The upper end 93 of section 44a lies adjacent to a shoulder 94 formed on section 44b. Sections 44a and 44b are pivotally connected, as shown at 96, so that the top structure 22 may be folded during movement thereof to its raised and lowered position, as will appear more fully hereinafter.

The front or upper portion 98 of section 44b is of substantially channel shaped construction having a pair of spaced flanges 100 and 102 which are connected by a web 104, as shown in Figs. 16 and 24. Flanges 100 and 102 are provided with apertured ears 106 and 108, respectively, at the front end thereof which are adapted to align with ears 110 and 112 provided on the flanges 114 and 116, respectively, of front rail section 44c. Flanges 114 and 116 are connected by a web 118 as shown in Figs. 16 and 23. A bolt 120 extending through the apertures formed in ears 112, 108, 110, and 106 pivotally connects the rail sections 44b and 44c at the abutting ends thereof, as shown more particularly in Figs. 16 and 27.

Header 48 has provided at each end thereof a flat supporting member 121 which rests upon the flat portions 122 provided at the front ends of rail sections 44c and are secured to rail sections 44c by bolts 123 and machine screws 123', as shown in Fig. 10.

The opposite ends of floating bows 50 and 52 are pivotally mounted on pins 124 and 125 secured to the sides of the intermediate and rear rail sections of side rails 44.

*Operating mechanism for top structure*

The top structure 22 as shown more particularly in Figs. 3, 4 and 6 is raised and lowered by a pair of widely spaced ball screw type of lifting jacks 126 driven by a pair of electric motors 127. Lower section 44a of each side rail 44 has provided thereon an apertured ear 128 which is straddled by the upper bifurcated end 130 of jack 126. A bolt 132 extending through aligned apertures provided in the bifurcated end 130 of jack 126 and ear 128 pivotally secures the parts in position. The lower end 134 of jack 126 is pivotally supported on a pin 136 mounted in a bracket 138 which in turn is secured by bolts 140, or any other suitable means, to side frame rail 81. The nonrotatable nut 142 of jack 126 is axially movable along screw shaft 144 and is secured to the upper end 130 of said jack by any suitable means. The cooperating threads of nut 142 and screw shaft 144 form a ball race for a series of antifriction balls 146. Each screw shaft 144 has secured to the lower end thereof a worm wheel 148 which meshes with a worm 150 secured to the shaft 152 of motor 127.

The upper end of motor shaft 152 has provided thereon a bevel gear 154 which meshes with a bevel gear 156 secured to a flexible shaft 158. Bevel gears 154 and 156 are mounted in a casing 160 secured to the upper end of the casing of motor 127. The end of each shaft 158 is mounted in a bearing 162 secured to casing 160.

The opposite ends of shafts 158, 158 are secured together in any suitable manner and extend into the casing 164 of a brake 165 mounted in any suitable manner on bracket 166 which in turn is secured to cross supporting frame member 167. Shafts 158, 158 are journaled in bearings 168 and 169 provided at the opposite ends of casing 164, as shown more particularly in Figs. 4a and 4b. Brake 165 comprises a slidably mounted brake disk 170 secured to shaft 158 by a key 171. The outer surface of brake disk 170 is adapted to engage the inner surface of end wall 172 of casing 164 and is adapted to be urged into frictional engagement with said wall by a spring 173. As shown in Fig. 4b, spring 173 extends between brake disk 170 and the other end wall 174 of casing 164. A solenoid 175 is secured to end wall 174 of casing 164 by means of machine screws 176 or by any other suitable means. Solenoid 175 surrounds shaft 158 and one end of the core 177 thereof is disposed adjacent to the inner surfaces of brake disk 170. The coil 178 of solenoid 175 is connected into the electric circuit 182 and the means for controlling the operation thereof will be described in detail later herein. It therefore is seen that upon energization of the coil 178 of solenoid 175 brake disk 170 will move out of engagement with the inner surface of casing end wall 172, thereby releasing the shaft 158 for actuation by motors 127. Upon de-energization of the solenoid 175, spring 173 immediately urges brake disk 170 into frictional contact with wall 172, thus applying the brake and preventing over-travel of motors 127 when the circuit thereto has been interrupted.

A manually operable adapter 183 is also provided to afford manual actuation of the top structure 22 should the electric power of the vehicle fail. As shown in Figs. 4c, adapter 183 comprises a casing 184 secured by bolts 185, or by any other suitable means, to the flange at the end of the bearing 169 of brake casing 164, a bevel gear 186 secured to one of the flexible shafts 158, a second bevel gear 187 meshing with gear 186 and a shaft 188 secured to bevel gear 187. Shaft 188 is journaled in a bearing boss 189 provided in casing 184. The outer end of shaft 188 is so formed as to receive a hand crank 190 to enable manual operation of shafts 158 through the bevel gears 186 and 187. When not in use the crank 190 may be removed from shaft 188.

Thus, as will appear more fully hereinafter, upon operation of electric motors 127 or adapter 183 in one direction the top structure 22 will be actuated from the lowered position thereof shown in broken lines in Fig. 3 to the partially raised position, shown in broken lines at B in Fig. 26, and upon operation of said motors or the adapter in the reverse direction the top structure will be returned to the lowered position shown in broken lines in Fig. 3.

*Partial top operating mechanism*

Figure 11:
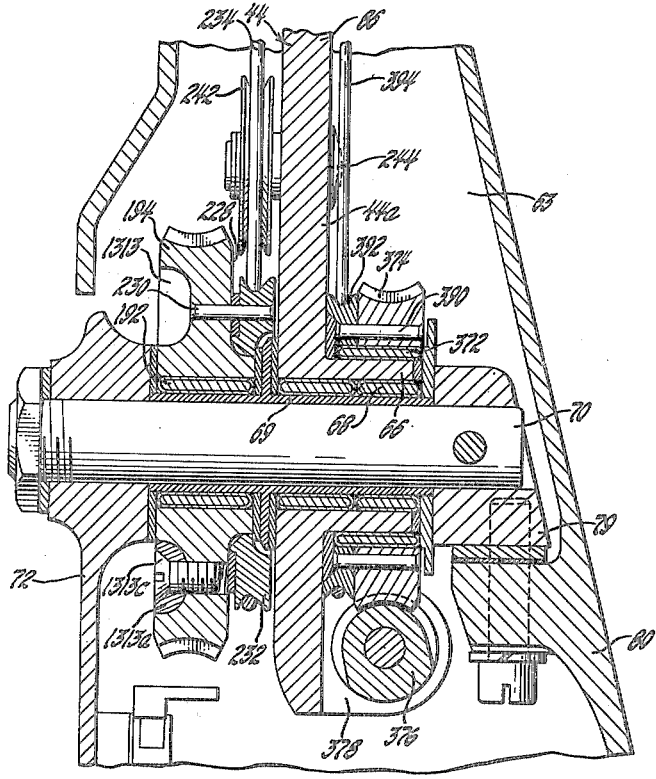
Fig. 11 is a sectional view taken substantially along line 11—11 of Fig. 5.

Mechanism is also provided to partially raise the top structure 22 to permit ready entrance to or exit from the vehicle. Referring more particularly to Figs. 5 and 11 sleeve 69 has journaled thereon by means of a roller bearing 192 a worm wheel 194 which meshes with a worm 196 secured to the upper end of a shaft 198 journaled in any suitable manner in a thrust bearing 200 and plain bearing 202 provided in bracket 72. The lower end of shaft 198 is connected by a link 204 to the upper end of a shaft 206 journaled in a bearing 208 provided in bracket 76. Link 204 is connected to shafts 198 and 206 by means of universal connections 210 and 212, as shown more clearly in Fig. 5. Shaft 206 has secured near the lower end thereof in any suitable manner, a worm wheel 214 which meshes with a worm 216 which in turn is secured to a shaft 218. Shaft 218 is journaled in bearings provided in supporting bracket 76, which as previously described is secured to cross frame member 78. Shaft 218 is connected to the armature shaft 222 of an electric motor 224 secured by bolts 226 or by any other suitable means to cross frame member 78 at a point substantially midway between the sides of the vehicle. A similar shaft 218 is connected to the opposite end 222' of the armature shaft 222 and has secured to the end thereof a worm 216 similar to the worm 216 just described. The operating connections extending from worm 196 to motor 224 are the same for each side rail 44 and, accordingly, a detailed description of only one will be given herein. Suffice it to say, that upon operation of motor 224, the worm gears 194 mounted adjacent each of the side rails 44 will be simultaneously operated to effect certain operations of the top structure 22 as will appear more fully later herein.

Figure 14:
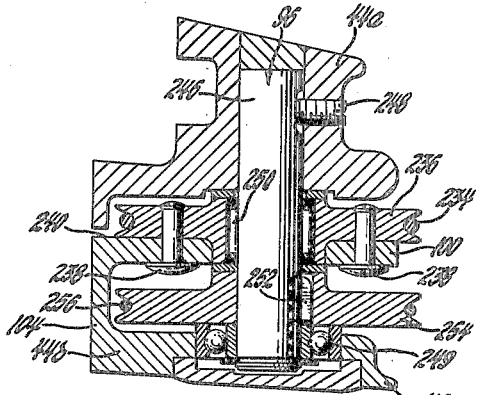
Fig. 14 is a sectional view of certain of the operating connections for the top structure, taken substantially along line 14—14 of Fig. 9.

Worm wheel 194 has secured to the inner side 228 thereof in any suitable manner, such as by rivets 230, a pulley 232. Pulley 232 has trained thereover a cable 234 which extends around a second pulley 236 secured by means of rivets 238, as shown in Fig. 14, to the outer surface 240 of the flange 100 of intermediate rail section 44b. One run of cable 234 extends over a small idler pulley 242 rotatably mounted on a pin 244 secured in any suitable manner to the lower reduced portion 86 of rail section 44a, as shown in Figs. 9 and 11.

Referring to Fig. 14, the pivotal connection 96 between rail sections 44a and 44b comprises a pin 246 secured by means of a set screw 248 to rail section 44a. The opposite end of pin 246 is journaled in a ball bearing 249 mounted in an opening provided in the flange 102 of intermediate rail section 44b. Pulley 236 is journaled on pin 246 by means of a roller bearing 250. Disposed between the flanges 100 and 102 of intermediate rail section 44b and secured to pin 246 by means of a key 252 is a pulley 254. Pulley 254 has trained thereover a cable 256 which also extends over a pulley 258 mounted on the pin 120 which pivotally connects intermediate and front sections 44b and 44c.

The lower run 260 of cable 256 extends over an idler pulley 262 rotatably mounted on a pin 264 secured in any suitable manner in apertures provided in ears 266 integral with and extending upwardly from the web 104 of intermediate rail section 44b.

From the foregoing description it is seen that upon operation of electric motor 224 when top structure 22 is in its raised position, by virtue of pulleys 232 and 236 and cable 234, intermediate rail section 44b will be swung upwardly about pin 246 carrying front rail section 44c with it to a substantially vertical position, as shown by broken lines at large A in Fig. 26.

*Latch mechanism for top rail sections*

In order to prevent relative pivotal movement between intermediate rail section 44b and upper rail section 44c these rail sections are in raised position, as shown in broken lines at A in Fig. 26, a latch mechanism 270 shown more particularly in Figs. 9 and 16 to 19 has been provided. Latch mechanism 270 comprises generally, pulley 258, latch and striker arms 272 and 274, respectively, a sliding latch bolt 276, a latch operating dog 278, a dog operating cam 280, arcuate flanges 282 and 284 and a bolt actuating spring 286. The flanges 282 and 284, as well as cam 280, are integral with, or otherwise rigidly connected to, pulley 258. Striker arm 274 is provided with an aperture 288 for receiving the pin 120 forming the pivot for rail sections 44b and 44c and lies closely adjacent the inner side of the flange 102 of intermediate rail section 44b. The forward end 290 of arm 274 is provided with a laterally extending flat portion 292 having an elongated opening 294 provided therein for receiving a clamp bolt 296 which slidably attaches the said arm to the web 118 of rail section 44c. Arm 274 has secured thereto and extending inwardly from points disposed at opposite sides of the opening 288 therein, a pair of projections 300 and 302 having arcuate outer surfaces 304 and 306, respectively, which are disposed in substantially concentric relation with said opening and pin 120. The inner substantially flat ends 308 and 310 of projections 300 and 302, respectively, lie in abutting relation with the inner flat surface 312 of pulley 258. As shown more particularly in Figs. 17 and 18, the outer arcuate surfaces 304 and 306 of projections 300, 302, respectively, telescopically engage the inner surfaces of flanges 282 and 284 and also the inner surface of cam 280. The flanges 282 and 284 and cam 280, therefore, form in effect a socket 314 and provide a pivotal connection between arm 274 and pulley 258. Projections 300 and 302 are spaced apart, as shown more clearly in Figs. 17 and 18, and form a chamber 316 therebetween for receiving the bolt 276. The inner surfaces 318 and 320 of projections 300 and 302 are relatively flat and form guiding surfaces for the upper and lower surfaces of bolt 276. Bolt 276 is provided with an elongated slot 322 centrally thereof through which pin 120 extends. As shown in Fig. 19, bolt 276 is disposed in substantially abutting relation with the inner surface 324 of arm 274 and the inner surface 312 of pulley 258. Extending rearwardly from the inner surface 326 of bolt 276 is a projection 328 which, when the said bolt is actuated to the right (Figure 18) is adapted to extend into the slot 330 disposed between the adjacent ends of arcuate flanges 282 and 284 of pulley 258. Extending forwardly from the outer surface 332 of bolt 276 is a second projection 334 which is adapted to extend into a slot 336 provided in arm 272, as shown more particularly in Figs. 18 and 19. The lower surface of bolt 276 and the upper surface 320 of projection 302 have recesses 338 and 340 respectively, provided therein for receiving the bolt actuating coil spring 286. Spring 286 is anchored at one end against a shoulder 342 provided near one end of recess 338 and is anchored at the other end against a shoulder 344 provided at the opposite end of recess 340. Accordingly, when bolt 276 is actuated to the right (Fig. 18) spring 286 is placed under compression and operates to return the bolt to the position shown in Fig. 18 when the force urging it to the right is relieved and maintains the bolt in that position until a force again is applied thereto sufficient to overcome the pressure of said spring.

As shown in Figs. 18 and 19, projection 334 has provided thereon a laterally extending projection 346 which is adapted to be engaged by the upper end 348 of dog 278. Dog 278 is pivotally mounted on a pin 350 secured in any suitable manner to arm 272. Arm 272 also has secured thereto a laterally extending arcuate supporting member 352 for dog 278. A spring 354 disposed between inner surface 356 of support 352 and the outer arcuate surface 358 of dog 278 operates to retain the said dog in effective position, as shown in Fig. 18. Dog 278 has a cam follower 360 secured to the lower end thereof which is adapted to be engaged by cam 280 when the latter and pulley 258 are rotated in a counterclockwise direction (Fig. 18).

Figure 27:
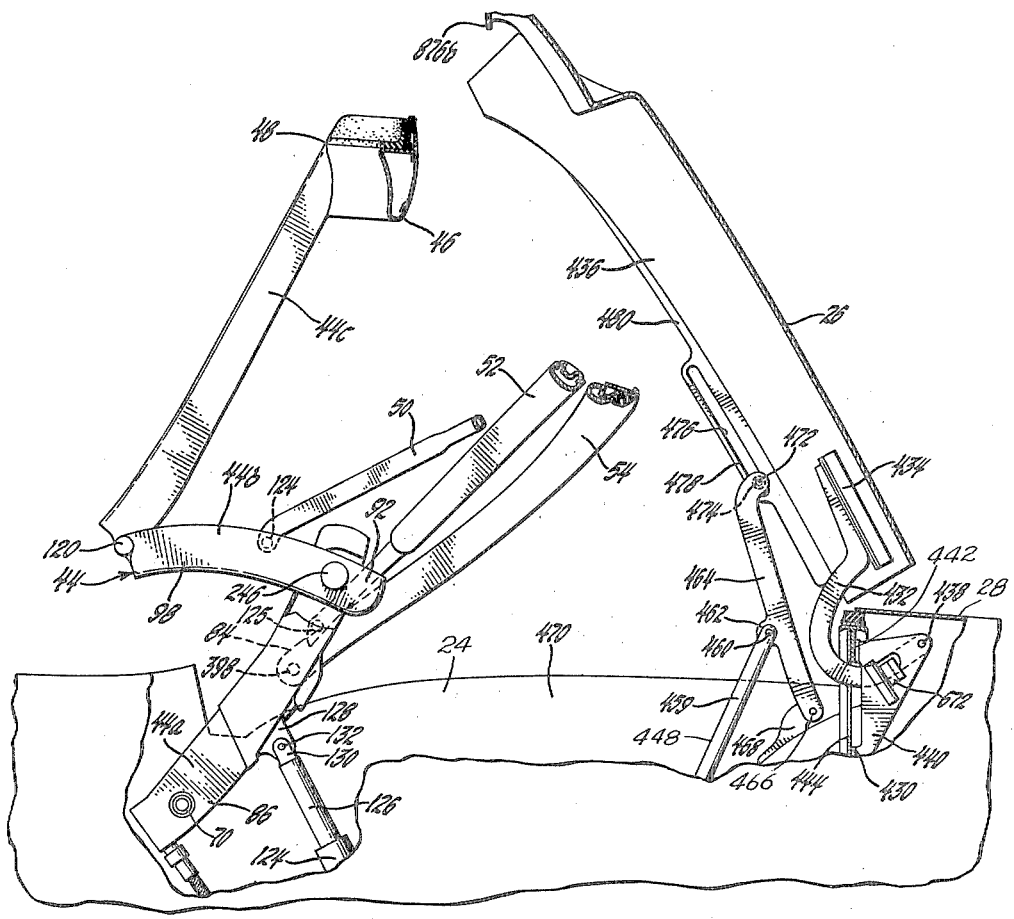
Fig. 27 is a view similar to Fig. 26 showing the deck lid in raised position and the top side rail structure in partly folded position, certain parts being broken away to more clearly illustrate the structure thereof.

The outwardly or rearwardly disposed end of arm 272 has formed thereon a laterally extending flat portion 362 similar to the flat portion 292 of arm 274. Flat portion 362 has an elongated aperture 364 provided therein for receiving a clamp bolt 366 which secures arm 272 to web 104 of intermediate rail section 44b, as shown more particularly in Fig. 16. When the top structure 22 is in the position shown in Figs. 1 and 9 the adjacent ends 368 and 370 of the webs 104 and 118 of intermediate and front rail sections 44b and 44c, respectively, lie in substantially abutting relation. When in this position the projection 334 of latch bolt 276 has entered the slot 336 in latch arm 272. When in this position, it is clear that the sections 44b and 44c are held in locked relation and until the bolt 276 is withdrawn relative pivotal movement between these sections is prevented. Upon operation of pulley 258 in a counterclockwise direction (Fig. 18) cam 280 engaging cam follower 360 swings dog 278 in a clockwise direction thereby actuating bolt 276 to the right and causing projection 334 to clear the inner end of slot 336 in arm 272 and causing projection 328 to enter the slot 330 between arcuate flanges 282 and 284. Upon continued rotation of pulley 258 striker arm 274 will rotate therewith due to the fact that projections 300 and 302 thereon are now locked to pulley 258 by bolt 276. By this action the joint between intermediate rail section 44b and front rail section 44c is broken and the front section is urged upwardly about pin 120, as shown in Fig. 27. This action takes place when motors 127 operate their respective jacks 126 downwardly.

The operation of the top structure 22 between its raised and lowered positions is believed to be clear from the foregoing description. Upon operation of motors 127 to lower the top, lower rail section 44a is swung in a clockwise direction (Fig. 26) about pin 70, causing the intermediate rail section 44b to pivot about pin 246 in a counterclockwise direction thereby breaking the joint between said rail sections, as shown in Fig. 27. Due to this swinging movement of rail section 44a pulley 254 which is secured thereto by means of pin 246, as shown in Fig. 14 causes a turning action of pulley 258 in a counterclockwise direction (Fig. 18) through cable 256. When pulley 258 is so operated the latch bolt 276 first is moved by dog 278 so that projection 334 moves out of recess 336 in arm 272 and projection 328 moves into recess 330 thereby releasing the latch between rail sections 44b and 44c. Now upon continued turning of pulley 258 arm 274, by virtue of its locking condition with said pulley, operates section 44c upwardly in a clockwise direction (Fig. 27) about pin 120 thereby breaking the joint between said sections. As pulley 258 continues to turn front rail section 44c continues to turn about pin 120 until the parts assume the position shown in broken lines in Fig. 3, at which time the rail sections have been folded and stowed in the storage compartment 24. When motor 127 is operated to raise the top from the position shown in broken lines in Fig. 3 a reverse operation of the parts occurs. Pulley 258 is then caused to turn in the reverse direction causing arm 274 to actuate rail section 44c in a counterclockwise direction (Fig. 27) about pin 120 until the parts assume the position shown in Fig. 9. Spring 286 then slides bolt 276 to the left (Fig. 18) causing projection 334 to move into recess 336 in arm 272. Front and intermediate rail sections 44c and 44b are thus now locked against relative movement. At the same time the lower and intermediate sections 44a and 44b move relative to each other until they also assume the position shown in Fig. 9.

Deck bow operating mechanism

Figure 13:
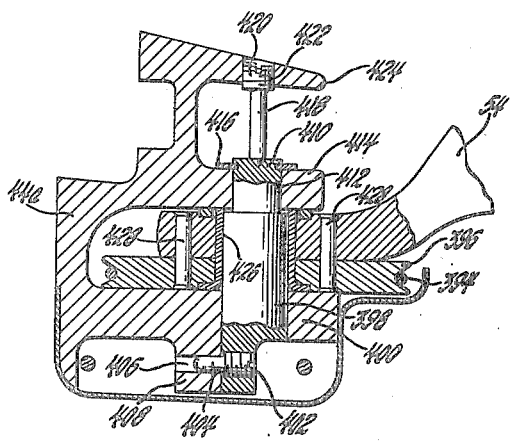
Fig. 13 is a sectional view of the operating connections associated with the deck bow of the top structure, taken substantially along line 13—13 of Fig. 9.

Automatically operable mechanism has also been provided for raising and lowering the deck bow 54. Referring to Fig. 11, the hub 66 on lower rail section 44a has journaled thereon by means of a roller bearing 372 a worm wheel 374 which meshes with a worm 376. The ends of worm 376 are journaled in bearings 378 provided at the lower end of rail section 44a, as shown more particularly in Fig. 20. Worm 376 has secured thereto by any suitable means, such as by a clamp 380, one end of a flexible cable 382. The other end of flexible cable 382 is connected to transmission gearing 384 which in turn in operatively connected to an electric motor 386. Motor 386 is secured by any suitable means, such as by a bracket 387, to the floor 388 of compartment 24, as shown in Figs. 3 and 4. A similar flexible cable 382 is connected at one end to gear transmission 384 and at the other end to a worm 376 mounted at the opposite side of the vehicle similar to the worm 376 just described. Thus, upon operation of motor 386 both of the worm wheels 374 rotatably mounted at the lower ends of the lower rail sections 44a, will be simultaneously operated. Each of the worm wheels 374 has secured thereto in any suitable manner, such as by rivets 390, a pulley 392. Pulley 392 has trained thereover a cable 394 which also is trained over a second pulley 396 rotatably mounted on a pin 398. Pin 398 is secured to the flange 400 of lower rail section 44a by a set screw 402 as shown in Fig. 13. Set screw 402 has a lug 404 at one end thereof which enters into a recess 406 provided in a laterally extending projection 408 on flange 400. The reduced end 410 of pin 398 extends through an aperture 412 provided in a second flange 414 of rail section 44a. A spring locking ring 416 seating in an annular recess near the end of reduced portion 410 prevents axial movement of pin 398 in one direction. A centering and retaining pin 418 engages the outer end of the reduced portion 410 of pin 398. The enlarged end portion 420 of pin 418 makes threaded engagement with a tapped opening 422 provided in a third flange 424 of lower rail section 44a. Each end of deck bow 54 is provided with an opening through which pin 398 extends. A sleeve 426 extends through aligned openings provided in pulley 396 and deck bow 54 and forms a bearing rotatably mounted on pin 398. Deck bow 54 is secured to pulley 396 in any suitable manner, such as by rivets 428. The other end of deck bow 54 is similarly connected to a pulley 396 provided in the rail section 44a at the other side of a vehicle. Therefore, it is seen that upon energization of electric motor 386 for actuation in one direction, as will appear more fully hereinafter, the deck bow will be swung about its pivotal connection to an upper position away from deck lid 26 and when the motor is actuated in the reverse direction the bow will be swung to a lower position in engagement with the said deck lid.

Deck lid operating mechanism

Deck lid 26 is pivotally supported on the transverse rear wall 430 of compartment 24. As shown more particularly in Figs. 3 and 27, a pair of loop hinges 432 is secured in any suitable manner to brackets 434, each of which in turn being secured to and extending inwardly from a side flange 436 of deck lid 26. The other end of each hinge 432 is pivotally supported on a pin 438 mounted in any suitable manner in a bracket 440 secured to the rear face 442 of wall 430. Each hinge 432 extends through an opening 444 provided in end wall 430. The deck lid 26, accordingly, is adapted for movement from the closed position shown in Fig. 3 to fully open position as shown in Fig. 27. The deck lid 26, like the side rails 44 of the top structure 22, has an electric motor 446 and a ball screw type jack 448 disposed at either side of the vehicle for operating it to its raised and lowered position of adjustment. Inasmuch as each motor 446 and the operating connections between it and the deck lid are the same, a description of one will suffice for both. As shown more clearly in Fig. 3, the armature shaft 450 of motor 446 has secured thereto a worm 452 which meshes with a worm wheel 454 secured in any suitable fashion to the lower end of the screw shaft 455 of jack 448. Each jack 448 is pivotally mounted on a pivot pin 456 secured to a bracket 457 which in turn is secured in any suitable manner to vehicle frame 81. The nut portion 458 of jack 448 is secured to an upper extended portion 459 therof which in turn is secured, by means of a pin 460, to a depending ear 462 disposed intermediate the ends of a lever 464. One end of lever 464 is pivotally mounted on a stud 466 secured to a supporting bracket 468 which in turn is secured in any suitable manner to the side wall 470 of compartment 24. The other end of lever 464 has provided thereon a pin 472 upon which a roller 474 is mounted which operates in an elongated slot 476 provided in a guide bracket 478 secured to the lower edge 480 of the flange 436 of lid 26. Each lifting jack 448 is generally similar to the lifting jacks 126 assocaited with the side rails 44 and, accordingly, a detailed description thereof need not be repeated. It is seen that upon energization of motors 446 in one direction the jacks 448 will lift the lid 26 to the position shown in Fig. 27 and upon actuation of the said motors in the reverse direction the jacks 448 will actuate the lid 26 to its lowered position shown in Fig. 3.

Motors 446 like the motors 127 associated with the side rails 44, are interconected by flexible shafting. Referring to Figs. 4d and 4e each motor 446 has a bevel gear 481 which meshes with a second bevel gear 482. Bevel gears 481 and 482 are mounted within a casing 483 provided at the end of the housing for motor 446. One end of each flexible shaft 484 is secured to its associated bevel gear 482 and is journaled in a bearing 485 provided in the associated casing 483. The other ends of shafts 484 extend into the casing 486 of a brake 487 and are secured together in any suitable manner.

Brake 487 is similar to the brake 165 previously described and comprises a friction brake disk 488 slidably mounted on one of the shafts 484 by means of a key 489. Casing 488 is mounted on a bracket 490 which in turn is secured to the floor 388 of top structure compartment 24 by bolts or by any other suitable means. Brake disk 488 is urged into frictional engagement with the inner surface of the end wall 491 of casing 486 by a coil spring 492. As shown in Fig. 4e, spring 492 extends between disk 488 and the other end wall 493 of casing 486. Disk 488 is actuated out of engagement with end wall 491 by a solenoid 494. One end of the casing of solenoid 494 is secured to end wall 493 by machine screws 495 or by any other suitable means. The other end of solenoid 494 including the core 496 thereof is disposed adjacent disk 488. The coil 497 of solenoid 494 is connected into electric circuit 182 and the means for controlling the operation thereof will be described later herein. Thus, upon energization of solenoid 494, disk 488 will be moved axially out of contact with the wall 491 thereby releasing shafts 484 for rotation by their motors 446. End walls 491 and 493 are provided with bearings 491a and 493a, respectively, for shafts 484. An adaptor 498 is also operatively connected to shaft 482 to enable manual operation of lid 24 in the event that the electric power should fail. Adaptor 498, like the adaptor 183 previously described, comprises a bevel gear 499 secured to shaft 484. A second bevel gear 500 meshes with bevel gear 499 and has a shaft 501 connected thereto which is adapted for connection with a crank 502. Bevel gears 499 and 500 are enclosed within a casing 503 having a flange 504 which is bolted to a companion flange provided at the end of the bearing 493a in the end wall 493 of casing 488. Shaft 501 is journaled in any suitable bearing 505 provided in casing 503. Thus, in the event of failure of the electric power the deck lid 26 may be raised and lowered by the manual means just described.

*Header construction of vehicle top*

Figure 28:
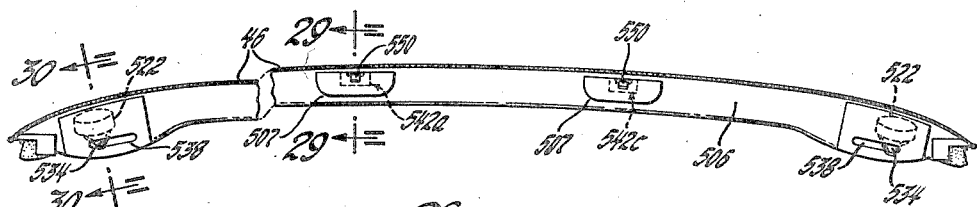
Fig. 28 is a front elevational view of the header associated with the top structure.

The header 46 secured to the front ends 48 of side rails 44 is curved slightly transversely of the vehicle, as shown in Fig. 28, and consists of a substantially hollow sheet metal structure 506 which terminates at its front side in an angle shaped structure having a substantially vertical flange 507 and a second flange 508 disposed at right angles thereto. A rubber liner 509 is disposed against the outer faces of flanges 507 and 508 and is held in place by means of a retainer 510 which in turn is secured to flange 507 by means of screws 511. The opposite ends of rubber liner 509 are provided with resilient flexible extensions 512 and 514 which, when the header engages the frame 18 of windshield 16, form a cushioned seal therebetween, as shown more particularly in Figs. 10 and 30. The frame 18 of windshield 16 is also of substantially hollow sheet metal construction as indicated at 516 and has a substantialy U-shaped cushioning member 518 provided around the edge of the windshield.

Mounted on brackets 520 secured in any suitable manner to the header 26 are a pair of latch mechanisms 522. Each bracket 520 may be bolted at the front end thereof to the flange 507 of header 46 and supported on a pair of spaced pins 521 at the opposite end. The pins 521 extend through aligned openings in the vertical flange 523 of the top wall 524 of header structure 506 and in the inwardly extending flanges 525 of bracket 520 as shown in Fig. 31. The riveted head 526 of each pin engages flange 523 to prevent outward movement thereof. Each pin 521 is provided with a reduced neck portion which extends through openings in flange 523 and in a retaining plate 527. A reinforcing member 528 seated in a recess formed by flange 523 and flange 529 of the bottom wall of member 530 of structure 506 is secured to the latter by screws 531. The latch mechanisms 522 are thus effectively held in position in header 46. Inasmuch as both latch mechanisms 522 are identical in construction, a detailed description of only one will be given herein. Each latch mechanism 522 is provided with a casing 532 which is secured to bracket 520 by bolts 533. A latch arm 534 secured to a pin 535 rotatably mounted in casing 532 is adapted to be swung into latching position beneath the structure 516 of windshield frame 18 by means of a spring 536 and to retracted position by means of a solenoid 537. Solenoid 537 is operatively connected in electric circuit 182 and when energized operates to swing latch arm 534 to the position shown in dotted lines in Fig. 31. Elongated slots 538 are provided in flange member 507 of header 46 to permit the latch arm 534 to swing to latching and retracted positions shown by full and broken lines, respectively, in Fig. 31.

Also secured to flange member 507 of header 46 are two spaced brackets 540, one for each of two limit switches 542a and 542c. Since the mountings and operating means for both of these switches are substantially the same, a general description of those associated with switch 542a will suffice for both. As shown more clearly in Fig. 29 a hook-shaped switch operating arm 544 pivotally supported on a pin 546 secured to bracket 540 engages a spring urged switch button 548 extending outwardly from the casing 549 of switch 542a. The upper arcuate arm 550 of switch operating arm 544 extends through a passage 552 formed in members 507, 509, and 510 and the end thereof is adapted to engage the upper end of the hollow structure 516 of windshield frame 18 when the top structure 22 is in its fully raised position as shown in Figs. 10 and 30.

*Window operating mechanisms*

Figure 32:
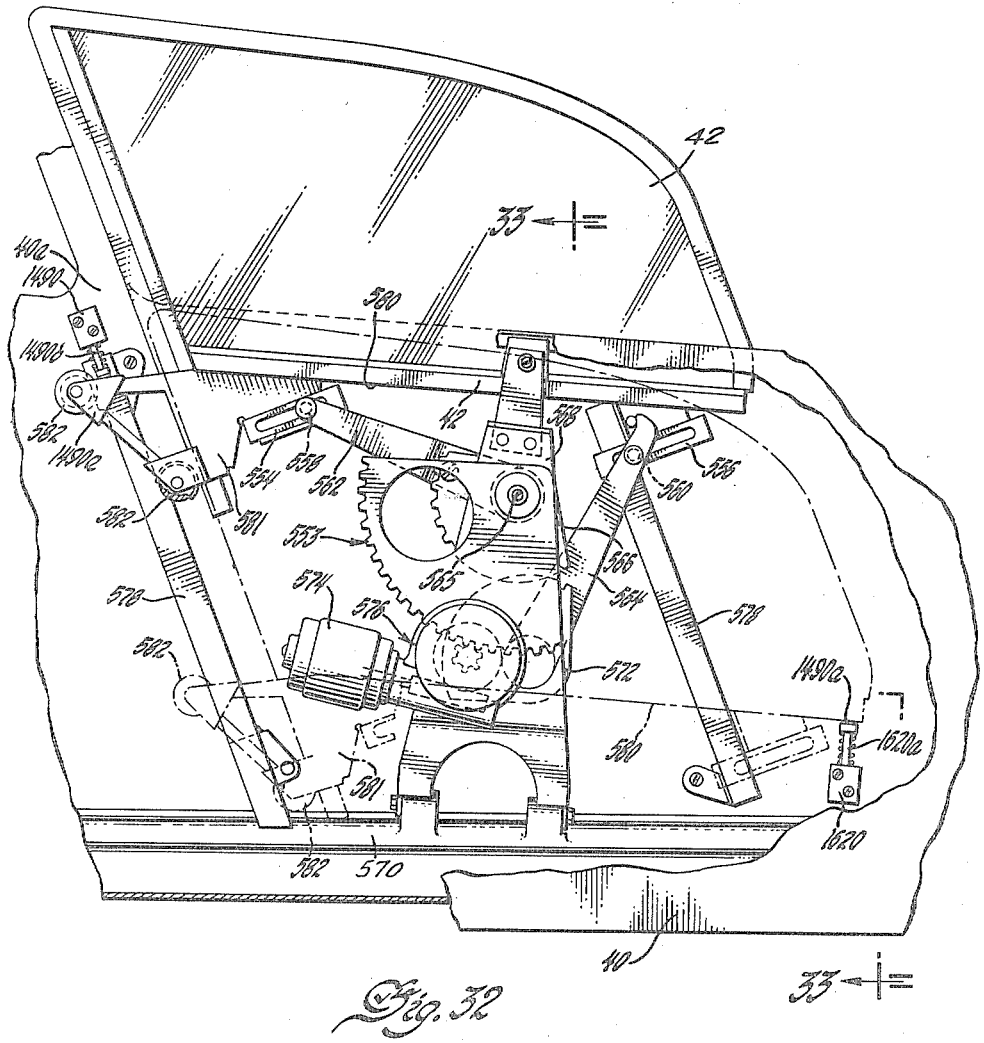
Fig. 32 is a side elevational view of the operating mechanism for one of the sliding windows of the vehicle.

Each window 42 has associated therewith a power operated window adjusting mechanism indicated at 553, as shown more particularly in Figs. 32 and 33. Inasmuch as the operating mechanism 553 for each window 42 is the same, a description of one will suffice for both. Window 42 has provided along the lower edge thereof a pair of guide channels 554 and 556 which receives anti-friction rollers 558 and 560, respectively, provided at the outer ends of a pair of operating levers 562 and 564. Lever 562 is secured to a spur gear segment 566 pivotally mounted in a bracket 568 secured to the door panel structure 570. Gear segment 566 meshes with a second spur gear segment 572 also pivotally supported on the bracket 568 and to which the lower end of operating arm 564 is secured. The shaft 565 for gear segment 566 is operatively connected to the armature shaft of an electric motor 574 by a gear transmission indicated generally at 576. The side edges of window panel 42 are guided during movement to its upper and lower positions of adjustment in a pair of guide rails 578, which as shown in Fig. 32 incline downwardly and rearwardly of the door structure 40. The lower edge 580 of window panel 42 has attached thereto a bracket 581 carrying anti-friction rollers 582 which engage the opposite edges of guide rail 578 to facilitate the raising and lowering of said window. Electric motor 574 is connected into the electric circuit 182 and is controlled by switch means which will be more fully described later herein. It is clear that upon actuation of motors 574 in one direction, the windows 42 will be actuated to raised position, as shown in Fig. 1, and when the operation of said motors is reversed the said windows will be actuated to their lower position, as shown by broken lines in Fig. 32.

*Electric circuit—General*

The electric circuit 182 for controlling the top operating mechanisms contains a series of switches and relays which function, when the main control switch is operated to either top-up or top-down position, to cause the various mechanisms to operate through a predetermined sequential order to fully raise the top or to fully lower the top, as the case may be. The electric circuit includes controls which permit the following general operations of the top to be effected: (a) movement of the top structure from fully-down position to fully-up position; (b) movement of the top structure from fully-up position to fully-down position; (c) operation of the top structure to an out of the way position to enable passengers to board and leave the vehicle and to then automatically operate the top to its normal raised position after a predetermined lapse of time, and (d) to automatically cause raising of the top structure from its lowered position in the event of rain.

The first two of the above referred general operations of the top structure can be effected only when the transmission controls are in either park or neutral position so that the top cannot be operated to either up or down position while the vehicle is in motion. The last two of the general operations may be effected while the ignition switch is open and regardless of the position of the shift control mechanism. This is done because such operations may be desired while the vehicle is parked and the ignition switch open. If desired, however, the third referred to operation may be effected only when the transmission controls are in park or neutral position.

In order to understand more fully the control circuit and the mechanisms connected thereto or associated therewith, a description will be given of the parts as they function through their proper sequential order during each of the different operations outlined herein.

Controls for fully raising top structure

The various controls and the sequence of operation of the various mechanisms previously described herein during movement of the top structure 22 from fully lowered position to fully raised position will now be described. Referring to Fig. 34, the electric power for the circuit 182 may be obtained from a storage battery shown at 590. One terminal 592 of battery 590 is connected to ground by a conductor 593 while the other terminal 594 thereof has connected thereto one end of a bus bar 596 from which electric power is supplied to the various switches, relays, solenoids and motors connected in circuit 182. One terminal 598 on bus bar 596 is connected to the central pole 600 of a transmission control switch indicated generally at 602 by a conductor 603. Switch 602 is operatively connected to the shift control mechanism (not shown) of the vehicle transmission which in the present instance is indicated as being of the automatic type. It is apparent, however, that the circuit 182 is equally adapted for use with manually operable transmissions. The switch controls have five positions indicated by the letters P, N, D, L, R, which indicate, respectively, the Park, Neutral, Drive, Low Gear, and Reverse Gear positions of the transmission. The switch lever 604 of switch 602 pivots about central pole 600 and the end of one arm 604a thereof is adapted to engage contacts 606, 608, 610, 612, and 614 disposed opposite, respectively, the positions indicated by the letter P, N, D, L, and R. The other arm 604b of switch lever 604 is adapted to engage a contact segment 616 which is connected to a terminal 618 provided on a second bus bar 620. The ignition switch 622, which is of the single pole type, is connected in bus bar 620. It is seen that when switch lever 604 is in either the Park or Neutral position, the circuit between bus bars 596 and 620 is closed. However, when switch lever 604 moves to the D, L, and R positions the arm 604b thereof is out of contact with contact segment 616 and, consequently, the circuit between the bus bars 596 and 620 is interrupted.

Bus bar 620 is connected to the contact element 624 of a single pole secret cut-out switch 626 which may be located in the glove compartment of the vehicle or at any other desired location. The movable arm 628 of switch 626 is connected at one end to a terminal 632 of a top control switch 634 by a conductor 635. Switch 634 is of the ball-lever type and comprises a movable contact arm 636 connected at one end to terminal 632, the other end of which being adapted to make contact with the top-up contact element 638, the top-down contact element 640, or the intermediate or neutral terminal 642. Contact element 638 is connected to a terminal 644 provided in a conductor 646 by a conductor 647. Conductor 646 is connected to the bow-up contact element 648 of a limit switch 650 associated with the deck bow 54, as shown in Fig. 20. Switch 650 comprises a movable contact element 652 connected at one end to the terminal 654 and is biased by a spring into engagement with contact 648 when the bow 54 moves upwardly from its down position on deck lid 26. Switch 650 is mounted on rail section 44a and the switch button 650a thereof is adapted to be engaged by an operating element 650b carried by cable 394 when the bow is in its completely down position thereby opening said switch. Terminal 654 is connected by a conductor 656 to the terminal 658 of a top limit switch 660. Switch 660 comprises a movable contact element 662 which is biased by a spring into contact with a contact element 666 when the top is in the down position but which is actuated into engagement with a contact element 664 when the top is in the up position. Switch 660 is shown in Fig. 6 and the button 660a thereof is actuated by an arm 660b which in turn is actuated by a cam 660c carried by the nut 142 of jack 124, when the top has been actuated to its up position. Contact 666 is connected by a conductor 668 to the terminal 670 of a deck lid limit switch 672. Switch 672 comprises a movable contact element 674 which is biased by a spring into engagement with contact element 678 but which is actuated into engagement with contact element 676 when the deck lid 26 is in its completely raised position. Switch 672 is shown in Figs. 3, 8, and 27 and is mounted on bracket 440 and the spring urged button 672a thereof is adapted to be operated by an arm 672b which in turn is operated by hinge 432 when the deck lid 26 has been moved to completely raised position. A contact element 678 is provided at one end of a conductor 680 having a second terminal 682 therein which in turn is connected to a terminal 684 by conductor 686. Terminal 684 is connected to the coil 688 of a relay 690 which in turn is connected to ground by conductor 692. When relay 690 is energized it actuates the normally open contacts 694 of its switch 696 to closed position, the connection between coil 688 and switch 696 for clarity being shown in broken lines at 698. The upper contact element 694 of switch 696 is connected to a terminal 700 by a conductor 702 while the lower contact element 696 is connected to a terminal 704 in a bus bar 706 which in turn is connected to bus bar 596 by a conductor 707. Terminal 700 is connected to the upper end of coil 497 of solenoid 494, the lower end of which being connected to ground by a conductor 712. Solenoid 494 functions, when energized, to release the brake 487 associated with the shafts 484 connecting the deck motors 446 and thereby releasing the latter for operation.

Terminal 682 provided in the conductor 680 leading from the deck limit switch 672 is connected to the terminal 714 provided at the upper end of the coil 716 of a relay 718 by a conductor 719 having a resistance coil 720 provided therein. The lower end of coil 716 is connected to ground by a conductor 722. Terminal 714 is also connected to one side of a condenser 724 by conductor 726, the other side of said condenser being connected to ground by conductor 728. Upon energization of relay 718 the normally open contact elements 729 of its switch 730 are closed, the connection between relay 718 and its switch 730 being shown by broken lines at 732. The upper contact element 729 of switch 730 has connected thereto a conductor 733 to which one side of motors 446 is connected by parallel connections 734, 734. Motors 446, 446 are connected to ground by conductors 736, 736. The lower contact element 729 of relay switch 730 is connected to the terminal 738 on bus bar 706 by a conductor 739. It is seen that upon closing of contact elements 729 of the relay switch 730, as just described, deck motors 446, will be energized in such a manner as to actuate their lifting jacks 448 to effect raising of the deck lid 24. The resistance coil 720 and the condenser 724 associated with relay 718 provide a time delay between the energization of relays 690 and 718, thereby permitting relay 690 to close the contact elements 694 associated with solenoid 494 and thereby effect releasing of brake 487 before energization of deck operating motors 446 is effected. The movable contact element 674 of deck lid limit switch 672, it will be remembered, is urged into engagement with deck down contact element 678 by a spring as shown in Fig. 34. When the deck lid 24 is actuated to its fully-raised position contact element 674 of switch 672 will be actuated into engagement with the contact element 676 by hinge 432, as previously described. The circuit to relays 690 and 718 is thus broken and consequently their switches 696 and 730 open thereby interrupting the circuit to brake solenoid 494 and to motors 446. Spring 492 now applies brake 487, Figs. 4d and 4e, thereby preventing overtravel of motors 446.

Contact element 676 is connected to the terminal 740 by a conductor 742. Terminal 740 is connected to the upper end of the coil 744 of a relay 746, the other end of said coil being connected to ground by conductor 748. Upon energization of relay 746 the normally open contact elements 750 of its switch 752 will be closed, the connection between said relay and its switch being shown by broken lines at 754. The upper contact element 750 of switch 752 is connected to a terminal 756 by a conductor 758. Terminal 756 is connected to the upper end of the coil 178 of slonoid 175, the lower end of said coil being connected to ground by a conductor 764. The lower contact element 750 of switch 752 is connected to bus bar 706 by a conductor 766. Upon energization of solenoid 175 the brake 165 associated with the shafts 158 connecting the top rail operating motors 127 is released thereby conditioning said motors for operation. Terminal 740 in conductor 742 is connected to terminal 768 by a conductor 769 having a resistance coil 770 provided therein. Terminal 768 is connected to the upper end of a condenser 772 by conductor 774, the lower end of said condenser being connected to ground by a conductor 776. Terminal 768 is also connected to the upper end of the coil 778 of a relay 780, the lower end of said coil being connected to ground by a conductor 782. Upon energization of relay 780 the normally open contact elements 784 of its switch 785 close, the connection between said relay and switch being indicated in broken lines at 786. The upper contact element 784 has connected thereto one end of a conductor 788 to which motors 127 are connected by parallel connections 790, 790. Motors 127 are connected to ground by conductors 792, 792. The lower contact element 784 of switch 785 is connected to bus bar 706 by a conductor 794. The resistance coil 770 and the condenser 772 provide a time delay between the operations of relays 746 and 780 thereby permitting the former to release the brake 167 before the latter closes the circuit to top operating motors 127. Upon energization of motors 127 the side rails 44 will be actuated by the associated lifting jacks 126 from the position shown in broken lines in Fig. 3 to the position shown in broken lines at B in Fig. 26, in which position the header 46 is disposed slightly above the frame 18 of windshield 16. When the top has been moved to this position the movable contact element 662 of top limit switch 660 will have been actuated by cam 660c into engagement with a contact element 664 by means of arm 660b and button 660a. When this occurs the circuit to relays 746 and 780 will have been broken causing switches 752 and 785 to open, thereby interrupting the circuit to brake solenoid 175 and top motors 127, respectively. Spring 173 now applies the brake 165 and thus prevents overtravel of motors 127.

Contact element 664 is connected to a terminal 796 of partial top operating limit switch 542a by a conductor 800. When the top is in any position other than fully raised position, as shown by full lines in Fig. 26, the contact arm 802 of switch 542a is moved into contact with contact element 804 by a spring, as shown in Fig. 34. Switch 542a, as previously described, is mounted in header 46 and the arm 802 thereof is adapted also for engagement with a contact element 806 as will appear later herein. Contact element 804 is connected to the terminal 808 provided at the upper end of the coil 809 of a relay 810 by a conductor 812 having a resistance coil 813 connected therein. The lower end of the coil 809 is connected to ground by conductor 814. Upon energization of relay 810 the normally open contact elements 816 of its switch 818 are closed, the connection between said coil and switch being shown by broken lines at 820. The upper contact element 816 of switch 818 has leading therefrom a conductor 822 having a pair of spaced terminals 824, 824 provided thereon. Terminals 824, 824 are connected to the upper ends of the coils 826, 826 of the solenoids 537, 537 which as was previously described are provided for releasing the header latch arms 534, 534. The lower ends of the coils 826, 826 of solenoids 537, 537 are connected by a conductor 828 which in turn is connected to ground by a conductor 830. Upon energization of solenoids 537, 537, as just described, the latches 534, 534 are withdrawn and the header 46 may now be lowered by its operating mechanism to the position shown in full lines in Fig. 26.

Terminal 808 is connected to a terminal 832 by a conductor 834. Terminal 832 is connected to the terminal 836 provided at the upper end of the coil 838 of a relay 840 by a conductor 841 having a resistance coil 842 provided therein. The lower end of coil 838 is connected to ground by a conductor 844. Terminal 836 is also connected to the upper end of a condenser 846 by a conductor 848, the lower end of said condenser being connected to ground by a conductor 850. Upon energization of relay 840 the normally opened contacts 852 of its switch 854 are closed, the connections therebetween being indicated by broken lines, as shown at 856. The upper contact element 852 of switch 854 is connected to one side of motor 224 by a conductor 856 having a resistance coil 858 connected in series therewith. Motor 224 is connected to ground by a conductor 859 and contacts 860. The lower contact element 852 of switch 854 is connected to bus bar 706 by a conductor 862. The resistance 842 and condenser 846 operate to provide a time delay between the operations of relays 810 and 840 to insure the withdrawal of the header latch elements 534, 534 before motor 224 operates to lower the top to the full line position shown in Fig. 26. It will be observed that conductor 856 has connected thereto at either side of the resistance 858 a pair of conductors 864 and 866. The other ends of conductors 864 and 866 are connected to the contact elements 868 of a normally closed relay switch 870. Contact elements 868 are connected by the connection indicated in broken lines at 872 to the connection indicated in broken lines at 820 for actuating the contact elements 816 of the switch 818 associated with the solenoid actuated latch elements 534, 534. When contact elements 816 are closed as hereinbefore described, contact elements 868 are opened. Consequently, when the contact elements 852 of switch 854 are closed to energize motor 224 the current must flow through to the motor resistance 858. Consequently, the speed of motor 224 will be reduced and the top structure 22 will move at a controlled speed downward toward frame 18. Upon actuation of the top to the fully up position shown by full lines in Fig. 26, limit switch 542a is actuated by engagement of the end 550 of arm 544 with header frame 18, thereby causing button 548 (Fig. 29), to actuate the moveable contact element 802 from engagement with contact element 804 into contact with contact element 806. When this occurs, the circuit to relays 810 and 840 is interrupted whereupon switch 818 opens and switch 870 closes. The circuit to solenoids 537 is now opened and the resistor 858 is by-passed by virtue of the closing of switch 870. Springs 536 now swing latches 534 in header 46 into engagement with the under surface of windshield frame 18 to thereby lock the said header in raised position. During energization of relay 840, the associated condenser 846 was being charged. Accordingly, when switch 542a has been actuated as previously described to interrupt the circuit to relays 810 and 840, condenser 846 will now discharge through the coil 838 of relay 840 thereby holding its switch 854 closed. Current will now flow to motor 224 from bus bar 706, conductor 864, switch 868 and conductor 865 thereby causing full torque operation of said motor to move the top structure into sealing engagement with frame 18. When condenser 846 is discharged, relay 840 opens its switch 854 and motor 224 then comes to use.

Contact element 806 is connected to the terminal 874 of a second deck lid limit switch 876 by a conductor 878. The moveable contact element 880 of switch 876 is adapted to contact stationary contact elements 882 and 884 indicating, respectively, the completely down position, and any up position of deck lid 26. A spring urges contact element 880 into engagement with contact element 884 when the deck lid is moved upwardly from its fully down position. It will be remembered that when the operation began, the first step was to raise the deck lid 26 to its upper position of adjustment. Inasmuch as the lid 26 is still in this position, contact element 880 is still in engagement with the up contact element 884. Switch 876 may be mounted on a supporting panel 885 near the upper end of the latter and located between the backs 36 of the vehicle seats 34, as shown in Figs. 3 and 8a. The spring urged button 876a of switch 876 is actuated by a striker plate 876b mounted at the front end of the deck lid 26 to move contact element 880 from engagement with contact element 884 and into engagement with contact element 882 when the deck lid 26 has been moved to its fully down position. Contact element 884 is connected to a terminal 886 by a conductor 888. Terminal 886 is connected to the upper end of the coil 890 of a relay 892 by a conductor 894. The lower end of coil 890 is connected to ground by a conductor 896. Upon energization of relay 892 the normally open contact elements 898 of its switch 900 are closed, the connections therebetween being shown by broken lines at 902. The upper contact element 898 of switch 900 is connected to the terminal 700 by a conductor 904. Terminal 700, it will be remembered, is connected to the coil 497 of the solenoid 494 employed for releasing the brake 487 associated with the deck lid operating motors 446. The lower contact element 898 of switch 900 is connected to bus bar 706 by a conductor 906. It is thus apparent that upon energization of solenoid 494, the brake 487 will be released to enable rotation of shafts 484 by motors 446. Conductor 888 also has provided thereon a terminal 908 which is connected to a terminal 910 provided at the upper end of the coil 912 of a relay 914 by a resistance coil 916. Terminal 910 is also connected to one end of a condenser 918 by a conductor 920 the other end of said condenser being connected to ground by conductor 922. The lower end of the coil 912 of relay 914 is also connected to ground by conductor 924. Upon energization of relay 914, the normally open contact elements 926 of its switch 928 will be closed, the connection therebetween being indicated by broken lines at 930. The upper contact element 926 of switch 928 has connected thereto a conductor 932 which is connected to motors 446, 446 by parallel connections 934, 934. The lower contact element 926 of switch 928 is connected to bus bar 706 by a conductor 936. When relay switch 928 is closed, as just described, the circuit to the deck lid operating motors 446, 446 will be closed. Inasmuch as the connections to the motors 446 are now reversed from those previously described, the said motors will be caused to operate in the reverse direction and consequently deck lid 26 will be operated to closed position. The resistance 916 and condenser 918 provide a time delay between the operation of relays 892 and 914 thereby enabling release of the brake 487 by solenoid 494 before closing of the circuit to motors 446 which when energized operate the lid 26 to closed position. Upon fully closing of the deck lid 26, movable contact element 880 of limit switch 876 will be actuated from its position in engagement with fixed contact element 884 into contact with fixed contact element 882 as previously described. When this occurs the circuits to relays 892 and 914 are interrupted thereby causing their switches to open, thus interrupting the circuits to solenoid 494 and to motors 446. Spring 492 now applies brake 487 thereby preventing overtravel of motors 446. Contact element 882 is connected to a terminal 938 by a conductor 940. Terminal 938 is connected to the upper end of the coil 942 of a relay 944, the lower end of said coil being connected to ground by conductor 946. Terminal 938 is also connected to the upper end of a condenser 948 by conductor 950, the lower end of said condenser being connected to ground by a conductor 952. Upon energization of relay 944 the normally open contact elements 954 of its switch 956 will be closed, the connection therebetween being indicated by the broken lines at 957. The upper contact element 954 of switch 956 is connected to one side of deck bow motor 386 by a conductor 958, the said motor in turn being connected to ground by the connections shown generally at 960. The lower contact element 954 of relay switch 956 is connected to bus bar 706 by a conductor 962. When the top is in its lowered position, as indicated by broken lines in Fig. 3, the deck bow 54 is in its raised or "up" position. Accordingly, upon closing of switch 956 as just described, bow motor 386 will be so energized as to actuate the bow 54 to its lowered position bringing it into engagement with the upper surface of deck lid 26, as shown in Fig. 3. When the bow 54 has been actuated to its fully lowered position the movable contact element 652 of switch 650 will be moved out of engagement with contact element 648 and into engagement with contact element 964 by operating element 650b (Fig. 20), as previously described, thereby interrupting the circuit in the entire system. At this time, it will be observed that the top structure 22 and its associated elements have been operated in the necessary sequential order to bring the top from its fully down position within the compartment 24 to its fully up or raised position, as shown in Fig. 1. The deck lid 26 has also been closed and the deck bow 54 has been brought down into contact with deck lid 26 thereby tightly stretching the fabric 56 over floating bows 50 and 52. The final operation required in raising the top structure 22 to fully up position, accordingly, has now been completed. The circuit to the system also has been interrupted and consequently the top structure will remain in this position until it is desired to move it to another position.

*Controls for completely lowering the top structure*

In order to cause actuation of the top from its fully up position to its fully down position the operator simply swings the movable contact element 636 of control switch 634 into contact with fixed contact element 640. Contact element 640 is connected to the fixed contact element 966 of the single pole switch 542b mounted on the bracket 72 adjacent the worm gear 194 (not shown) disposed at the opposite side of the vehicle from which switch 1032 shown in Fig. 5 is mounted. The movable contact element 970 of switch 542b is connected to the terminal 972 which in turn is connected to the terminal 974 of a limit switch 976 by conductor 978. The movable contact element 970 of switch 542b is biased to open position by a spring as shown in Fig. 34, and is actuated into contact with contact element 966 when an operating arm similar to arm 1032a shown in Fig. 5 is engaged by an operating member similar to member 1032b also shown in Fig. 5. Switch 542b is so disposed with respect to the above referred to operating member that the latter retains said switch in closed position during a predetermined movement of the top structure 22 about pivot 246 from its fully up position as shown by full line in Fig. 26 to a position some distance upwardly beyond the position shown in broken lines at 'B' in Fig. 26. When the top structure swings upwardly beyond that position then the spring opens switch 542b as previously described. The movable contact element 980 of switch 976 is adapted to engage either of two fixed contact elements 982 and 984, but is biased by a spring into contact with the former and remains in contact therewith until the top has been completely lowered. As shown in Fig. 6 switch 976 is mounted near the lower end of jack 126 and the button 976a thereof is adapted to be operated by an arm 976b, which in turn is actuated to move contact element 980 into engagement with contact element 984 by the cam 660c carried by the nut 142 of said jack when the top structure has been actuated to its fully lowered position. Contact element 982 is connected to the terminal 986 of a limit control switch 988 by conductor 990. The movable contact element 992 of switch 988 is adapted to engage either of two fixed contact elements 994 or 996. Contact element 992 is biased by a spring into contact with element 996 and remains in that position until the bow has been actuated to its fully raised position. Switch 988 is shown in Fig. 20 and the spring urged button 988a thereof is actuated by an operating element 988b carried by cable 394 to move contact element 922 into engagement with element 994 when the bow 54 is in its fully raised position. Contact element 996 is connected to the upper end of the coil 998 of a relay 1000 by conductor 1002. The lower end of coil 998 is connected to ground by conductor 1004. Upon energization of relay 1000 the normally open contact elements 1006 of its switch 1008 will be closed, the connections between said relay and switch being indicated by broken lines at 1010. The upper contact element 1006 of switch 1008 is connected to bus bar 706 by a conductor 1014. It will be observed that the connections between motor 386 and bus bar 706 just described are at the opposite side of said motor from those previously described, and accordingly, upon closing of relay switch 1008, bow motor 386 will actuate bow 54 to its upper position of adjustment. Clearance is now provided for actuation of the deck lid 26 to its upper position. Upon actuation of bow 54 to its upper position movable contact element 992 of switch 988 will be actuated into engagement with contact element 994 by element 988b, as just described.

Contact element 994 is connected to the terminal 1016 of a deck limit switch 1018 by a conductor 1020. The movable contact element 1022 of switch 1018 is adapted for engagement with either of a pair of fixed contact elements 1024 and 1026. Contact element 1022 is biased by a spring into engagement with contact element 1024 and is moved into contact with element 1026 only when the deck lid 26 is in its raised position. Switch 1018, like switch 672 previously described, is mounted on a bracket 440 secured to end wall 430 of compartment 24 adjacent the other hinge 432, as shown in Fig. 8a. The button 1018a of switch 1018 is actuated by an arm 1018b which in turn is actuated by the hinge 432 to move element 1022 into contact with element 1026 when deck lid 26 has been actuated to its raised position. Contact element 1024 is connected to the terminal 684 adjacent relay 690 by a conductor 1028. The coil 688 of relay 690, it will be remembered, is connected to terminal 684 and consequently when movable contact element 1022 of switch 1018 engages contact element 1024, the circuit to said relay is closed. When this occurs the normally open contact elements 694 of switch 696 are actuated to closed position, thereby causing energization of solenoid 494 which in turn operates to release brake 487, as previously described, to condition deck lid motors 446 for operation. It will also be remembered that relay 718 is also operatively connected to the conductor 680 leading from terminal 684, and consequently, said relay will be energized a short time after the energization of relay 690. The time delay provided by resistance 720 and condenser 722 enables the release of brake 487 before the circuit to lid motors 446 is closed. Upon energization of relay 718 the normally open contacts 728 of its switch 730 will be closed thereby completing the circuit to deck lid motors 446 and causing actuation of the deck lid 26 to its raised position. Upon actuation of deck lid 26 to its fully raised position, contact element 1022 of switch 1018 will be actuated by hinge 432 into engagement with fixed contact element 1026. When this occurs the circuit to relays 690 and 718 will be opened and, as previously described, opening of the circuits to solenoid 494 and to motors 446 follows. Spring 492 now operates to apply brake 487 thereby preventing overtravel of motors 446 after the deck lid has been moved to fully raised position.

Contact element 1026 is connected to the terminal 1030 of a limit switch 1032 by a conductor 1034. The movable contact 1036 of switch 1032 is adapted for engagement with either of a pair of fixed contact elements 1038 and 1040 but is biased into engagement with the latter by a spring, as shown in Fig. 34. When the top is in its fully up position as shown by full lines in Fig. 26 and the header 46 is in engagement with the frame 18 of windshield 16, contact element 1036 is in engagement with fixed contact element 1038. Switch 1032 is mounted near the upper end of bracket 72, as shown in Fig. 5, and the operating arm 1032a thereof is actuated by an operating member 1032b secured in any suitable manner to worm wheel 194, when the top structure is in fully raised position to move contact element 1036 into engagement with contact element 1038. Contact element 1038 is connected to a terminal 1042 provided on a conductor 1044 by a conductor 1046. One end of conductor 1044 is connected to the upper end of the coil 1048 of a relay 1050 the other end of said coil being connected to ground by a conductor 1052. Upon energization of relay 1050, the normally open contact elements 1056 of its associated switch 1058 will be closed, the connection between said relay and switch being indicated by broken line at 1060. The upper contact element 1056 of switch 1058 is connected to terminal 824 provided in conductor 822 by a conductor 1062. The lower contact element 1056 of switch 1058 is connected to bus bar 706 by a conductor 1064. When switch 1058 is closed the circuit to solenoids 537, 537 is closed to bus bar 706 whereupon the latches 534, 534 are withdrawn from frame 18, thereby freeing the header 46 for upward movement. Terminal 1042 is connected to a terminal 1066 by resistance coil 1068. Terminal 1066 is connected to the upper end of the coil 1070 of a relay 1072, the lower end of said coil being connected to ground by conductor 1074. Terminal 1066 is also connected to the upper end of a condenser 1076 by a conductor 1078, the lower end of said condenser being connected to ground by a conductor 1080. Upon energization of relay 1072 the normally open contact elements 1082 of its switch 1084 are closed, the connection between said relay and switch being shown by broken lines at 1086. The upper contact element 1082 of switch 1084 is connected to motor 224 by a conductor 1088. The lower contact element 1082 of switch 1084 is connected to bus bar 706 by a conductor 1090. It will be observed that the connections between bus bar 706 and motor 224 just described are connected to the opposite side of said motor from those previously described and consequently upon closing of switch 1084 the said motor will operate the top structure 22 upwardly to the position shown at B in broken lines in Fig. 26. The header 46 has thus been raised sufficiently to clear the windshield frame 18. The resistance 1068 and condenser 1076 associated with relay 1072 provide a time delay between the operation of relays 1048 and 1072 to enable the header latches 534, 534 to be withdrawn before energization of the motor 224 takes place. Upon actuation of the top structure to the position shown in broken lines at B in Fig. 26 the contact element 1036 of switch 1032 will be actuated into engagement with fixed contact element 1040 by the spring associated therewith as shown in Fig. 34. When this occurs the circuits to relays 1048 and 1072 are interrupted thereby causing opening of their switches 1058 and 1084 which in turn open the circuit between bus bar 706 and the latch solenoids 537, 537 and also between said bus bar and motor 224. Spring 536 now actuates the latches 534 outwardly and motor 224 comes to rest. Contact element 1040 is connected to a terminal 1092 provided in a conductor 1094 by a conductor 1096.

One end of conductor 1094 is connected to the upper end of the coil 1098 of a relay 1100, the lower end of said coil being connected to ground by a conductor 1102. Upon energization of relay 1100 the normally open contact elements 1104 of its switch 1106 are closed, the connection between said relay and switch being indicated by broken lines at 1107. The upper contact element 1104 of relay switch 1106 is connected to the terminal 756 provided in conductor 758 by conductor 1108. Terminal 756, it will be remembered, is connected to the coil 178 of the solenoid 175 for releasing brake 165. The lower contact element 1104 of switch 1106 is connected to a bus bar 706 by a conductor 1110. Thus, upon closing of switch 1106, the circuit to solenoid 175 will be closed and consequently the brake 165 for the shafts 158 extending between top rail motors 127 will be released.

Terminal 1092 is connected to a terminal 1112 by a resistance coil 1114. Terminal 1112 is connected to the upper end of the coil 1116 of a relay 1118 by a conductor 1120, the lower end of said coil being connected to ground by a conductor 1122. Terminal 1112 is also connected to the upper end of a condenser 1124 by a conductor 1126, the lower end of said conductor being connected to ground by a conductor 1128. Upon energization of relay 1118 the normally open contact elements 1130 of its associated switch 1132 will be closed, the connection between said relay and switch being shown by broken lines at 1134. The upper contact element 1130 of switch 1132 has connected thereto a conductor 1136 which is connected to the top operating motors 127, 127 by parallel conductors 1138, 1138. The lower contact element 1130 of switch 1132 is connected to bus bar 706 by a conductor 1140. It will be noted that the connections between top motors 127 and switch 1132 are on the opposite side of said motors from the connections between said motors and relay switch 785. Accordingly, when switch 1132 is closed, as just described, motors 127 will operate in the reverse direction from that previously described thereby causing the lifting jacks 126 driven thereby to actuate the top structure 22 to its down or lowered position. During lowering of the top structure 22 the side rails 44 thereof will fold as previously described, until they assume the position shown by broken lines in Fig. 3. Upon movement of the top structure 22 to its down position, as just described, the movable contact element 980 of limit switch 976 will be actuated from its position in contact with fixed contact element 982 into contact with fixed contact element 984 by cam member 660c, as shown in Fig. 6. When this occurs the circuits to relays 1100 and 1118 will be interrupted thereby causing opening of their switches 1106 and 1132, respectively. The circuits to brake solenoid 175 and motors 127 are now opened. Spring 173 now applies brake 165, thereby preventing overtravel of motors 127 when the top structure 22 has been operated to its fully lowered position.

Contact element 984 is connected to the terminal 1142 of a deck lid limit switch 1144 by a conductor 1146. Switch 1144 is mounted on panel 885 adjacent to switch 876 and the spring urged button 1144a thereof is adapted to be engaged by striker plate 876b to move contact element 1148 out of engagement with contact element 1150 when the deck lid is in fully lowered position. Contact element 1148 is biased into engagement with element 1150 by a spring, as shown in Fig. 34. When deck lid 26 moves upwardly from its fully lowered position, contact element 1148 is moved by its spring into engagement with fixed contact element 1150 thereby completing the circuit, as will presently be described, to relays 892 and 914. Contact element 1150 is connected to the terminal 886 provided in conductor 894 by a conductor 1152. Terminal 886, it will be remembered, is connected to the relays 892 and 914 for controlling the operation of the brake 487 and the deck lid motors 446, respectively. Accordingly, upon closing switch 1144, the coil 890 of relay 892 will first be energized causing closing of the contact elements 898 of its switch 900 and thereby completing the circuit from bus bar 706 to solenoid 494. Solenoid 494 now releases brake 487 and conditions deck lid motors 446 for operation. Terminal 886, it will be remembered, is also connected to the coil 912 of relay 914 through the time delay connections including resistance 916 and condenser 918, and accordingly, after the lapse of a predetermined period of time following energization of relay 892, relay 914 will be energized as previously described, thereby effecting closing of the normally open contact elements 926 of its switch 928. The circuit between bus bar 706 and deck lid motors 446 is now complete and the latter operate their associated jacks 448 to swing deck lid 26 downwardly to the position shown in full lines in Fig. 3. When the deck lid 26 is moved to its fully lowered position, the striker plate 876b engages button 1144a of switch 1144 (Fig. 8b) which in turn actuates the contact element 1148 thereof out of engagement with contact element 1150. When this occurs the circuits to relays 892 and 914 are interrupted and their switches 900 and 928 move to open position. When switch 900 and 928 open, the circuits to brake solenoid 494 and deck lid motors 446 are also interrupted. Spring 492 now operates to apply brake 487 thereby preventing damage to the parts after operation of the deck lid 26 to its fully lowered position by motors 446.

The top structure 22 now has been fully lowered and the deck lid 26 also brought to its closed position and the complete cycle of lowering the said top structure to its down position has been completed. When switch 1144 is opened, as just described, no further operations can be effected until certain other circuit control switches are closed. The top structure 22, accordingly, remains in its lowered position until raising thereof is again desired.

In order to raise deck lid 26 by the manually operable adapter 498 and to operate top structure 22 by the manually operable adapter 183, the brakes 487 and 165, respectively, must first be released. A circuit has been provided which by-passes relay switches 1106 and 696 and enables operation of the brake solenoids 175 and 494, respectively, associated therewith. As shown in Fig. 34, this circuit comprises a conductor 1153 connected at one end to a terminal 1153a provided in the conductor 1108 disposed between switch 1106 and terminal 756. Conductor 1153 has a single pole normally open switch 1153b connected therein and the other end thereof is connected to a terminal 1153c. One end of a second conductor 1154 also having a normally open single pole switch 1154a connected therein is also connected to terminal 1153c. The other end of conductor 1154 is connected to a terminal 1154b provided in the conductor 702 disposed between switch 696 and terminal 700. Terminal 1153c is connected to bus bar 596 by a conductor 1155. Thus, by closing switches 1153b and 1154a the circuits between bus bar 596 and brake solenoids 175 and 494 will be closed causing release of brakes 165 and 487. The deck lid 26 may now be manually operated by adaptor 498 and after operation thereof to raised position the top structure 22 may be manually operated by adaptor 183.

*Controls for passenger entrance and exit operation of top structure*

In order to facilitate entrance to and exit from the vehicle when the top structure 22 is in its normal raised position, the said top structure may be swung upwardly about pivot 246 to the position indicated in broken lines at A in Fig. 26. After the lapse of a period of time sufficient to permit entrance to or leaving of the vehicle, the top structure will automatically swing downwardly to its normal raised position, as shown in Fig. 26. The mechanisms for causing these operations to take place will now be described in detail.

As shown in Fig. 34a, a single pole flipper switch 1156 is provided at one side of the vehicle in any convenient position. Switch 1156 comprises a movable contact element 1158 connected at one end to a terminal 1160 which in turn is connected to a switch bus bar 1162. Movable contact element 1158 is adapted to engage a fixed contact element 1164 connected to a second switch bus bar 1166. Bus bar 1162 has provided therein a terminal 1168 which is connected to a terminal 1170 provided at one end of a conductor 1172 by a conductor 1174. The other end of conductor 1172 is connected to a terminal 1176 provided in a conductor 1178. One end of conductor 1178 is connected to the fixed contact element 1180 of a bow limit switch 1182. Switch 1182 comprises a movable contact element 1184 connected at one end to a terminal 1186 provided at one end of a conductor 1188, the other end of said conductor being connected to a terminal 1190 provided on bus bar 596. Switch 1182 is mounted on one of the rail sections 44a on the side thereof opposite to that on which the previously described switches 650 and 988 are mounted. As shown in Fig. 20a, the spring urged button 1182a of switch 1182 is adapted to be engaged by an operating element 1182b carried by cable 394. Contact element 1184 is normally biased to open position by a spring as shown in Fig. 34a, and is closed only when the deck bow 54 is in its fully down position, at which time operating element 1182b has actuated button 1182a to close switch 1182. In order to operate the top structure 22 to the position indicated at A in Fig. 26, the said top structure must be in its fully up position, as shown in Fig. 1 and in full lines in Fig. 26, in which position the deck bow 54 is in its fully down position and resting upon the deck lid 26. When deck bow 54 is in this position switch 1182 will have been closed, as just described. Switch 1182 therefore operates as a safety switch since it prevents operation of the top structure to the position indicated at A in Fig. 26, unless the said top structure is in its normal raised position. Bus bar 1166 has provided therein a terminal 1192 to which one end of a conductor 1194 is connected, the other end of the latter being connected to the upper end of the coil 1196 of a relay 1198. The lower end of the coil 1196 is connected to ground by a conductor 1200. It therefore is apparent that upon closing of flipper switch 1156, current from bus bar 596 will energize relay 1198. When this occurs the normally open contact elements 1202 of the switch 1204 associated with relay 1198 will be actuated to closed position, the connections between said relay and its switch being indicated by broken lines at 1206. The other end of conductor 1176 is connected to the terminal 1208 of a limit switch 1210. The movable contact element 1212 of switch 1210 is adapted for movement into contact with either of fixed contact elements 1214 and 1216. Contact element 1212, however, is biased into contact with element 1214 by a spring as shown in Fig. 34a. Switch 1210 is mounted on bracket 72, as shown in Fig. 5, and the operating arm 1210a thereof is adapted to be operated by the operating member 1032b when the top has been swung to the position indicated in broken lines at A in Fig. 26. When the top structure 22 is in any position other than that shown at A in Fig. 26, the spring holds contact element 1212 in engagement with fixed contact element 1214. Fixed contact element 1214 is connected to a terminal 1218 provided in a conductor 1220, terminal 1218 in turn being connected by a conductor 1222 to the upper contact element 1202 of relay switch 1204. The lower contact element 1202 of switch 1204 is connected to a terminal 1224 provided in a conductor 1226 by a conductor 1227. One end of conductor 1226 is connected to the upper end of the coil 1228 of a relay 1230, the lower end of said coil being connected to ground by a conductor 1231. It now is apparent that upon closing of relay switch 1204, as previously described, current will flow from bus bar 596 to the coil 1228 of relay 1230 thereby energizing the latter. Upon energization of relay 1230 the normally open contact elements 1232 of its switch 1234 will be actuated to closed position and the normally closed contact elements 1236 of a second switch 1238 will be opened, the connections between said relay and said switches being indicated by broken lines at 1239. Conductor 1220 is connected to the upper contact element 1232 of switch 1234 while conductor 1226 is connected to the lower contact element thereof. Upon closing of the contact elements 1232 of switch 1234, the current will now by-pass switch 1204 and flow directly to the coil 1228 of relay 1230, and, accordingly, said coil will remain energized even though flipper switch 1156 is now opened. Switch 1234 therefore will remain closed and switch 1238 open until switch 1234 is again opened.

Conductor 1226 has provided therein another terminal 1240 to which one end of a conductor 1242 is connected, the other end of the latter being connected to the fixed contact element 1038 of limit switch 1032. When the top structure 22 is in its fully up position as shown by full lines in Fig. 26, movable contact element 1036 of switch 1032 will be in contact with fixed contact element 1038, as previously described. Contact element 1038, it will be remembered, is connected to the terminal element 1042 which in turn is operatively connected to the coils 1046 and 1070, respectively, of relays 1048 and 1072. Consequently, upon closing of switch 1204 or 1234, relay 1048 will first be energized causing closing of its switch 1058. Solenoids 537, 537 associated with the header latches 534, 534 will now be energized causing withdrawal of the latter, thereby releasing the header 46 from the windshield frame 18. After a predetermined time delay provided by resistance 1068 and condenser 1076, relay 1072 will be energized causing closing of its switch 1084. The circuit to motor 224 is now closed and the latter operates worm 196 causing rotation of worm wheel 194 and pulley 232. Pulley 232, as previously described, operates pulley 236 by cable 234 causing the top structure 22 to swing upwardly about its pivotal connection 246 to the position shown in broken lines at A in Fig. 26. The driver and passengers may now either enter or leave the vehicle, as the case may be. Upon movement of the top structure to the position indicated at A in Fig. 26, the movable contact element 1212 of switch 1210 will move from its position in engagement with contact element 1214 into contact with fixed contact element 1216 by operating member 1032b. When this occurs the circuit to relay 1230 is interrupted causing switch 1234 to open and switch 1238 to close. The circuits to relays 1048 and 1072 are also opened thereby causing opening of switches 1058 and 1084, respectively. Header latch solenoids 537, 537 are now de-energized causing springs 536, 536 to swing latches 534, 534 outwardly. The opening of switch 1084 also interrupts the circuit to motor 224, which now comes to rest.

Contact element 1216 is connected to the terminal 1244 of switch 1246 by conductor 1248. The movable contact element 1250 of switch 1246 is connected to terminal 1244 and is adapted to engage a fixed contact element 1252 which in turn is connected to a terminal 1254 by a conductor 1255. Terminal 1254 is connected to a terminal 1256 provided in a conductor 1258 by a conductor 1259. Terminal 1256 is connected to the upper end of the coil 1260 of a timer clutch control device by a conductor 1262, the lower end of said coil being connected to ground by a conductor 1264. Conductor 1258 is also connected to the terminal 1266 of a time control switch 1268. The movable contact element 1270 of switch 1268 is adapted to engage either fixed contact element 1272 or fixed contact element 1274. Contact element 1272 is connected to a timer motor 1276 by a conductor 1278, the timer motor in turn being connected to ground by a conductor 1280. The timer motor 1276 may be of any suitable type and is so constructed that it may be preset so as to operate switch element 1270 from engagement with contact element 1272 into engagement with contact element 1274, the connection between said motor and switch element being shown in broken lines at 1282. Accordingly, when the top structure has been actuated to its vertical position as shown in broken lines at A in Fig. 26, as previously described, switch element 1212 will have been actuated into engagement with contact element 1216, thereby connecting timer motor 1276 to bus bar 596. After a predetermined lapse of time, timer motor 1276 actuates switch element 1270 into engagement with contact element 1274.

Contact element 1274 is connected to a fixed contact element 1284 of a limit switch 542c by a conductor 1288. The movable contact element 1290 of switch 542c is connected to a terminal 1292 provided at one end of a conductor 1294, the other end of said conductor being connected to a terminal 1296 provided in a conductor 1298. The other end of conductor 1298 is connected to a conductor 1300. Conductor 1300 is connected at one end to the fixed contact element 804 of switch 542c and at the other end to the upper end of a resistance coil 813 which coil in turn is connected to a terminal 1304 provided at one end of conductor 812. Limit switch 542c is mounted in the header 46 and the movable contact element 1290 thereof is biased into engagement with fixed contact element 1284 by a spring, as shown in Fig. 34a. The operating arm 544 of switch 542c engages the frame 18 of windshield 16 when the top structure 22 has been actuated to its up position, as shown in full lines in Fig. 26. When header 46 is out of engagement with frame 18, however, the spring swings contact element 1290 into engagement with fixed contact element 1284. Consequently, after a predetermined period of time has elapsed after the top structure has been actuated to the position shown at A in Fig. 26, switch element 1270 will be actuated into engagement with contact element 1274, thereby completing the circuit from bus bar 596 to relays 810, 840, and 1363e through conductors 1188, switch 1182, switch 1210, conductor 1248, switch 1246, conductor 1258, switch 1268, conductor 1288, switch 542c, conductor 1294, conductor 1298, resistance 813, conductors 812, 834, 1363h and 841. When relay 1363e is energized its switch 1363a closes thereby also completing the circuit from bus bar 596 to the above referred to three relays.

Upon energization of relay 810 its switch 818 will be closed thereby completing the circuit to header latch solenoids 537, 537 as previously described, causing the latter to again withdraw the latches 534, 534 to condition header 46 for movement into engagement with frame 18. After energization of relay 810 in this manner, relay 840 will be energized after a predetermined lapse of time, the time delay being provided by resistance 842 and condenser 846. Upon energization of relay 840, its switch 854 will be closed thereby closing the circuit to motor 224 which then operates pulleys 232 and 236 in the reverse direction causing the top structure 22 to move downwardly about pivot 246 until it assumes the position shown in full lines in Fig. 26. Upon the initial downward movement of top structure 22 contact element 1212 of switch 1210 will be moved out of engagement with contact element 1216 and into contact with contact element 1214 by engagement of switch operating arm 1210a by actuating element 1032b. When the top structure is lowered into engagement with frame 18, the movable contact element 1290 of switch 542c is actuated out of engagement with fixed contact element 1284 thereby interrupting the circuit to relays 1363e, 810 and 840. The circuits to solenoids 537, 537 are now interrupted and the springs 536, 536 function to operate the latches 534, 534 into locking engagement with the frame 18. Upon opening of switch 854 as previously described the circuit to motor 224 also is interrupted and, accordingly, it immediately comes to rest. The cycle of operation of the top structure 22 from the position shown in full lines in Fig. 26 to the position shown in broken lines at A therein and back to the former position after a delay of a predetermined period of time, has now been completed and all the operating circuits have been opened. The top structure 22 will now remain in the position shown in full lines in Fig. 26 until it is desired to again actuate it to another position. It will be noted, also, that relay switch 1236 enables the circuit to motor 224 to be reversed during downward movement of the top so that when opened the operation of the top will be reversed and it will then move to an out of the way position as previously described. Switch 1236 may be opened by its relay 1230 upon closing of flipper switch 1156 or 1306, as previously described.

Switch 1156 is placed adjacent the left-hand door 40 of the vehicle. A similar switch 1306 is provided adjacent the right-hand door 40 of the vehicle. This switch also comprises a movable flipper contact element 1308 connected at one end to a switch terminal 1310 provided in switch bus bar 1162 and a fixed contact element 1311 provided in switch bus bar 1166.

Figure 12:
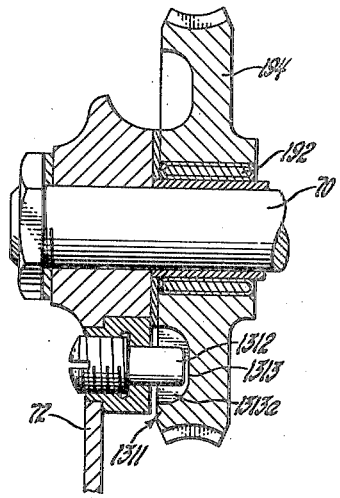
Fig. 12 is a sectional view taken substantially along line 12—12 of Fig. 5.

In order to prevent overtravel of the top structure 22 in either direction a limit stop 1312 is provided. As shown in Figs. 5 and 12, a pin 1312' is threadedly secured to bracket 72 and extends into an annular recess 1313 provided in one side of pulley 194. A pair of abutments 1313a and 1313b are secured, by machine screws 1313c or by any other suitable means, in spaced relation in recess 1313. Thus when pulley 194 has been turned the required distance in either direction, pin 1312 engages abutment 1313a or 1313b, as the case may be, thereby preventing further movement thereof and consequently of top structure 22.

In the event that it is desired to operate the top structure to and from the position shown in broken lines at A in Fig. 26 without the timer control just described, the following controls are provided. As shown in Fig. 34a, a single pole switch 1314 is provided, comprising a movable contact element 1316 connected at one end to a terminal 1318 which in turn is connected to switch bus bar 1162 by a conductor 1320, and a fixed contact element 1322. Contact element 1322 is connected to a conductor 1326 having a terminal 1328 provided intermediate the ends thereof which in turn is connected to the fixed terminal 1330 of a switch 1332 by a conductor 1334. The movable contact element 1336 of switch 1332 is adapted to engage a fixed contact element 1338 for normal operations of the device by the timer motor 1276, or a contact 1340 when it is desired to operate the device without said timer motor. Switch 1332 is connected to the movable contact element 1250 of switch 1246 by a mechanical connection indicated by broken lines at 1342. When switch element 1336 is swung into contact with contact element 1340, movable contact element 1250 of switch 1246 is moved out of contact with the fixed contact element 1252 thereof, thereby interrupting the circuit to both the timer clutch device 1262 and the timer motor 1276. Contact element 1340 is connected to a terminal 1344 provided in a conductor 1346 by a conductor 1345. Conductor 1346 is connected to the upper contact element 1236 of relay switch 1238. The lower contact element 1236 of switch 1238 is connected to a terminal 1348 by a conductor 1350, the terminal 1348 in turn being connected to the terminal 1274 of switch 1268 by a conductor 1351.

From the foregoing description it is seen that in order to move the top structure 22 to the position shown in broken lines at A in Fig. 26 from the position shown in full lines therein, switch 1156 or 1306, as the case may be, is closed. The top structure 22, consequently will now be raised by the mechanism just described. To lower the top to the position shown in full line in Fig. 26, switch 1316 is moved into engagement with contact element 1322 and switch element 1336 is moved into engagement with contact element 1340. When switch 1316 is so adjusted the contact element 1250 of switch 1246 is moved to open position thereby cutting out timer clutch coil 1260 and timer motor 1276. When these adjustments have been made the current from bus bar 596 will now flow through conductor 1188, switch 1182, conductors 1178, 1172, 1174, and 1162, and switches 1314 and 1332, conductors 1345 and 1346, switch 1238, conductors 1350, 1351 and 1288, switch 542*c*, and conductor 1294 to relays 810 and 840 which control, respectively, the header latch solenoids 547, 547 and motor 224, as previously described, causing the header latches 534, 534 to first be retracted and then the motors 224 to be operated to effect movement of the top structure to its position shown in full lines in Fig. 26.

A timer cut-out switch 1352 is also provided. As shown in Fig. 34*a* the movable contact element 1354 of switch 1352 is connected to a terminal 1356 which in turn is connected by a conductor 1358 to the terminal 1254 provided in conductor 1252. The stationary contact element 1360 of switch 1352 is connected to terminal 1348 by a conductor 1362. Thus, by actuating contact element 1354 into engagement with contact element 1360, a short circuit around timer clutch device 1262 and timer motors 1276 is provided.

A second single pole switch indicated at 1363 similar to switch 1314 is provided between switch bus bar 1162 and conductor 1326. Switch 1363 is mounted at the opposite side of the vehicle from switch 1314 and, accordingly, manipulation of the top structure to its down position may be controlled from either side of the vehicle.

In order to avoid the necessity of holding either switch 1314 or 1363 in closed position until the top structure moves from the position shown in broken lines at A in Fig. 26 to its fully down position shown in full lines in said figure, a normally open relay switch 1363*a* is provided. The upper contact element 1363*b* of switch 1363*a* is connected to a terminal 1363*c* in conductor 1176 while the lower contact element thereof is connected to terminal 1344 by a conductor 1363*d*. Switch 1363*a* is actuated to closed position by a relay 1363*e*, the connection between said switch and relay being shown in broken lines at 1363*f*. The upper end of the coil 1363*g* of relay 1363*e* is connected to the terminal 832 by a conductor 1363*h* while the lower end of said coil is connected to ground by a conductor 1363*i*. It therefore will be observed that upon closing of switch 1314 or 1363 when the top structure 22 is in the position shown in broken lines at A in Fig. 26, relays 810 and 840 will be energized through the connections previously described. At the same time, current will flow through the coil 1363*g* of relay 1363*e* through connection 1363*h*. When this occurs, relay 1363*e* will be energized and will actuate its switch 1363*a* to closed position. Current will now flow from bus bar 596 through conductor 1188, switch 1182, conductor 1178, switch 1363*a*, switch 1238, conductors 1350, 1351 and 1288, switch 542*c*, conductor 1294, conductor 1298, resistance 813, conductor 812 and thence to the coil 809 of relay 810 and also through conductor 834, resistance 842 to the coil 838 of relay 840. Switch 1314 or 1363, upon energization of relay 1363*e*, may then be opened since switch 1363*a* will now be held closed by said relay and current will flow through that switch to the relays 810 and 840 without passing through switch 1316 or 1363.

It will be remembered that switch 542*b* remains closed during movement of the top structure 22, about pivot 246 a short predetermined distance beyond the position shown in dotted lines at B in Fig. 26. This prevents the normal downward movement of any of the elements associated with the top structure 22 or deck lid 26 during the period that motor 224 has been conditioned to operate the said top structure about pivot 246 to an out of the way position or during the return operation of said top structure at any point between the positions thereof shown at A and B of Fig. 26.

If desired the electric circuit obviously may be modified slightly so that the top structure may be operated to an out of the way position as shown in dotted lines at A in Fig. 26, as just described, only when the transmission control switch 602 is in its neutral or park position. This may be done by simply connecting conductor 1188 to the terminal 618 in conductor 620, or directly to the latter at any point between terminal 618 and ignition switch 622 instead of the terminal 1190 in conductor 596, as now shown. By so connecting conductor 1188, it is seen that the circuit to motor 224 will be closed only when switch 602 is in its park or neutral position.

*Rain controls for top structure and windows*

The control circuit also has provided therein means which causes operation of the top structure 22 and the windows 42 of the vehicle to raised position, as shown in Fig. 1, in the event of rain. The controls which effect these operations will now be described in detail.

Referring to Fig. 34, the fixed contact element 1364 of a single pole switch 1366 is connected to the terminal 1368 on bus bar 596 by a conductor 1370. The movable contact element 1372 of switch 1366 is connected to the switch terminal 1374, the latter in turn being connected to the fixed contact element 1380 of a secret switch 1382. Switch 1366 is mounted on a lower rail section 44*a* and the movable contact element 1372 thereof is biased into contact with fixed contact element 1364 by a spring, as shown in Fig. 34. Switch 1366 is mounted adjacent switch 650, as shown in Fig. 20, and the switch button 1366*a* thereof is adapted to be engaged by operating member 650*c* when the bow 52 is in its down position. Movable contact element 1372 is now moved out of contact with fixed contact element 1364 to open switch 1366 at the same time that switch 650 is being opened by said member 650*c*. Switch 1382 may be located in the glove compartment of the vehicle or at any other location and may be opened in the event that it is not desired to effect operation of the top structure 22 and windows 42 as a result of moisture falling on a rain control switch which will presently be described. Switch 1382 comprises a movable contact element 1388 which is connected to the switch terminal 1390. Switch terminal 1390 is connected to the upper end of the coil 1394 of a relay 1396 by a conductor 1392. The lower end of the coil 1394 is connected to the cross wire 1398 of one element 1400 of a rain or moisture operated switch, indicated generally at 1402. Cross wire 1398 has connected thereto three spaced substantially parallel wires 1404 which lie in side-by-side spaced relation with four similar wires 1406 connected to a lower cross wire 1408 which in turn is connected to ground by a conductor 1410. The wires 1404 and 1406 have provided thereon a form of multi-filament material which is impregnated with an electrolytic agent which when dry is nonconductive but when wet becomes highly conductive thereby establishing electrical communication between wires 1404 and 1406. For a more complete description of the specific type of rain actuated switch 1402, reference may be had to the co-pending application of Robert J. Ballard, Serial No. 244,823, filed September 1, 1951, for Moisture Responsive Control Means. It is apparent that should the top structure 22 be in its down position, as shown by broken lines in Fig. 3, and rain or other moisture should now come in contact with switch 1402, said switch will immediately close and thereby complete the circuit from bus bar 596 through relay 1396. When relay 1396 is so energized, the normally open contact elements 1412 of its switch 1414 will be closed, the connection between said relay and switch being indicated by broken lines at 1416. The upper contact element 1412 of switch 1414 is connected to the terminal 1418 provided on bus bar 596 by a conductor 1420 while the lower contact element thereof is connected, by a conductor 1422, to a terminal 1424 provided at one end of a conductor 1426. Conductor 1426 is connected to a terminal 1427 provided on conductor 1410 and thus is connected to ground and has a resistance coil 1428 connected in series therein. Terminal 1424 is connected to the upper end of the coil 1430 of a relay 1432, the lower end of said coil being connected to ground by a conductor 1434. Upon closing of switch 1414, the circuit from bus bar 596 through relay 1432 will have been completed thereby causing energization of the latter. Upon energization of relay 1432 the normally open contact elements 1435 of its switch 1436 will be closed, the connection between said relay and switch being indicated by broken lines at 1437. The upper contact element 1435 of switch 1436 is connected to a terminal 1438 provided in conductor 1384 by a conductor 1439 while the lower contact element of said switch is connected to the terminal 644 provided in conductor 646 by a conductor 1441. Thus, upon closing of switch 1436, the circuit from bus bar 596 through bow switch 650 will be closed. It will be remembered, that when the top is in fully lowered position the deck bow 54 is still in its up position and, consequently, the said limit switch 650 is closed. The operation of the top structure 22 will now follow the same sequence of operations as was previously described when the contact element 636 of ball lever control switch 634 was moved into contact with fixed contact element 638. Inasmuch as the sequence of operations of the various elements required to move the top structure 22 from its position in the storage compartment to its fully raised position is exactly the same whether such operations are initiated upon closing of switch 634 or 1436, a detailed description thereof need not be repeated. Suffice it to say, that when moisture falls upon switch 1402, switch 1414 will first be closed followed by closing of switch 1436, thereby completing the circuit to bus bar 596 which results in the movement of top structure 22 to the fully raised up position. When the cycle of operation previously described has been completed operating member 650c opens switches 650 and 1366 and the top structure 22 now remains in raised position until it is desired to again lower it or to raise it to the position shown by broken lines at A in Fig. 26.

The resistance coil 1428 is disposed adjacent to rain switch 1402 but insulated therefrom and operates to dry the switch after being subjected to moisture. When the specific type of moisture controlled switch described herein and in the previously referred to application Serial No. 244,823 is employed, the cut-out switch 1366 is dispensed with since it is desirable to have current pass through heating coil 1428 after raising of the top 22 and windows 42 has been completed in order to dry out the said switch 1366. When dry, switch 1366 opens automatically and thus interrupts the circuit to bus bar 596. Cut-out switch 1366 is employed in cases wherein other types of moisture controlled switches are employed, especially those having no heating means associated therewith and wherein interruption of the circuit to the moisture controlled switch and to all of the relays and other elements connected thereto is desirable after the top structure 22 has been raised to fully up position and the windows 42 have been closed.

It may be desirable to prevent operation of the top structure through the rain controlled switch 1402 unless the car is not in use. This may be done by connecting conductor 1420 to one of the normally closed contacts of an ignition switch, the opposing contact of said switch being connected to bus bar 596. This is done to prevent operation of either the top 22 or windows 42 by the rain switch unless the ignition keys are removed from the ignition.

*Controls for raising and lowering vehicle windows*

Automatic controls are also provided to effect closing of the windows 42 when rain switch 1402 is closed and these controls will now be described in detail. Conductor 1426 also has connected thereto in parallel, a pair of relays 1440 and 1442. The upper end of the coil 1444 of relay 1440 is connected to a second terminal 1446 on conductor 1426 while the lower end thereof is connected to ground by conductor 1448. The upper end of the coil 1450 of relay 1442 is connected to a third terminal 1452 on conductor 1426 while the lower end of said coil is connected to ground by conductor 1454. It is apparent that upon closing of relay switch 1414, as previously described, the coils 1444 and 1450 of relays 1440 and 1442, respectively, also will be energized. Upon energization of relay 1440 in this manner, the normally open contact elements 1456 of its switch 1458 (Fig. 35) will be closed, the connection between said relay and its associated switch being shown by broken lines at 1460. Upon energization of relay 1442 the normally open contact elements 1462 of its switch 1464 will be closed, the connection between said relay and its associated switch being indicated by broken lines at 1466. Relay switches 1458 and 1464 control the circuits to the electric motors 574, 574 for operating the windows 42 provided at the right and left-hand sides, respectively, of the vehicle.

As shown in Fig. 35, the left-hand contact element 1456 of switch 1458 is connected to a terminal 1468 provided at one end of a conductor 1472 by a conductor 1470. Conductor 1472 has a terminal 1474 provided intermediate its ends which is connected to a terminal 1476 on bus bar 596 by a conductor 1478. The right-hand contact element 1456 of switch 1458 is connected to a terminal 1480 provided in a conductor 1482 which conductor is connected at one end to a fixed contact element 1484 of a manually operable switch 1486 for controlling the operation of the motor 574 for the window 42 provided in the right-hand door of the vehicle. The other end of the conductor 1482 is connected to the fixed contact element 1488 of an upper limit switch 1490 for the window 42. The movable contact element 1492 of switch 1490 is connected to a switch terminal 1494 which in turn is connected to a terminal 1496 by a conductor 1498. Terminal 1496 is connected, by a conductor 1500, to the upper end of the coil 1502 of a relay 1504, the lower end of said coil being connected to ground by a conductor 1506. Terminal 1496 is also connected to the upper end of a condenser 1508 by a conductor 1510 having a resistance coil 1512 connected therein, the lower end of said condenser being connected to a terminal 1513 on conductor 1506 which in turn is connected to ground, as previously described. Limit switch 1490 is mounted in door panel 40a at one side of window panel 42 as shown in Fig. 32 and the movable contact element 1492 thereof is biased into contact with contact element 1488 by a spring, as shown in Fig. 35. When the window has been moved to raised position, an operating member 1490a carried by window panel 42 engages the operating arm 1490b of switch 1490 and moves element 1492 out of contact with fixed contact element 1488 thereby opening said switch. Thus when right hand window 42 is in any position other than fully raised position the spring closes switch 1492. It is apparent therefore that when relay switch 1458 is closed, as previously described, the circuit to relay 1504 will also be closed when the window is in any position other than fully raised position. Upon energization of relay 1504 the normally open contact elements 1514 of its switch 1516 will be closed, the connections between said relay and its switch being shown by broken lines at 1518. The upper contact element 1514 of switch 1516 is connected to a terminal 1520 provided in a conductor 1522 which in turn is connected at one end to a terminal 1524 provided on bus bar 596. The lower contact element 1514 of switch 1516 is connected to one side of motor 574 by a conductor 1526. Motor 574 is connected to ground by the connections indicated generally at 1528. It now will be seen that upon closing of switch 1458, as previously described, the circuit between bus bar 596 and right-hand motor 574 has been completed and, consequently, motor 574 will operate its associated window 42 to closed or raised position. When the window has been so actuated member 1490a engages switch operating arm 1490b to open switch 1490 thereby interrupting the circuit between relay 1504 and bus bar 596. During operation of window 42 to closed position condenser 1508 is being charged. Accordingly when the switch 1490 is opened condenser 1508 discharges through relay 1504. The coil of relay 1504 therefore remains charged for a short period after opening of switch 1490 and accordingly motor 574 operates to force window 42 tightly into engagement with top structure 22. When condenser 1508 becomes discharged switch 1516 opens thereby interrupting the circuit between bus bar 596 and motor 574 which then comes to rest.

The connections between relay switch 1464 and the left-hand window operating motor 574 are substantially the same as those between switch 1458 in the right-hand window operating motor 574 just described. The right-hand contact element 1462 of switch 1464 is connected to the terminal 1530 provided at the other end of conductor 1472 by a conductor 1531. The left-hand contact element 1462 is connected by, a conductor 1532, to a terminal 1533 provided in a conductor 1534 which in turn is connected at one end to a fixed contact element 1536 of a switch 1538 for manually controlling the operation of the operating mechanism for the left-hand window 42. The other end of conductor 1534 is connected to the fixed contact element 1540 of the upper limit switch 1542 for left hand window 42. The movable contact element 1544 of switch 1542 is connected to a switch terminal 1546 which in turn is connected to a terminal 1548 by conductor 1550. Terminal 1548 is connected to the upper end of the coil 1552 of a relay 1554 by a conductor 1556, the lower end of said coil being connected to ground by a conductor 1558. Terminal 1548 is also connected to the upper end of a condenser 1560 by a conductor 1562 having a resistance coil 1564 therein. The lower end of condenser 1560 is connected to a terminal 1565 provided on conductor 1558 by conductor 1566. Switch 1542 is similar to limit switch 1490 associated with the right-hand window 42 and is mounted in similar fashion on the left-hand door frame (not shown). Switch 1542 also is biased into contact with its fixed contact element 1540 by a spring, as shown in Fig. 35, and is opened by an operating element carried by left-hand window panel 42 striking a switch operating arm when the window has been moved to fully raised position. Relay 1554 when energized closes the normally open contact elements 1568 of its switch 1570, the connection between said switch and relay being shown in broken lines at 1572. The upper contact element 1568 of relay switch 1570 is connected to a terminal 1574 provided at the end of conductor 1522 which, it will be remembered, is connected to bus bar 596 as shown at 1524. The lower contact element 1568 of switch 1570 is connected to one side of the motor 574 for the left-hand window panel 42 by a conductor 1576. Motor 574 is connected to ground by the connections shown generally at 1578. From the foregoing description it is seen that upon closing of relay switch 1464 in the manner previously described, relay 1554 will be energized when the left-hand window 42 is in any position other than fully raised position. Upon energization of relay 1554 its switch 1570 will be closed thereby completing the circuit between left-hand motor 574 and bus bar 596. Motor 574 now operates left-hand window 42 to its closed or raised position of adjustment. When window 42 is so operated limit switch 1542 is opened, as previously described. When switch 1542 opens, the discharge of condenser 1560 maintains the coil of relay 1554 energized for a short period thereby causing motor 574 to actuate for a short period thereby causing motor 574 to actuate window panel 42 tightly against top structure 22. Upon the discharge of condenser 1560 switch 1570 opens and motor 574 then comes to rest. It therefore is seen that in the event that rain should fall upon switch 1402, the top structure 22 as well as the windows 42 will immediately be actuated to raised position, as shown in Fig. 1, thereby protecting the interior of the vehicle against said rain.

*Manual controls for raising and lowering windows*

The manually operable switch mechanisms 1486 and 1538 are so arranged that either the right or left-hand window 42 may be operated from either side of the car. As shown in Fig. 35, the terminal 1581 on bus bar 596 is connected to the central terminal 1582 of switch mechanism 1486 by a conductor 1584. Terminal 1582 is connected to the terminals 1586 and 1588 of the control switches 1590 and 1592 provided near the right and left-hand doors, respectively, of the vehicle by conductors 1594 and 1596. The movable contact element 1598 of switch 1590 is adapted to move into engagement with the fixed contact element 1600 or 1602. Contact element 1600 is connected to a terminal 1604 provided in conductor 1482 by a conductor 1606. Terminal 1602 is connected to a terminal 1608 provided in a conductor 1610 by a conductor 1612. Conductor 1610 is connected at one end to the fixed contact element 1614 of switch 1592 and at the other end to the fixed contact element 1618 of the lower limit switch 1620 associated with right-hand window 42. The movable contact element 1622 of switch 1592 is adapted to move into engagement with either contact element 1484 provided in conductor 1482 or into contact with contact element 1614 provided in conductor 1610. The movable contact element 1624 of switch 1620 is connected to a switch terminal 1626 which in turn is connected to a terminal 1628 by conductor 1630. Terminal 1628 is connected to the upper end of the coil 1632 of relay 1634 by a conductor 1635, the lower end of said coil being connected to ground by a conductor 1636. Terminal 1628 is also connected to the upper end of a condenser 1638 by a conductor 1640 having a resistance coil 1642 connected therein. The lower end of condenser 1638 is connected to conductor 1636 by a conductor 1644. Limit switch 1620 is connected to the side panel 40a of door 40 near the lower end thereof as shown in Fig. 32. The movable contact element 1624 of switch 1620 is biased into contact with fixed contact element 1618 by a spring, as shown in Fig. 35, and remains in that position during all positions of window 42 except in its lowered position. When window 42 is in its lowered position operating member 1490a engages the switch operating arm 1620a and moves contact element 1624 out of engagement with fixed contact element 1618 to thereby interrupt the circuit to relay 1634. It now is apparent that upon energization of the coil 1632 of relay 1634, the normally open contact elements 1646 of its associated switch 1648 will be actuated thereby to closed position. The upper contact element 1646 of switch 1648 is connected to a terminal 1650 in conductor 1522 by conductor 1652 while the lower contact element thereof is connected to motor 574 by a conductor 1654. It will be noted that conductor 1654 is connected to the opposite side of motor 574 from the conductor 1526 leading from relay switch 1516, as previously described. Consequently, upon closing of switch 1648, as just described, motor 574 will be rotated in the reverse direction to cause lowering of right-hand window 42. When window 42 is moved to its fully lowered position switch 1620 will be opened by engagement of arm 1620a by operating member 1490a thereby interrupting the circuit from bus bar 596 to relay 1634. The coil 1632 of relay 1634, however, will remain energized by the discharge of condenser 1638 and as a result switch 1648 will remain closed until condenser 1638 is fully discharged even though limit switch 1620 is open. Motor 574 therefore will continue to operate for a short period after switch 1630 opens. This assures movement of window 42 to completely open position. After discharge of condenser 1638 relay 1634 becomes de-energized and its switch 1648 opens causing motor 574 to come to rest. To raise or close window 42, switch element 1598 is moved into contact with element 1600 or contact element 1622 is moved into contact with contact element 1484. This causes closing of relay switch 1516 thereby completing the circuit to motor 574 which now operates to raise window 42, as previously described.

Switch structure 1538 also comprises a switch 1656 provided adjacent the right-hand door and a switch 1658 provided adjacent the left-hand door for raising or lowering the window at the left-hand side of the vehicle. The movable contact element 1660 of switch 1656 is adapted to move into engagement with contact element 1662 provided in a conductor 1664 or a contact element 1666 provided in a conductor 1668. Conductors 1664 and 1668 are connected to terminals 1670 and 1672 provided, respectively, in a conductor 1674 and conductor 1534. The movable contact element 1660 of switch 1656 is connected to a switch terminal 1676, which in turn is connected to a terminal 1680 provided at one end of a conductor 1682, the other end of the latter of which being connected to terminal 1684 provided on bus bar 596. Terminal 1680 is also connected to the switch terminal 1686 to which the movable contact element 1688 of switch 1658 is connected. Contact element 1688 is adapted to move into engagement with contact element 1536 or a second fixed contact element 1690 provided at one end of a conductor 1674. The other end of conductor 1674 is connected to the contact element 1692 of a limit switch 1694 associated with the circuit to the motor 574 for the left-hand window 42. The movable contact element 1696 of switch 1694 is connected to a switch terminal 1698 which in turn is connected by a conductor 1700 connected to a terminal 1702. Terminal 1702 is connected to the upper end of the coil 1704 of relay 1706 by a conductor 1707, the lower end of said coil being connected to ground by a conductor 1708. Terminal 1702 is connected to the upper end of a condenser 1710 by a conductor 1712 having a resistance 1714 provided therein, the lower end of said condenser being connected to conductor 1708 by a conductor 1718. Limit switch 1694 is similar to lower limit switch 1620 and is mounted on the side panel near the lower end of the window well of the left-hand window. The movable contact element 1696 of switch 1694 is normally biased by a spring, as shown in Fig. 35, into contact with fixed contact element 1692 and is moved out of contact therewith, by an operating member carried by the left-hand window similar to member 1490a shown in Fig. 32, only when the window is in its fully lowered position. It is now apparent that upon energization of the coil 1704 of relay 1706 the normally open contact elements 1720 of its switch 1722 will be actuated thereby to closed position, the connection between said relay and switch being indicated by broken lines at 1724. The upper contact element 1720 of switch 1722 is connected to the terminal 1726 provided in conductor 1522 which in turn is connected to bus bar 596, as previously described. The lower contact element 1720 of switch 1722 is connected to the motor 574 associated with the left-hand window 42 by a conductor 1728. Conductor 1728 is connected to the opposite side of motor 574 from the conductor 1576 leading from switch 1570 and, accordingly, upon closing of switch 1722, as just described, said motor will operate window 42 to open or lowered position. When the window has been lowered to its fully lowered position switch 1694 is operated to open position, as previously described. However, inasmuch as condenser 1710 has been charged during the energization of coil 1704 of relay 1706, upon opening of limit switch 1694 it will now discharge through said coil, thereby maintaining said coil energized even though switch 1694 is open. Switch 1722 will, accordingly, remain closed for a short period after switch 1694 has been opened thereby causing the motor 574 to move window 42 downwardly to its fully open position. When the condenser 1710 has been discharged, relay switch 1722 will open thereby interrupting the circuit to motor 574 which then comes to rest. Thus it is apparent that to open the left-hand window, contact element 1660 of switch 1656 is actuated into engagement with contact element 1662 or contact element 1688 of switch 1658 is moved into engagement with contact element 1690. This causes closing of relay switch 1722 and the window will now be opened or lowered by motor 574, as just described. To raise or close the left-hand window 42, contact element 1660 of switch 1656 is moved into engagement with contact element 1666 or contact element 1688 of switch 1658 is moved into engagement with contact element 1536. Relay switch 1570 is now closed and consequently the circuit to motor 574 is closed and the latter now operates the window to closed or raised position, as previously described. It therefore is seen that either the right or left-hand window 42 may be individually opened or closed by simply closing appropriate switches disposed at either side of the vehicle. It is also seen that in the event of rain both windows 42 will be automatically actuated to raised or closed position thereby protecting the interior of the vehicle against moisture.

*Emergency cut-out controls*

In order to stop the operation of the top structure or any of its associated parts while being moved to either raised or lowered position and thereby prevent accidental injury to persons or damage to property, emergency cut-out switches 1740 and 1742 are provided. Switch 1740 is provided adjacent the right-hand side of the vehicle while switch 1742 is disposed adjacent the left-hand side of said vehicle. The terminal 1744 of switch 1740 is connected by a conductor 1746 to a terminal 1748 provided on bus bar 596. The fixed contact element 1750 of switch 1740 is connected to a terminal 1752 provided at one end of a conductor 1754, the other end of said conductor being connected to the fixed contact element 1756 of switch 1742. The switch terminal 1758 of switch 1742 is connected to a terminal 1760 provided in conductor 1746 by a conductor 1762. The movable contact elements 1764 and 1766 of switches 1740 and 1742, respectively, are adapted to be moved manually from their open positions shown in Fig. 34 into contact with fixed contact elements 1750 and 1756. Terminal 1752 is connected to the upper end of the coil 1768 of a relay 1770, the lower end of said relay being connected to ground by a conductor 1772. When relay 1770 is energized by closing switch 1740 or 1742, the normally closed contact elements 1774 of switch 1776 will be opened thereby interrupting the circuit between bus bars 596 and 706, the connection between said relay and switch being shown by broken lines at 1778. When this occurs the circuits to all of the motors and solenoids connected to bus bar 706 will be opened, and consequently, the operation of said motors and solenoids will be immediately stopped. When it is desired to resume operation, switch 1740 or 1742 is opened. Relay 1770 is now de-energized and its switch 1776 closes thereby again establishing the circuit between bus bars 596 and 706. Resumption of the operation interrupted by closing of emergency switch 1740 or 1742 now takes place until it is completed.

*Summary*

From the foregoing description it is apparent that a complete and highly efficient operating mechanism has been provided for effectively causing actuation of the top structure to different positions of adjustment. To raise the top, the operator simply actuates main control switch 634 into engagement with contact element 633. The deck lid 26 now is first operated upwardly by its motors 446 and after said deck lid has been moved to its upper position of adjustment, motors 127 automatically are started up and operate the top structure to the position shown in broken lines at B in Fig. 26. After this occurs, solenoids 537 are first energized causing retraction of latches 534 and then motor 224 automatically functions to lower the top structure to the position shown in full lines in Fig. 26. Motor 224 then comes to rest and solenoids 537 are de-energized whereupon springs 536 operate latches 534 into locking engagement with frame 18. The deck lid motors 446 are now automatically energized and function to lower the deck lid after which bow motor 386 operates to lower the deck lid bow 54 into engagement with the deck lid 26, as shown in Fig. 3. When this occurs, switch 650 is opened and the complete cycle of operating the top structure 22 to its raised position has been completed.

To lower the top structure the operator simply moves switch 634 into engagement with contact element 640 thereof. When this occurs, the bow motor 386 is energized and operates deck bow 54 to its raised position, after which deck lid motors 446 are automatically energized causing movement of deck lid 26 to its raised position. When this occurs, the latch solenoids 537 are energized thereby retracting header latches 534 to enable movement of the top structure upwardly away from windshield frame 18. Motor 224 is now automatically connected into the circuit and operates to move the top structure to position shown in broken lines at B in Fig. 26, thus clearing the windshield frame 18. Motors 127 are now automatically energized and operate to lower the top structure to the position shown in broken lines in Fig. 3. Upon movement of top structure 22 downwardly by its motors 127, the latch mechanism 270 shown in Figs. 9 and 16 to 19 is first released and the joint between intermediate and front rail sections 44b and 44c, respectively, is broken by striker arm 274, the said striker arm then continuing to raise the front rail sections 44c upwardly about pivot 120. This folding action of intermediate and front rail sections and also the folding action between lower rail sections 44a and intermediate rail sections 44b continues, as shown in Fig. 27, until the top structure has been stowed in its storage compartment 24. When this occurs, motors 446 automatically operate to lower the deck lid 26 and the cycle of operation of lowering the top structure 22 has now been completed.

In the event that it is desired to raise the top structure to an out of the way position to facilitate entrance to or leaving of the vehicle, flipper switch 1156 or 1306 is closed. When this occurs, the solenoids 537 operate to withdraw latches 534 thereby releasing top structure 22 from the frame 18. Motor 224 now automatically operates to swing top structure 22 upwardly about pivot 246 to the position shown in broken lines at A in Fig. 26. After the lapse of a predetermined period of time, timer motor 1276 operates switch 1268 into engagement with contact element 1274. This causes a reversal of motor 224 which now moves the top structure downwardly. When switch 1268 is so operated by timer motor 1276 the latch solenoids 537 are also energized thereby operating to retract latches 534 to condition the header for movement into proper position, as shown by full lines in Fig. 26. When the top structure 22 has been so operated, the circuit to solenoids 537 and motor 224 are opened and, consequently, the motor 224 comes to rest and springs 536 operate latches 534 into engagement with the under-surface of frame 18 thereby securely locking the top structure in position.

In the event that the top is in its lowered position and rain should fall, as soon as moisture comes in contact with switch 1402 it immediately closes the circuit from bus bar 596 through relay switch 1436, thereby causing the top structure to be moved to raised position. At the same time the windows 42 at either side of the vehicle are also automatically operated to raised or closed position. By this action the interior of the vehicle is protected against moisture.

Mechanism is also provided to enable manual operation of the deck lid 26 and the top structure 22. When it is desired to operate the deck lid manually, switch 1154 is first closed thereby releasing brake 487. Now by actuating the adapter mechanism 498 by the mechanism shown more particularly in Fig. 4f, the deck lid 26 may be operated in either direction. Also, to operate the top structure 22 by the adapter means 183, switch 1153b is first closed, thereby causing solenoid 175 to release brake 165. Now, by actuation of the adapter mechanism 183, as shown more particularly in Fig. 4c, the top structure may be operated in either direction.

In the event that it is desired to stop operation of the device at any time during operation thereof to either raised or lowered position, emergency switch 1740 or 1742 is closed. Relay 1770 now is energized and opens its switch 1176, thereby interrupting the circuit to all of the operating devices in the system.

The novel and highly efficient mechanisms just described, provide a convenient and expeditious means for operating the top structure to its various positions with a minimum of effort on the part of the operator. By simply closing a switch, the top structure is actuated from a place of storage to fully raised position. Upon the actuation of another switch the top structure is completely lowered and stowed within a concealed compartment. Thus, when the top structure is in its lowered position, it is completely concealed from view. The various relays, the timer motor and associated parts may be mounted on the compartment side of wall 82 or at any other out of the way position. Accordingly all of the parts except the control switches are concealed from view. The various elements of the top structure and its operating means are of novel and simplified construction and owing to the improved and efficient operation thereof long and uninterrupted service of the said top structure is assured.

While but a single embodiment of the invention has been shown and described herein, it is apparent to those skilled in the art that the device is subject to change without departing from the invention. It therefore is to be understood that it is not intended to limit the invention to the specific embodiment shown but only by the scope of the claims which follow.

The claims:

1. The combination comprising, stationary supporting means, a top structure movable between raised and lowered positions, first power means for moving said top structure from lowered position to a position adjacent said stationary supporting means and from said last mentioned position to said lowered position, second power means for moving said top structure from said position adjacent said stationary supporting means into engagement with the latter and from said last mentioned position to said position adjacent said stationary supporting means, latch means for detachably securing said top structure to said stationary supporting means, automatically operable means for moving said latch means to latched position to detachably secure said top structure to said stationary supporting means, power means for withdrawing said latch means, a power circuit operatively connected to said first, second and third mentioned power means, and control means in said circuit for causing said first, second and third mentioned power means to operate in a predetermined order.

2. A folding top structure for automotive vehicles, comprising, a pair of spaced sectional side rails, each of said side rails including two or more sections, fixed supporting means, pivot means for pivotally mounting one end of one of said sections on said supporting means, a rotatable transmission member mounted on said pivot means and adapted for relative movement with respect to said one section, a second pivot means for pivotally connecting said one section with an adjacent section, a second rotatable transmission member rotatably mounted on said second pivot means, means for securing said second rotatable member to said adjacent section, means connecting said first and second transmission members for simultaneous movement, and operating means connected to one of said rotatable transmission members for rotating the latter and said second transmission member, thereby causing said adjacent section to swing about said second pivot means relative to said one section.

3. A folding top structure for automotive vehicles comprising, a top member, a pair of spaced sectional side rails for supporting said top member, each of said side rails including two or more interconnected sections, fixed supporting means, pivot means for pivotally mounting one end of one of said sections of each of said side rails on said fixed supporting means, a rotatable transmission member mounted on said pivot means adjacent each of said one sections and adapted for relative movement with respect thereto, a second pivot means for pivotally connecting the said one section of each of said side rails with an adjacent section, a second rotatable transmission member rotatably mounted on each of said second pivot means, means for securing said second rotatable transmission member to said adjacent sections, means connecting said first and second transmission members for simultaneous movement, and operating means operatively connected to each of said first transmission members whereby upon operation of said last mentioned means simultaneous movement is imparted to said transmission members causing said adjacent sections to swing about said second pivot means relative to said one sections.

4. The invention set forth in claim 3 wherein said operating means comprises reduction gearing operatively connected to each of said first mentioned transmission members, and power means operatively connected to said reduction gearing.

5. A folding top structure for automotive vehicles, comprising, a top member, a pair of spaced sectional side rails for supporting said top member, each of said side rails comprising two or more interconnected sections, fixed supporting means, pivot means for pivotally mounting one end of one of said sections on said fixed supporting means, a pulley rotatably mounted on said pivot means adjacent said one section and adapted for relative movement with respect to the latter, a second pivot means for pivotally connecting said one section with an adjacent section, a second pulley rotatably mounted on said second pivot means, means for securing said second pulley to said adjacent section, endless means trained over said pulleys in driving relation therewith, and operating means for driving said pulleys whereby said adjacent section is caused to swing about said second pivot means relative to said one section.

6. The invention set forth in claim 5, including limit stop means for limiting the movement of said pulleys in either direction.

7. The invention set forth in claim 5 wherein said operating means comprises reduction gearing operatively connected to said first pulley, and electric motor means operatively connected to said reduction gearing.

8. A folding top structure for automotive vehicles, comprising, a top member, a pair of spaced sectional side rails for supporting said top member, each of said side rails comprising two or more interconnected sections, fixed supporting means, pivot means for pivotally mounting one end of one of said sections on said fixed supporting means, a pulley rotatably mounted on said pivot means adjacent said one section and adapted for relative movement with respect to the latter, a second pivot means for pivotally connecting said one section with an adjacent section, a second pulley rotatably mounted on said second pivot means, means for securing said second pulley to said adjacent section, endless means trained over said pulleys in driving relation therewith, operating means for driving said pulleys whereby said adjacent section is caused to swing about said second pivot means relative to said one section, and limit stop means for limiting the movement of said pulleys in either direction, said last metioned means comprising a projection secured to said fixed supporting means and a pair of spaced abutments secured to said one pulley, one of said abutments engaging said projection when said pulley reaches its limit of travel in one direction and the other of said abutments engaging said projection when said pulley reaches its limit of travel in the opposite direction.

9. A folding top structure for automotive vehicle comprising, a pair of spaced sectional side rails each including, a rear section, an intermediate section and a front section, fixed supporting means, pivot means for pivotally mounting said rear sections on said supporting means, a pulley mounted adjacent at least one of said rear sections and adapted for movement relative to the latter, second pivot means pivotally connecting each of said rear and intermediate sections, a second pulley rotatably mounted on at least one of said second pivot means, means for securing said second pulley to said intermediate section, endless means trained over said pulleys in driving relation therewith, third pivot means pivotally connecting said intermediate and front sections, means for locking said intermediate and front sections against relative movement, and operating means for rotating said pulleys in either direction to cause said intermediate and front sections to swing about said second pivot means relative to said rear section when the front and intermediate sections are locked together for non-relative movement.

10. A folding top structure for automotive vehicles comprising, a pair of spaced sectional side rails each including, a rear section, an intermediate section and a front section, fixed supporting means, pivot means for pivotally mounting said rear sections on said supporting means, a pulley mounted adjacent at least one of said rear sections and adapted for movement relative to the latter, second pivot means pivotally connecting each of said rear and intermediate sections, a second pulley rotatably mounted on at least one of said second pivot means, means for securing said second pulley to said intermediate section, endless means trained over said pulleys in driving relation therewith, third pivot means pivotally connecting said intermediate and front sections, means for locking said intermediate and front sections against relative movement, and operating means for rotating said pulleys in either direction to cause said intermediate and front sections to swing about said second pivot means relative to said rear section when the front and intermediate sections are locked together for non-relative movement, said last mentioned means including power means, and control means for said power means.

11. A folding top structure for automotive vehicles comprising, a pair of spaced sectional side rails each including, a rear section, an intermediate section and a front section, fixed supporting means, pivot means for pivotally mounting said rear sections on said supporting means, a pulley rotatably mounted on said pivot means adjacent at least one of said rear sections and adapted for movement relative to the latter, a second pivot means pivotally connecting each of said rear and intermediate sections, a second pulley rotatably mounted on said second pivot means, means for securing said second pulley to said intermediate section, endless means trained over said pulleys in driving relation therewith, a third pivot means pivotally connecting said intermediate and front sections, latch means for locking said intermediate and front sections against relative movement, operating means for rotating said pulleys in either direction to cause said intermediate and front sections to swing about said second pivot means relative to said rear section when the front and intermediate sections are locked together for non-relative movement, and limit stop means for limiting the swinging movement of one of said sections in either direction.

12. A folding top structure for automotive vehicles comprising, a pair of spaced sectional side rails, each including a rear section, an intermediate section and a front section, fixed supporting means, pivot means for pivotally mounting said rear sections on said supporting means, a pulley rotatably mounted on said pivot means adjacent each of said rear sections and adapted for movement relative to the latter, a second pivot means for each of said rear and intermediate sections, a second pulley rotatably mounted on each of said second pivot means, means for securing each of said second pulleys to its associated intermediate section, endless means trained over each of said first and second pulleys in driving relation therewith, a third pivot means for pivotally connecting each of said intermediate and front sections, means for preventing relative movement of said intermediate and front sections in at least one direction, and operating means for rotating said pulleys in either direction to cause said intermediate and front sections to swing about said second pivot means relative to said rear sections when the front and intermediate sections are locked together for non-relative movement, said operating means including an electric motor and control means for said motor.

13. The invention set forth in claim 12, including, limit switch means for interrupting the circuit to said motor when said top structure reaches its limit of travel in either direction.

14. A folding top structure for automotive vehicles, comprising, a top member, a pair of spaced sectional side rails for supporting said top member, pivot means for pivotally connecting the adjoining sections of said side rails, fixed supporting means, pivot means for pivotally supporting one of the sections of each of said side rails on said fixed supporting means, and means for moving said other sections relative to said one sections, said means including pulley means mounted on said one sections and on one of said other sections and operatively connected thereto, cable means operatively interconnecting said pulley means, and operating means for driving said cable and pulley means including an electric motor, an electric circuit, control means in said electric circuit for controlling the operation of said electric motor, and limit switches in said circuit for interrupting the circuit to said motor when said top structure reaches its limit of travel in either direction.

15. A folding top structure for automotive vehicles, comprising, a top member, a pair of spaced sectional side rails for supporting said top member, pivot means for pivotally connecting the adjoining sections of said side rails, fixed supporting means, pivot means for pivotally supporting one of the sections of each of said side rails on said fixed supporting means, and means for moving said other sections relative to said one sections, said means including pulley means mounted on said one sections and on one of said other sections and operatively connected thereto, cable means operatively interconnecting said pulley means, and operating means for driving said cable and pulley means including an electric motor, an electric circuit, control means in said electric circuit for controlling the operation of said electric motor, limit switches in said circuit for interrupting the circuit to said motor when said top structure reaches its limit of travel in either direction, and limit stop means for preventing overtravel of said electric motor.

16. A folding top structure for automotive vehicles, comprising, a top member, a pair of spaced sectional side rails for supporting said top member, pivot means for pivotally connecting the adjoining sections of said side rails, fixed supporting means pivot means for pivotally supporting one of the sections of each of said side rails on said fixed supporting means, means for moving said other sections relative to said one sections, said means including pulley means mounted on said one sections and on one of said other sections and operatively connected thereto, cable means operatively interconnecting said pulley means, and operating means for driving said cable and pulley means including an electric motor, an electric circuit, control means in said electric circuit for controlling the operation of said electric motor, limit switches in said circuit for interrupting the circuit to said motor when said top structure reaches its limit of travel in either direction, and limit stop means for preventing overtravel of said electric motor, said last mentioned means comprising interengaging abutment means on said fixed supporting means and said cable and pulley means.

17. A folding top structure for automotive vehicles, comprising, a pair of spaced sectional side rails, a flexible top member supported on said side rails, each of said side rails comprising a rear section, an intermediate section and a front section, a fixed support, pivot means for pivotally mounting said rear section on said fixed support, a second pivot means for pivotally connecting said rear and intermediate sections, means for securing said second pivot means to said rear section, a third pivot means for pivotally connecting said intermediate and front sections, transmission means rotatably mounted on said first pivot means and adapted for rotation relative to said rear section, a second transmission means rotatably mounted on said second pivot means, means for securing said second transmission means to said intermediate section, means connecting said first and second transmission means for substantially simultaneous movement, a third transmission means secured to said second pivot means, a fourth transmission means rotatably mounted on said third pivot means, means connecting said third and fourth transmission means for substantially simultaneous movement, an operating member secured to said front section and adapted to operatively connect said fourth transmission means to said front section, operating means for swinging said rear sections about said first pivot means, and means for holding said first transmission means against rotation during operation of said operating means, whereby said intermediate section is caused to swing relative to said rear section and said front section relative to said intermediate section.

18. A folding top structure for automotive vehicles, comprising, a pair of spaced sectional side rails, a flexible top member supported on said side rails, each of said side rails comprising a rear section, an intermediate section and a front section, a fixed support, pivot means for pivotally mounting said rear section on said fixed support, a second pivot means for pivotally connecting said rear and intermediate sections, means for securing said second pivot means to said rear section, a third pivot means for pivotally connecting said intermediate and front sections, transmission means rotatably mounted on said first pivot means and adapted for rotation relative to said rear section, a second transmission means rotatably mounted on said second pivot means, means for securing said second transmission means to said intermediate section, means connecting said first and second transmission means for substantially simultaneous movement, a third transmission means secured to said second pivot means, a fourth transmission means rotatably mounted on said third pivot means, means connecting said third and fourth transmission means for substantially simultaneous movement, an operating member secured to said front section and adapted to operatively connect said fourth transmission means to said front section, operating means including self locking means for swinging said rear sections about said first pivot means, and operating mechanism including self locking means connected to said first transmission means, whereby upon operation of said operating means said first transmission means is held against movement causing said intermediate section to swing about said second pivot means relative to said rear section and said front section to swing about said third pivot means relative to said intermediate section, and upon operation of said operating mechanism said rear sections are held stationary and said intermediate and front sections are caused to swing about said second pivot means relative to said rear sections.

19. A folding top structure for automotive vehicles, comprising, a pair of spaced sectional side rails, a flexible top member supported on said side rails, each of said side rails comprising a rear section, an intermediate section and a front section, a fixed support, pivot means for pivotally mounting said rear section on said fixed support, a second pivot means for pivotally connecting said rear and intermediate sections, means for securing said second pivot means to said rear section, a third pivot means for pivotally connecting said intermediate and front sections, transmission means rotatably mounted on said first pivot means and adapted for rotation relative to said rear section, a second transmission means rotatably mounted on said second pivot means, means for securing said second transmission means to said intermediate section, means connecting said first and second transmission means for substantially simultaneous movement, a third transmission means secured to said second pivot means, a fourth transmission means rotatably mounted on said third pivot means, means connecting said third and fourth transmission means for substantially simultaneous movement, an operating member secured to said front section and adapted to operatively connect said fourth transmission means to said front section, operating means for swinging said rear sections about said first pivot means, means for holding said first transmission means against rotation during operation of said operating means, whereby said intermediate section is caused to swing relative to said rear section and said front section relative to said intermediate section, a fourth pivot means, means for securing said fourth pivot means to said rear sections, a fifth transmission means mounted in substantially concentric relation with said first pivot means and rotatable relative thereto, a sixth transmission means rotatably mounted on said fourth pivot means, a top bow secured to said sixth transmission means, means connecting said fifth and sixth transmission means for substantially simultaneous movement, and operating means connected to said fifth transmission means.

20. The invention set forth in claim 19 wherein said operating means includes power means, reduction gearing connected to said fifth transmission means, and flexible shafting connecting said power means and reduction gearing thereby enabling swinging movement of said rear sections about said first pivot means by said first mentioned operating means.

21. The invention set forth in claim 17 wherein said operating means includes an electric motor, an electric circuit for said motor, control means for controlling the operation of said motor, and limit switch means for interrupting the circuit to said motor when said top structure reaches its limit of travel in either direction.

22. The invention set forth in claim 18, wherein, said operating mechanism includes an electric motor, an electric circuit for said motor, control switches in said circuit for controlling the operation of said motor, and limit switches for interrupting the circuit to said motor when said intermediate and front sections reach their limit of travel in either direction about said second pivot means.

23. A folding top structure for automotive vehicles, comprising, a pair of spaced sectional side rails, a flexible top member supported on said rails, each of said side rails comprising, a rear section, an intermediate section and a front section, a fixed support, pivot means for pivotally mounting said rear section on said fixed support, a second pivot means for pivotally connecting said rear and intermediate sections, means for securing said second pivot means to said rear section, means for rotatably supporting said second pivot means on said intermediate section, a third pivot means for pivotally connecting said intermediate and front sections, a pulley rotatably mounted on said first pivot means and adapted for relative movement with respect to said rear section, a second pulley rotatably mounted on said second pivot means, means for securing said second pulley to said intermediate section, endless means trained over said pulleys in driving relation therewith, a third pulley secured to said second pivot means, a fourth pulley rotatably mounted on said third pivot means, endless means trained over said third and fourth pulleys in driving relation therewith, an operating member secured to said front section and adapted to operatively connect said fourth pulley to said front section, operating means for swinging said rear section about said first pivot means, and means for holding said first pulley against rotation during operation of said operating means, whereby said intermediate section is caused to swing relative to said rear section about said second pivot means and said front section to be swung about said third pivot means relative to said intermediate section.

24. A folding top structure for automotive vehicles, comprising, a pair of spaced sectional side rails, a flexible top member supported on said rails, each of said side rails comprising a rear section, an intermediate section and a front section, a fixed support, pivot means for pivotally mounting said rear section on said fixed support, a second pivot means for pivotally connecting said rear and intermediate sections, means for securing said second pivot means to said rear section, means for rotatably supporting said second pivot means on said intermediate section, a third pivot means for pivotally connecting said intermediate and front sections, a pulley rotatably mounted on said first pivot means and adapted for relative movement with respect to said rear section, a second pulley rotatably mounted on said second pivot means, means for securing said second pulley to said intermediate section, endless means trained over said pulleys in driving relation therewith, a third pulley secured to said second pivot means, a fourth pulley rotatably mounted on said third pivot means, endless means trained over said third and fourth pulleys in driving relation therewith, an operating member secured to said front section and adapted to operatively connect said fourth pulley to said front section, operating means including self locking means for swinging said rear sections about said first pivot means, and operating mechanism including self locking means connected to said first pulley, whereby upon operation of said operating means said first pulley is held against operation, thereby causing said intermediate section to swing about said second pivot means relative to said rear section and said front section to swing about said third pivot means relative to said intermediate section, and upon operation of said operating mechanism said rear section is held stationary and said intermediate and front sections are caused to swing about said second pivot means relative to said rear section.

25. The invention set forth in claim 24, including, a fourth pivot means, means for securing the latter to said rear section, a fifth pulley mounted in concentric relation with said first pivot means, a sixth pulley rotatably mounted on said fourth pivot means, a top bow secured to said sixth pulley, endless means connecting said fifth and sixth pulleys for joint movement thereof, and operating means including flexible shafting connected to said fifth pulley for raising and lowering said bow, said flexible shafting enabling said rear section to swing about said first pivot means upon operation of said first mentioned operating means.

26. In combination with a vehicle body, a folding top structure comprising, one or more sectional rails each including two or more sections means supporting said rails on said body, pivot means pivotally interconnecting the adjoining sections of said rails for folding movement, operating means for folding said side rails, and latch means mounted adjacent at least one of said pivot means to prevent folding movement of the associated adjoining sections, said latch means comprising, a latch member secured to one of said adjoining sections and having a latch receiving recess therein, an operating member secured to the other of said adjoining sections, a latch element mounted for sliding movement on said operating member, means for actuating said latch element into said recess to lock said adjoining sections against relative movement, and means operable by said operating means upon folding movement of said rails for withdrawing said latch element from said recess.

27. The invention set forth in claim 26 wherein said last mentioned means includes rotatable operating means, and means including said latch element for coupling said operating member to said rotatable operating means for swinging said other adjoining member about said one of said pivot means.

28. A folding top structure, comprising a flexible top member, one or more sectional rails each including two or more sections for supporting said flexible top member, pivot means for pivotally connecting the adjoining sections of said rails for folding movement, and latch means mounted adjacent at least one of said pivot means to prevent folding movement of the associated adjoining sections, said latch means including, a latch member secured to one of said adjoining sections having a latch receiving recess therein, an operating member secured to the other of said adjoining sections, a latch element mounted for sliding movement on said operating member, means for actuating said latch element into said recess to lock said adjoining sections against relative movement, and means for withdrawing said latch element from said recess, said last mentioned means including, a rockable element engaging said latch element, and operating means associated with one of said rail sections for said rockable element.

29. In combination with a vehicle body, a folding top structure comprising, one or more sectional rails each including two or more sections, means supporting said rails on said body, pivot means for pivotally connecting the adjoining sections of said rails for folding movement, operating means for folding said rails, and latch means mounted adjacent at least one of said pivot means to prevent folding movement of the associated adjoining sections, said latch means including, a latch member secured to one of said adjoining sections having a latch receiving recess therein, an operating member secured to the other of said adjoining sections, a latch element mounted for sliding movement on said operating member, means for actuating said latch element into said recess to lock said adjoining sections against relative movement, and latch element operating means operable by said first-mentioned operating means, means for withdrawing said latch element from said recess, said last mentioned means including, a rockable element engaging said latch element, a rotatable operating member mounted on said pivot means, and means operated by said last mentioned member for rocking said rockable element.

30. The invention set forth in claim 29, including, interengaging means on said rotatable operating member and latch element for coupling said first and last mentioned operating members for joint movement.

31. In combination with a vehicle body, a folding top structure comprising, one or more sectional rails each including two or more sections, means supporting said rails on said body, pivot means for pivotally connecting the adjoining sections of said rails for folding movement, operating means for folding said rails, and latch means mounted adjacent at least one of said pivot means for preventing folding movement of the associated adjoining sections, said latch means including, a latch arm secured to one of said adjoining sections and having a latch receiving recess therein, an operating arm secured to the other of said adjoining sections, a pair of spaced laterally extending segmental members provided on said operating arm, a latch bolt guided for sliding movement between said segmental members, a rotatable operating member mounted on said pivot means and operated by said first-mentioned operating means, spaced arcuate laterally extending flanges on said rotatable member forming a bearing socket for said segmental members, means for actuating said bolt into said recess to lock said latch and operating arms and said adjoining sections against movement, and means operable by said rotatable member for withdrawing said bolt from said recess.

32. The invention set forth in claim 31, wherein, said last mentioned means comprises a pivoted element engaging said bolt, and means carried by said rotatable member for actuating said pivoted element to slide said bolt out of said recess.

33. In combination with a vehicle body, a folding top structure comprising, one or more sectional rails each including two or more sections, means supporting said rails on said body, pivot means for pivotally connecting the adjoining sections of said rails for folding movement, operating means for folding said rails, and latch means mounted adjacent at least one of said pivot means for preventing folding movement of the associated adjoining sections, said latch means including, a latch arm secured to one of said adjoining sections and having a latch receiving recess therein, an operating arm secured to the other of said adjoining sections, a pair of spaced laterally extending segmental members provided on said operating arm, a latch bolt guided for sliding movement between said segmental members, a rotatable operating member mounted on said pivot means and operated by said first-mentioned operating means, spaced arcuate laterally extending flanges on said rotatable member forming a bearing socket for said segmental members, means for actuating said bolt into said recess to lock said latch and operating arms and said adjoining sections against movement, means operable by said rotatable member for withdrawing said bolt from said recess, said last mentioned means comprising a rockable element pivoted on said latch arm, and cam means on said rotatable member for rocking said rockable element to slide said bolt out of said recess.

34. A folding top structure, comprising, a flexible top, one or more sectional rails each consisting of two or more sections for supporting said flexible top, pivot means for pivotally connecting the adjoining sections of said rails for folding movement, and latch means mounted adjacent at least one of said pivot means for preventing folding movement of the associated adjoining sections, said latch means comprising, a latch arm secured to one of said adjoining sections and having a latch receiving recess therein, an operating arm secured to the other of said adjoining sections, a pair of spaced laterally extending segmental members provided on said operating arm, a latch bolt guided for sliding movement between said segmental member, a rotatable operating member mounted on said pivot means, spaced arcuate laterally extending flanges on said rotatable member forming a bearing socket for said segmental members, bearing means on said latch arm engaging said segmental members, said segmental members and bearing means being disposed in substantially concentric relation with said pivot means, means for actuating said bolt into said recess to lock said adjoining sections against movement, and means operable upon initial movement of said rotatable member to withdraw said bolt from said recess and to move said bolt between said arcuate flanges, thereby coupling said operating arm to said rotatable member for movement therewith and causing said other adjoining section to swing about said pivot means.

35. A folding top structure for automotive vehicles, comprising, a pair of spaced sectional side rails, a flexible top member supported on said side rails, each of said side rails comprising a rear section, an intermediate section and a front section, a fixed support, pivot means for pivotally mounting said rear section on said fixed support, a second pivot means for pivotally connecting said rear and intermediate sections, means for securing said second pivot means to said rear section, a third pivot means for pivotally connecting said intermediate and front sections, transmission means rotatably mounted on said first pivot means and adapted for rotation relative to said rear section, a second transmission means rotatably mounted on said second pivot means, means for securing said second transmission means to said intermediate section, means connecting said first and second transmission means for substantially simultaneous movement, a third transmission means secured to said second pivot means, a fourth transmission means rotatably mounted on said third pivot means, means connecting said third and fourth transmission means for substantially simultaneous movement, an operating member secured to said front section and adapted to operatively connect said fourth transmission means to said front section, latch means mounted adjacent said third pivot means adapted to latch said intermediate and front sections against relative movement, latch release means actuated by said fourth transmission means upon initial movement of the latter, operating means for swinging said rear sections about said first pivot means, and means for holding said first transmission means against rotation during operation of said operating means, whereby said intermediate section is caused to swing relative to said rear section and after release of said latch means by said fourth transmission means said front section is caused to swing relative to said intermediate section.

36. The invention set forth in claim 35, wherein, said latch means comprises a latch member having a bolt receiving recess provided therein secured to said intermediate section, a bolt mounted for movement on said operating member, means for actuating said bolt into said recess to lock said intermediate and front sections against relative movement, and means disposed between said bolt and said fourth transmission means and actuated by the latter for withdrawing said bolt from said recess.

37. The invention set forth in claim 36 including coupling means on said fourth transmission means for engaging said bolt to couple said operating member to said fourth transmission member upon withdrawal of said bolt from said recess, whereby upon continued movement of said fourth transmission member said operating member is caused to swing said front section about said third pivot means relative to said intermediate section.

38. A folding top structure for automotive vehicles, comprising, a pair of spaced sectional side rails, a flexible top member supported on said rails, each of said side rails comprising, a rear section, an intermediate section and a front section, a fixed support, pivot means for pivotally mounting said rear section on said fixed support, a second pivot means for pivotally connecting said rear and intermediate sections, means for securing said second pivot means to said rear section, means for rotatably supporting said second pivot means on said intermediate section, a third pivot means for pivotally connecting said intermediate and front sections, a pulley rotatably mounted on said first pivot means and adapted for relative movement with respect to said rear section, a second pulley rotatably mounted on said second pivot means, means for securing said second pulley to said intermediate section, endless means trained over said pulleys in driving relation therewith, a third pulley secured to said second pivot means, a fourth pulley rotatably mounted on said third pivot means, endless means trained over said third and fourth pulleys in driving relation therewith, an operating member secured to said front section and adapted to operatively connect said fourth pulley to said front section, latch means mounted adjacent said third pivot means adapted to latch said intermediate and front sections against relative movement, latch release means actuated by said fourth pulley upon movement of the latter, operating means for swinging said rear sections about said first pivot means, and means for holding said first pulley against rotation during operation of said operating means, whereby said intermediate section is caused to swing about said second pivot means relative to said rear sections, and said front section to be swung about said third pivot relative to said intermediate section after release of said latch means by said fourth pulley.

39. The invention set forth in claim 38 wherein, said latch means comprises a latch arm secured to said intermediate section and having a bolt receiving recess therein, a bolt slidably mounted on said operating member, spring means for actuating said bolt into said recess to lock said intermediate and front sections against relative movement, and means disposed between said bolt and fourth pulley and actuated by the latter for withdrawing said bolt from said recess.

40. The invention set forth in claim 39, including, coupling flanges on said fourth pulley for pivotally supporting said operating member, said bolt when withdrawn from said recess engaging said flanges to couple said operating member to said fourth pulley, whereby upon continued movement of said fourth pulley said operating member is caused to swing said front section about said third pivot means relative to said intermediate section.

41. A hinge latch, comprising, a first hinge member having a bolt receiving recess provided therein, a second hinge member, spaced segmental projections on said second hinge member, means for pivotally supporting said first hinge member on said segmental projections, a bolt slidably mounted between said projections, a rotatable member, spaced arcuate flanges on said rotatable member forming a socket for receiving said segmental projections, means for actuating said bolt into said recess to lock said members against relative movement, and means actuated by said rotatable member for withdrawing said bolt from said recess and into the space between said flanges, thereby releasing said hinge members for relative movement and simultaneously coupling said second hinge member to said rotatable member.

42. A hinge latch, comprising, a first hinge member having a bolt receiving recess provided therein, a second hinge member, spaced segmental projections on said second hinge member, means for pivotally supporting said first hinge member on said segmental projections, a bolt slidably mounted between said projections, a rotatable member, spaced arcuate flanges on said rotatable member forming a socket for receiving said segmental projections, means for actuating said bolt into said recess to lock said members against relative movement, means actuated by said rotatable member for withdrawing said bolt from said recess and into the space between said flanges, thereby releasing said hinge members for relative movement and simultaneously coupling said second hinge member to said rotatable member, said last mentioned means comprising, a pivoted pawl engaging said bolt, and means operated by said rotatable means for actuating said pawl.

43. The invention set forth in claim 41, wherein, said last mentioned means comprises, a pawl pivoted on said first hinge member, and means carried by said rotatable member for swinging said pawl.

44. The invention set forth in claim 41, wherein, said last mentioned means comprises, a pawl pivotally supported on said first hinge member, a cam follower secured to one end of said pawl, and a cam carried by said rotatable member engaging said cam follower to operate said pawl.

45. The combination comprising a top structure movable between raised and lowered positions, a storage compartment for said top structure in the lowered position thereof, a portion of said top structure extending over said storage compartment in the raised position of said top structure, a lid for said storage compartment movable between open and closed positions and being located between said portion of said top structure and said storage compartment when said top structure is in raised position and said lid is in closed position, first power means for moving said lid between open and closed positions, second power means for raising and lowering said top structure, a power circuit operatively interconnecting said first and second power means, and control means in said circuit for causing said first and second power means to operate in a predetermined order.

46. The combination of stationary supporting means, a top structure movable between raised and lowered positions, first power means for moving said top structure from lowered position to raised position adjacent said stationary supporting means and from said raised position adjacent said stationary supporting means to said lowered position, second power means for moving said top structure from said raised position adjacent said stationary supporting means into engagement with the latter and from said position in engagement with said stationary supporting means to said position adjacent said stationary supporting means, means including third power means for detachably securing said top structure to said stationary supporting means when said second power means has moved said top structure into engagement with said stationary supporting means, a power circuit operatively connected to said first, second, and third power means, and control means in said circuit for causing said first, second, and third power means to operate in a predetermined order.

47. The combination comprising, a vehicle body, a top structure for said body, movable between raised and lowered positions and including at least one bow, said bow being movable with said top structure as said structure is moved between raised and lowered positions and being supported on said top structure for movement relative to said top structure between a first position adjacent said body and a second position in spaced relationship thereto, first power means for raising and lowering said top structure, second power means for moving said bow means relative to said top structure between said first and second positions, a power circuit operatively connected to said first and second power means, and control means in said circuit for causing said first and second power means to operate in a predetermined order.

48. The combination comprising, a vehicle body, a top structure for said body including a pair of spaced foldable side rails and a plurality of bows interconnecting said side rails, said top structure being movable between raised and lowered positions, said bows being movable with said structure as said structure is moved between raised and lowered positions with at least one of said bows supported on said top structure for movement relative to said top structure between a first position adjacent said body and a second position in spaced relationship relative thereto when said top structure is in substantially raised position, first power means for raising and lowering said top structure, second power means for moving said one bow means relative to said top structure between said first and second positions, a power circuit operatively connected to said first and second power means, and control means in said circuit for causing said first and second power means to operate in a predetermined order.

49. The combination of a top structure movable between raised and lowered positions, bow means supported on said top structure for movement therewith as said top structure is moved between raised and lowered positions and for movement independently of said top structure, a storage compartment for said top structure, a lid for said compartment movable between open and closed positions, first power means for moving said top between raised and lowered positions, second power means for moving said lid between open and closed positions, and third power means for moving said bow means independently of said top structure between a first position adjacent said lid when the latter is in closed position and a second position in spaced relationship with said lid, a power circuit operatively connected to said first, second, and third power means, and control means in said circuit for causing said first, second, and third power means to operate in a predetermined order.

50. The combination comprising a stationary supporting member, a top structure movable between raised and lowered positions, a bow supported on said top structure for movement therewith as said top structure is moved between raised and lowered positions and for movement independently of said top structure, a storage compartment for said top structure, a lid for said compartment movable to open and closed positions, first power means for moving said lid to open and closed positions, second power means for moving said top structure from a lowered position within said compartment to a raised position adjacent said supporting member and from said last-mentioned position to said lowered position, third power means for actuating said top structure from said position adjacent said supporting member into engagement with the latter and from said last-mentioned position to said position adjacent said supporting member, fourth power means for moving said bow to a first position adjacent said lid when the latter is in closed position and a second position in spaced relationship with said lid, a power circuit operatively connected to said first, second, third, and fourth power means, and control means in said circuit causing said first, second, third, and fourth power means to operate in a predetermined order.

51. The combination comprising a stationary supporting member, a top structure movable between raised and lowered positions, a bow supported on said top structure for movement therewith as said top structure is moved between raised and lowered positions and for movement independently of said top structure, a storage compartment for said top structure, a lid for said compartment movable between open and closed positions, first power means for moving said lid to open and closed positions, second power means for moving said top structure from a lowered position within said compartment to a raised position adjacent said supporting member and from said last-mentioned position to said lowered position, third power means for actuating said top structure from said position adjacent said supporting member into engagement with the latter and from said last-mentioned position to said position adjacent said supporting member, fourth power means for moving said bow between a first position adjacent said lid when the latter is in closed position and a second position in spaced relationship with said lid, latch means for detachably securing said top structure to said stationary member when said top structure has been moved into engagement with the latter, power means for withdrawing said latch means, means for moving said latch means to latching position, a power circuit operatively connected to said first, second, third, and fourth power means, and control means in said circuit for causing said first, second, third, and fourth power means to operate in a predetermined order.

52. A folding top structure comprising a pair of spaced sectional side rails, each of said side rails including a rear section, an intermediate and front section, fixed supporting means, pivot means for pivotally mounting said rear sections on said supporting means, a pulley mounted adjacent at least one of said rear sections and adapted for movement relative to the latter, second pivot means pivotally connecting each of said rear and intermediate sections, a second pulley rotatably mounted on at least one of the said second pivot means, means for securing said second pulley to said intermediate section, endless means trained over said pulleys in driving relation therewith, third pivot means pivotally connecting said intermediate and front sections, and operating means for rotating said pulleys in either direction to cause said intermediate and front sections to move relative to said second pivot means and to said rear section.

(References on following page)

References Cited in the file of this patent

UNITED STATES PATENTS

| | | |
|---|---|---|
| 394,804 | Woeber | Dec. 18, 1888 |
| 980,686 | Shine | Jan. 3, 1911 |
| 1,697,073 | Leather | Jan. 1, 1929 |
| 2,007,873 | Paulin | July 9, 1935 |
| 2,066,231 | Salmons et al. | Dec. 29, 1936 |
| 2,105,293 | Paulin | Jan. 11, 1938 |
| 2,157,783 | Bessonneau | May 9, 1939 |
| 2,215,363 | Rupple et al. | Sept. 17, 1940 |
| 2,232,165 | Cochran | Feb. 18, 1941 |
| 2,309,926 | Baker | Feb. 2, 1943 |
| 2,329,802 | Westrope | Sept. 21, 1943 |
| 2,372,583 | Keller | Mar. 27, 1945 |
| 2,411,945 | Vigmostad et al. | Dec. 3, 1946 |
| 2,448,054 | Seckel | Aug. 31, 1948 |
| 2,459,089 | Orr | Jan. 11, 1949 |
| 2,471,378 | Shilala | May 24, 1949 |
| 2,486,905 | Ackermans | Nov. 1, 1949 |
| 2,490,889 | Stallard | Dec. 13, 1949 |
| 2,509,623 | Baade | May 30, 1950 |
| 2,529,458 | Orr | Nov. 7, 1950 |
| 2,559,482 | Votypka | July 3, 1951 |
| 2,578,990 | Bessonneau | Dec. 18, 1951 |
| 2,580,486 | Vigmostad | Jan. 1, 1952 |
| 2,586,648 | Hale et al. | Feb. 19, 1952 |
| 2,592,512 | Fodermaier | Apr. 8, 1952 |
| 2,596,355 | Ackermans | May 13, 1952 |
| 2,606,060 | Mechlin | Aug. 5, 1952 |
| 2,617,972 | Nutter | Nov. 11, 1952 |
| 2,622,400 | Greer | Dec. 23, 1952 |
| 2,640,958 | Davis | June 2, 1953 |

FOREIGN PATENTS

| | | |
|---|---|---|
| 73,683 | Austria | Aug. 25, 1917 |
| 399,011 | Great Britain | Sept. 28, 1933 |
| 499,993 | Great Britain | Feb. 1, 1939 |
| 655,817 | Great Britain | Aug. 1, 1951 |
| 353,924 | Italy | Nov. 3, 1937 |

OTHER REFERENCES

Chilton's Motor Age, January 1952, pp. 84, 85, 172, 174, 176, 177.